United States Patent
Howell et al.

(10) Patent No.: US 12,001,599 B2
(45) Date of Patent: *Jun. 4, 2024

(54) HEAD-WORN DEVICE WITH CONNECTION REGION

(71) Applicant: IngenioSpec, LLC, San Jose, CA (US)

(72) Inventors: Thomas A. Howell, San Jose, CA (US); David Chao, Saratoga, CA (US); C. Douglass Thomas, Saratoga, CA (US); Peter P. Tong, Mountain View, CA (US)

(73) Assignee: IngenioSpec, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,802

(22) Filed: Nov. 27, 2023

(65) Prior Publication Data
US 2024/0094800 A1 Mar. 21, 2024

Related U.S. Application Data

(60) Continuation of application No. 18/224,793, filed on Jul. 21, 2023, now Pat. No. 11,829,518, which is a
(Continued)

(51) Int. Cl.
*H04R 3/00* (2006.01)
*G02C 5/00* (2006.01)
(Continued)

(52) U.S. Cl.
CPC ............... *G06F 3/01* (2013.01); *G02C 5/001* (2013.01); *G02C 5/14* (2013.01); *G02C 5/143* (2013.01);
(Continued)

(58) Field of Classification Search
CPC .. G06F 3/01; G02C 5/001; G02C 5/14; G02C 11/10; G10L 15/22
(Continued)

(56) References Cited

U.S. PATENT DOCUMENTS

| | | |
|---|---|---|
| 320,558 A | 6/1885 | Hull |
| 669,949 A | 3/1901 | Underwood |
| (Continued) | | |

FOREIGN PATENT DOCUMENTS

| | | |
|---|---|---|
| CA | 2233047 C | 3/1998 |
| CA | 2316473 A1 | 7/2000 |
| (Continued) | | |

OTHER PUBLICATIONS

Notice of Allowance for U.S. Appl. No. 11/183,269, dated Dec. 10, 2010.
(Continued)

*Primary Examiner* — Ammar T Hamid

(57) ABSTRACT

In one embodiment, an eyewear frame for a user includes at least a front portion with two side portions; two speakers, one in each side portion; a connection region at one side portion, with an electrical connector having two conductive pads to connect to corresponding conductive contacts of a counterpart connector; a rechargeable battery; a microphone in the frame; and wireless communication circuitry in the frame. The connection region can be provided at an inside surface of one of the side portions. The eyewear frame can also include a touch-sensitive input surface on the eyewear frame configured to provide an input to the frame to perform a function. Another embodiment includes a headset with an electrical connector having a conductive pad to connect to a corresponding conductive contact of a counterpart connector. The headset can also include a touch-sensitive input surface.

25 Claims, 42 Drawing Sheets

Related U.S. Application Data division of application No. 18/129,660, filed on Mar. 31, 2023, now Pat. No. 11,803,069, which is a continuation of application No. 16/424,018, filed on May 28, 2019, now Pat. No. 11,630,331, which is a continuation of application No. 13/831,419, filed on Mar. 14, 2013, now Pat. No. 10,345,625, which is a continuation of application No. 13/291,020, filed on Nov. 7, 2011, now Pat. No. 8,430,507, which is a continuation of application No. 12/803,732, filed on Jul. 1, 2010, now Pat. No. 8,434,863, which is a continuation of application No. 11/546,685, filed on Oct. 11, 2006, now Pat. No. 7,806,525, which is a continuation-in-part of application No. 11/183,256, filed on Jul. 15, 2005, now Pat. No. 7,500,747.

(60) Provisional application No. 60/846,150, filed on Sep. 20, 2006, provisional application No. 60/787,850, filed on Apr. 1, 2006, provisional application No. 60/725,999, filed on Oct. 11, 2005, provisional application No. 60/725,896, filed on Oct. 11, 2005, provisional application No. 60/647,826, filed on Jan. 31, 2005, provisional application No. 60/647,836, filed on Jan. 31, 2005, provisional application No. 60/620,238, filed on Oct. 18, 2004, provisional application No. 60/618,107, filed on Oct. 12, 2004, provisional application No. 60/605,191, filed on Aug. 28, 2004, provisional application No. 60/592,045, filed on Jul. 28, 2004.

(51) Int. Cl.

| | |
|---|---|
| *G02C 5/14* | (2006.01) |
| *G02C 11/00* | (2006.01) |
| *G06F 1/16* | (2006.01) |
| *G06F 3/01* | (2006.01) |
| *G10L 15/22* | (2006.01) |
| *H03G 3/00* | (2006.01) |

(52) U.S. Cl.
CPC .............. *G02C 11/10* (2013.01); *G06F 1/163* (2013.01); *G10L 15/22* (2013.01)

(58) Field of Classification Search
USPC ........................... 381/111, 104, 110; 351/111
See application file for complete search history.

(56) References Cited

U.S. PATENT DOCUMENTS

| | | |
|---|---|---|
| 1,255,265 A | 2/1918 | Zachara |
| 1,917,745 A | 7/1933 | Weiss |
| 2,249,572 A | 7/1941 | Lieber |
| 2,638,532 A | 5/1953 | Brady |
| 2,725,462 A | 11/1955 | Vorgang |
| 2,794,085 A | 5/1957 | De Angelis |
| 2,818,511 A | 12/1957 | Ullery et al. |
| 2,830,132 A | 4/1958 | Borg |
| 2,874,230 A | 2/1959 | Carlson |
| 2,904,670 A | 9/1959 | Calmes |
| 3,060,308 A | 10/1962 | Fortuna |
| 3,104,290 A | 9/1963 | Rosemond et al. |
| 3,119,903 A | 1/1964 | Rosemond et al. |
| 3,597,054 A | 8/1971 | Winter |
| 3,710,115 A | 1/1973 | Jubb |
| 3,858,001 A | 12/1974 | Bonne |
| 3,883,701 A | 5/1975 | Delorenzo |
| 4,165,487 A | 8/1979 | Corderman |
| 4,254,451 A | 3/1981 | Cochran, Jr. |
| 4,283,127 A | 8/1981 | Rosenwinkel et al. |
| 4,322,585 A | 3/1982 | Liautaud |
| 4,348,664 A | 9/1982 | Boschetti et al. |
| 4,389,217 A | 6/1983 | Baughman et al. |
| 4,526,473 A | 7/1985 | Zahn, III |
| 4,535,244 A | 8/1985 | Burnham |
| 4,608,492 A | 8/1986 | Burnham |
| 4,683,587 A | 7/1987 | Silverman |
| 4,751,691 A | 6/1988 | Perera |
| 4,757,714 A | 7/1988 | Purdy et al. |
| 4,773,095 A | 9/1988 | Zwicker et al. |
| 4,806,011 A | 2/1989 | Bettinger |
| 4,822,160 A | 4/1989 | Tsai |
| 4,822,161 A | 4/1989 | Jimmy |
| 4,851,686 A | 7/1989 | Pearson |
| 4,852,988 A | 8/1989 | Velez et al. |
| 4,856,086 A | 8/1989 | McCullough |
| 4,859,047 A | 8/1989 | Badewitz |
| 4,882,598 A | 11/1989 | Wulf |
| 4,882,769 A | 11/1989 | Gallimore |
| 4,904,078 A | 2/1990 | Gorike |
| 4,942,629 A | 7/1990 | Stadlmann |
| 4,962,469 A | 10/1990 | Ono et al. |
| 4,967,268 A | 10/1990 | Lipton et al. |
| 4,975,584 A | 12/1990 | Benjamin et al. |
| 4,985,632 A | 1/1991 | Bianco et al. |
| 5,008,548 A | 4/1991 | Gat |
| 5,015,086 A | 5/1991 | Okaue et al. |
| 5,020,150 A | 5/1991 | Shannon |
| 5,026,151 A | 6/1991 | Waltuck et al. |
| 5,036,311 A | 7/1991 | Moran et al. |
| 5,050,150 A | 9/1991 | Ikeda |
| 5,064,410 A | 11/1991 | Frenkel et al. |
| 5,093,576 A | 3/1992 | Edmond et al. |
| 5,106,179 A | 4/1992 | Kamaya et al. |
| 5,144,344 A | 9/1992 | Takahashi et al. |
| 5,148,023 A | 9/1992 | Hayashi et al. |
| 5,151,600 A | 9/1992 | Black |
| 5,161,250 A | 11/1992 | Ianna et al. |
| 5,172,256 A | 12/1992 | Sethofer et al. |
| 5,184,156 A | 2/1993 | Black et al. |
| 5,264,877 A | 11/1993 | Hussey |
| 5,306,917 A | 4/1994 | Black et al. |
| 5,353,378 A | 10/1994 | Hoffman et al. |
| 5,359,370 A | 10/1994 | Mugnier |
| 5,359,444 A | 10/1994 | Piosenka et al. |
| 5,367,345 A | 11/1994 | da Silva |
| 5,379,464 A | 1/1995 | Schleger et al. |
| 5,382,986 A | 1/1995 | Black et al. |
| 5,394,005 A | 2/1995 | Brown et al. |
| 5,452,026 A | 9/1995 | Marcy, III |
| 5,452,480 A | 9/1995 | Ryden |
| 5,455,637 A | 10/1995 | Kallman et al. |
| 5,455,640 A | 10/1995 | Gertsikov |
| 5,457,751 A | 10/1995 | Such |
| 5,463,428 A | 10/1995 | Lipton et al. |
| 5,475,798 A | 12/1995 | Handlos |
| 5,495,576 A | 2/1996 | Ritchey |
| 5,500,532 A | 3/1996 | Kozicki |
| D369,167 S | 4/1996 | Hanson et al. |
| 5,510,961 A | 4/1996 | Peng |
| 5,513,384 A | 4/1996 | Brennan et al. |
| 5,519,781 A | 5/1996 | Kurkurudza |
| 5,533,130 A | 7/1996 | Staton |
| 5,541,641 A | 7/1996 | Shimada |
| 5,581,090 A | 12/1996 | Goudjil |
| 5,583,795 A | 12/1996 | Smyth |
| 5,585,871 A | 12/1996 | Linden |
| 5,589,398 A | 12/1996 | Krause et al. |
| 5,590,417 A | 12/1996 | Rydbeck |
| 5,606,743 A | 2/1997 | Vogt et al. |
| 5,608,808 A | 3/1997 | da Silva |
| 5,634,201 A | 5/1997 | Mooring |
| 5,671,035 A | 9/1997 | Barnes |
| 5,686,727 A | 11/1997 | Reenstra et al. |
| 5,694,475 A | 12/1997 | Boyden |
| 5,715,323 A | 2/1998 | Walker |
| 5,737,436 A | 4/1998 | Boyden et al. |
| 5,777,715 A | 7/1998 | Kruegle et al. |
| 5,790,311 A | 8/1998 | Togino |
| 5,818,381 A | 10/1998 | Williams |
| 5,819,183 A | 10/1998 | Voroba et al. |

(56) References Cited

U.S. PATENT DOCUMENTS

| | | |
|---|---|---|
| 5,835,185 A | 11/1998 | Kallman et al. |
| 5,841,507 A | 11/1998 | Barnes |
| 5,900,720 A | 5/1999 | Kallman et al. |
| 5,903,395 A | 5/1999 | Rallison et al. |
| 5,923,398 A | 7/1999 | Goldman |
| 5,941,837 A | 8/1999 | Amano et al. |
| 5,946,071 A | 8/1999 | Feldman |
| 5,949,516 A | 9/1999 | McCurdy |
| 5,966,680 A | 10/1999 | Butnaru |
| 5,966,746 A | 10/1999 | Reedy et al. |
| 5,980,037 A | 11/1999 | Conway |
| 5,988,812 A | 11/1999 | Wingate |
| 5,991,085 A | 11/1999 | Rallison et al. |
| 5,992,996 A | 11/1999 | Sawyer |
| 5,995,592 A | 11/1999 | Shirai et al. |
| 6,010,216 A | 1/2000 | Jesiek |
| 6,013,919 A | 1/2000 | Schneider et al. |
| 6,028,627 A | 2/2000 | Helmsderfer |
| 6,046,455 A | 4/2000 | Ribi et al. |
| 6,060,321 A | 5/2000 | Hovorka |
| 6,061,580 A | 5/2000 | Altschul et al. |
| 6,091,546 A | 7/2000 | Spitzer |
| 6,091,832 A | 7/2000 | Shurman et al. |
| 6,099,124 A | 8/2000 | Hidaji |
| 6,115,177 A | 9/2000 | Vossler |
| 6,132,681 A | 10/2000 | Faran et al. |
| 6,145,983 A | 11/2000 | Schiffer |
| 6,154,552 A | 11/2000 | Koroljow et al. |
| 6,163,281 A | 12/2000 | Torch |
| 6,176,576 B1 | 1/2001 | Green et al. |
| 6,225,897 B1 | 5/2001 | Doyle et al. |
| 6,231,181 B1 | 5/2001 | Swab |
| 6,236,969 B1 | 5/2001 | Ruppert et al. |
| 6,243,578 B1 | 6/2001 | Koike |
| 6,244,703 B1 | 6/2001 | Resnikoff et al. |
| 6,259,367 B1 | 7/2001 | Klein |
| 6,270,466 B1 | 8/2001 | Weinstein et al. |
| 6,292,213 B1 | 9/2001 | Jones |
| 6,292,685 B1 | 9/2001 | Pompei |
| 6,301,050 B1 | 10/2001 | DeLeon |
| 6,301,367 B1 | 10/2001 | Boyden et al. |
| 6,307,526 B1 | 10/2001 | Mann |
| 6,311,155 B1 | 10/2001 | Vaudrey et al. |
| 6,343,858 B1 | 2/2002 | Zelman |
| 6,346,929 B1 | 2/2002 | Fukushima et al. |
| 6,349,001 B1 | 2/2002 | Spitzer |
| 6,349,422 B1 | 2/2002 | Schleger et al. |
| 6,409,335 B1 | 6/2002 | Lipawsky |
| 6,409,338 B1 | 6/2002 | Jewell |
| 6,426,719 B1 | 7/2002 | Nagareda et al. |
| 6,431,705 B1 | 8/2002 | Linden |
| 6,433,760 B1 | 8/2002 | Vaissie et al. |
| 6,474,816 B2 | 11/2002 | Butler et al. |
| 6,478,736 B1 | 11/2002 | Mault |
| 6,491,391 B1 | 12/2002 | Blum et al. |
| 6,506,142 B2 | 1/2003 | Itoh et al. |
| 6,511,175 B2 | 1/2003 | Hay et al. |
| 6,513,532 B2 | 2/2003 | Mault et al. |
| 6,517,203 B1 | 2/2003 | Blum et al. |
| 6,539,336 B1 | 3/2003 | Vock et al. |
| 6,542,081 B2 | 4/2003 | Torch |
| 6,546,101 B1 | 4/2003 | Murray et al. |
| 6,554,763 B1 | 4/2003 | Amano et al. |
| 6,563,532 B1 | 5/2003 | Strub et al. |
| 6,582,075 B1 | 6/2003 | Swab et al. |
| 6,619,799 B1 | 9/2003 | Blum et al. |
| 6,629,076 B1 | 9/2003 | Haken |
| 6,678,381 B1 | 1/2004 | Manabe |
| 6,717,737 B1 | 4/2004 | Haglund |
| 6,729,726 B2 | 5/2004 | Miller et al. |
| 6,736,759 B1 | 5/2004 | Stubbs et al. |
| 6,764,194 B1 | 7/2004 | Cooper |
| 6,769,767 B2 * | 8/2004 | Swab ............... H04W 56/0015 351/158 |
| 6,771,294 B1 | 8/2004 | Pulli et al. |
| 6,771,423 B2 | 8/2004 | Geist |
| 6,788,309 B1 | 9/2004 | Swan et al. |
| 6,792,401 B1 | 9/2004 | Nigro et al. |
| 6,816,314 B2 | 11/2004 | Shimizu et al. |
| 6,824,265 B1 | 11/2004 | Harper |
| 6,847,336 B1 | 1/2005 | Lemelson et al. |
| 6,857,741 B2 | 2/2005 | Blum et al. |
| 6,871,951 B2 | 3/2005 | Blum et al. |
| 6,879,930 B2 | 4/2005 | Sinclair et al. |
| 6,912,386 B1 | 6/2005 | Himberg et al. |
| 6,929,365 B2 | 8/2005 | Swab et al. |
| 6,932,090 B1 | 8/2005 | Reschke et al. |
| 6,943,754 B2 | 9/2005 | Aughey et al. |
| 6,947,219 B1 | 9/2005 | Ou |
| 6,977,776 B2 | 12/2005 | Volkenandt et al. |
| 7,004,582 B2 | 2/2006 | Jannard et al. |
| 7,013,009 B2 | 3/2006 | Warren |
| 7,023,594 B2 | 4/2006 | Blum et al. |
| 7,030,902 B2 | 4/2006 | Jacobs |
| 7,031,667 B2 | 4/2006 | Horiguchi |
| 7,033,025 B2 | 4/2006 | Winterbotham |
| 7,059,717 B2 | 6/2006 | Bloch |
| 7,073,905 B2 | 7/2006 | Da Pra' |
| 7,079,876 B2 | 7/2006 | Levy |
| 7,123,215 B2 | 10/2006 | Nakada |
| 7,148,489 B2 | 12/2006 | Yagi |
| 7,150,526 B2 | 12/2006 | Jannard et al. |
| 7,192,136 B2 | 3/2007 | Howell et al. |
| 7,255,437 B2 | 8/2007 | Howell et al. |
| 7,265,358 B2 | 9/2007 | Fontaine |
| 7,274,292 B2 | 9/2007 | Velhal et al. |
| 7,278,734 B2 | 10/2007 | Jannard et al. |
| 7,289,767 B2 | 10/2007 | Lai |
| 7,312,699 B2 | 12/2007 | Chornenky |
| 7,331,666 B2 | 2/2008 | Swab et al. |
| 7,347,551 B2 | 3/2008 | Fergason et al. |
| 7,376,238 B1 | 5/2008 | Rivas et al. |
| 7,380,936 B2 | 6/2008 | Howell et al. |
| 7,401,918 B2 | 7/2008 | Howell et al. |
| 7,405,801 B2 | 7/2008 | Jacobs |
| 7,429,965 B2 | 9/2008 | Weiner |
| 7,430,299 B2 | 9/2008 | Armstrong et al. |
| 7,438,409 B2 | 10/2008 | Jordan |
| 7,438,410 B1 | 10/2008 | Howell et al. |
| 7,445,332 B2 | 11/2008 | Jannard et al. |
| 7,481,531 B2 | 1/2009 | Howell et al. |
| 7,488,294 B2 | 2/2009 | Torch |
| 7,500,746 B1 | 3/2009 | Howell et al. |
| 7,500,747 B2 | 3/2009 | Howell et al. |
| 7,512,414 B2 | 3/2009 | Jannard et al. |
| 7,517,083 B2 | 4/2009 | Blum et al. |
| 7,527,374 B2 | 5/2009 | Chou |
| 7,543,934 B2 | 6/2009 | Howell et al. |
| 7,581,833 B2 | 9/2009 | Howell et al. |
| 7,621,634 B2 | 11/2009 | Howell et al. |
| 7,648,236 B1 | 1/2010 | Dobson |
| 7,651,220 B1 | 1/2010 | Pattikonda |
| 7,677,723 B2 | 3/2010 | Howell et al. |
| 7,760,898 B2 | 7/2010 | Howell et al. |
| 7,771,046 B2 | 8/2010 | Howell et al. |
| 7,787,647 B2 | 8/2010 | Hagen et al. |
| 7,792,552 B2 | 9/2010 | Thomas et al. |
| 7,801,570 B2 | 9/2010 | Cheung et al. |
| 7,806,525 B2 | 10/2010 | Howell et al. |
| 7,922,321 B2 | 4/2011 | Howell et al. |
| 7,976,159 B2 | 7/2011 | Jacobs et al. |
| 8,009,849 B2 | 8/2011 | Enzmann |
| 8,109,629 B2 | 2/2012 | Howell et al. |
| 8,142,015 B2 | 3/2012 | Paolino |
| 8,174,569 B2 | 5/2012 | Tanijiri et al. |
| 8,175,886 B2 | 5/2012 | Odinak |
| 8,251,875 B2 | 8/2012 | Ellis et al. |
| 8,337,013 B2 | 12/2012 | Howell et al. |
| 8,408,699 B2 | 4/2013 | Blum et al. |
| 8,430,507 B2 | 4/2013 | Howell et al. |
| 8,434,863 B2 | 5/2013 | Howell et al. |
| 8,465,151 B2 | 6/2013 | Howell et al. |
| 8,485,661 B2 | 7/2013 | Yoo et al. |
| 8,500,271 B2 | 8/2013 | Howell et al. |

(56) References Cited

U.S. PATENT DOCUMENTS

| | | |
|---|---|---|
| 8,571,241 B2 | 10/2013 | Larsen |
| 8,582,789 B2 | 11/2013 | Cheung et al. |
| 8,620,208 B2 | 12/2013 | Slotznick |
| 8,626,246 B2 | 1/2014 | Shostak |
| 8,770,742 B2 | 7/2014 | Howell et al. |
| 8,849,185 B2 | 9/2014 | Cheung et al. |
| 8,905,542 B2 | 12/2014 | Howell et al. |
| 8,931,896 B2 | 1/2015 | Blum et al. |
| 9,033,493 B2 | 5/2015 | Howell et al. |
| 9,183,351 B2 | 11/2015 | Shusterman |
| 9,244,292 B2 | 1/2016 | Swab et al. |
| 9,369,814 B2 | 6/2016 | Victorian et al. |
| 9,400,390 B2 | 7/2016 | Osterhout et al. |
| 9,405,135 B2 | 8/2016 | Sweis et al. |
| 9,488,520 B2 | 11/2016 | Howell et al. |
| 9,547,184 B2 | 1/2017 | Howell et al. |
| 9,690,121 B2 | 6/2017 | Howell et al. |
| 9,922,236 B2 | 3/2018 | Moore et al. |
| 10,042,186 B2 | 8/2018 | Chao et al. |
| 10,060,790 B2 | 8/2018 | Howell et al. |
| 10,061,144 B2 | 8/2018 | Howell et al. |
| 10,310,296 B2 | 6/2019 | Howell et al. |
| 10,345,625 B2 | 7/2019 | Howell et al. |
| 10,359,311 B2 | 7/2019 | Howell et al. |
| 10,515,623 B1 | 12/2019 | Grizzel |
| 10,539,459 B2 | 1/2020 | Howell et al. |
| 10,571,715 B2 | 2/2020 | Rizzo, III et al. |
| 10,624,790 B2 | 4/2020 | Chao et al. |
| 10,777,048 B2 | 9/2020 | Howell et al. |
| 10,802,582 B1 | 10/2020 | Clements |
| 10,964,190 B2 | 3/2021 | Peyrard |
| 11,042,045 B2 | 6/2021 | Chao et al. |
| 11,069,358 B1 | 7/2021 | Harper |
| 11,086,147 B2 | 8/2021 | Howell et al. |
| 11,204,512 B2 | 12/2021 | Howell et al. |
| 11,243,416 B2 | 2/2022 | Howell et al. |
| 11,326,941 B2 | 5/2022 | Howell et al. |
| 11,480,802 B1 | 10/2022 | Tombelli |
| 11,513,371 B2 | 11/2022 | Howell et al. |
| 11,536,988 B2 | 12/2022 | Howell et al. |
| 11,630,331 B2 | 4/2023 | Howell et al. |
| 11,644,361 B2 | 5/2023 | Howell et al. |
| 11,644,693 B2 | 5/2023 | Howell et al. |
| 11,721,183 B2 | 8/2023 | Howell et al. |
| 11,733,549 B2 | 8/2023 | Howell et al. |
| 11,762,224 B2 | 9/2023 | Howell et al. |
| 11,803,069 B2 | 10/2023 | Howell et al. |
| 11,829,518 B1 | 11/2023 | Howell et al. |
| 2001/0005230 A1 | 6/2001 | Ishikawa |
| 2001/0028309 A1 | 10/2001 | Torch |
| 2001/0050754 A1 | 12/2001 | Hay et al. |
| 2002/0017997 A1 | 2/2002 | Felkowitz |
| 2002/0021407 A1 | 2/2002 | Elliott |
| 2002/0081982 A1 | 6/2002 | Schwartz et al. |
| 2002/0084990 A1 | 7/2002 | Peterson, III |
| 2002/0089639 A1 | 7/2002 | Starner et al. |
| 2002/0090103 A1 | 7/2002 | Calisto, Jr. |
| 2002/0098877 A1 | 7/2002 | Glezerman |
| 2002/0101568 A1 | 8/2002 | Eberl et al. |
| 2002/0109600 A1 | 8/2002 | Mault et al. |
| 2002/0136414 A1 | 9/2002 | Jordan et al. |
| 2002/0140899 A1 | 10/2002 | Blum et al. |
| 2002/0146097 A1 | 10/2002 | Vuori |
| 2002/0159023 A1 | 10/2002 | Swab |
| 2002/0197961 A1 | 12/2002 | Warren |
| 2003/0018274 A1 | 1/2003 | Takahashi et al. |
| 2003/0022690 A1 | 1/2003 | Beyda et al. |
| 2003/0030597 A1 | 2/2003 | Geist |
| 2003/0032449 A1 | 2/2003 | Giobbi |
| 2003/0045283 A1 | 3/2003 | Hagedoorn |
| 2003/0062046 A1 | 4/2003 | Wiesmann et al. |
| 2003/0063763 A1 | 4/2003 | Allred et al. |
| 2003/0064746 A1 | 4/2003 | Rader et al. |
| 2003/0065257 A1 | 4/2003 | Mault et al. |
| 2003/0067585 A1 | 4/2003 | Miller et al. |
| 2003/0068057 A1 | 4/2003 | Miller et al. |
| 2003/0083591 A1 | 5/2003 | Edwards et al. |
| 2003/0091200 A1 | 5/2003 | Pompei |
| 2003/0214630 A1 | 11/2003 | Winterbotham |
| 2003/0226978 A1 | 12/2003 | Ribi et al. |
| 2003/0231293 A1 | 12/2003 | Blum et al. |
| 2004/0000733 A1 | 1/2004 | Swab et al. |
| 2004/0005069 A1 | 1/2004 | Buck |
| 2004/0029582 A1 | 2/2004 | Swab et al. |
| 2004/0059212 A1 | 3/2004 | Abreu |
| 2004/0063378 A1 | 4/2004 | Nelson |
| 2004/0096078 A1 | 5/2004 | Lin |
| 2004/0100384 A1 | 5/2004 | Chen et al. |
| 2004/0101178 A1 | 5/2004 | Fedorovskaya et al. |
| 2004/0104864 A1 | 6/2004 | Nakada |
| 2004/0114770 A1 | 6/2004 | Pompei |
| 2004/0128737 A1 | 7/2004 | Gesten |
| 2004/0150986 A1 | 8/2004 | Chang |
| 2004/0156012 A1 | 8/2004 | Jannard et al. |
| 2004/0157649 A1 | 8/2004 | Jannard et al. |
| 2004/0160571 A1 | 8/2004 | Jannard |
| 2004/0160572 A1 | 8/2004 | Jannard |
| 2004/0160573 A1 | 8/2004 | Jannard et al. |
| 2004/0197002 A1 | 10/2004 | Atsumi et al. |
| 2004/0227219 A1 | 11/2004 | Su |
| 2005/0036103 A1 | 2/2005 | Bloch |
| 2005/0067580 A1 | 3/2005 | Fontaine |
| 2005/0078274 A1 | 4/2005 | Howell et al. |
| 2005/0088365 A1 | 4/2005 | Yamazaki et al. |
| 2005/0090295 A1 | 4/2005 | Ali et al. |
| 2005/0201585 A1 | 9/2005 | Jannard et al. |
| 2005/0213026 A1 | 9/2005 | Da Pra' |
| 2005/0230596 A1 | 10/2005 | Howell et al. |
| 2005/0238194 A1 | 10/2005 | Chornenky |
| 2005/0239502 A1 | 10/2005 | Swab et al. |
| 2005/0248717 A1 | 11/2005 | Howell et al. |
| 2005/0248718 A1 | 11/2005 | Howell et al. |
| 2005/0248719 A1 | 11/2005 | Howell et al. |
| 2005/0264752 A1 | 12/2005 | Howell et al. |
| 2005/0278446 A1 | 12/2005 | Bryant |
| 2005/0281440 A1 | 12/2005 | Pemer |
| 2006/0001827 A1 | 1/2006 | Howell et al. |
| 2006/0003803 A1 | 1/2006 | Thomas et al. |
| 2006/0023158 A1 | 2/2006 | Howell et al. |
| 2006/0034478 A1 | 2/2006 | Davenport |
| 2006/0107822 A1 | 5/2006 | Bowen |
| 2006/0132382 A1 | 6/2006 | Jannard |
| 2006/0203183 A1 | 9/2006 | Jannard et al. |
| 2006/0291667 A1 | 12/2006 | Watanabe et al. |
| 2007/0030442 A1 | 2/2007 | Howell et al. |
| 2007/0035830 A1 | 2/2007 | Matveev et al. |
| 2007/0046887 A1 | 3/2007 | Howell et al. |
| 2007/0055888 A1 | 3/2007 | Miller et al. |
| 2007/0098192 A1 | 5/2007 | Sipkema |
| 2007/0109491 A1 | 5/2007 | Howell et al. |
| 2007/0182812 A1 | 8/2007 | Ritchey |
| 2007/0186330 A1 | 8/2007 | Howell et al. |
| 2007/0189548 A1 | 8/2007 | Croft |
| 2007/0200927 A1 | 8/2007 | Krenik |
| 2007/0208531 A1 | 9/2007 | Darley et al. |
| 2007/0211574 A1 | 9/2007 | Croft |
| 2007/0248238 A1 | 10/2007 | Abreu et al. |
| 2007/0270663 A1 | 11/2007 | Ng et al. |
| 2007/0271065 A1 | 11/2007 | Gupta et al. |
| 2007/0271116 A1 | 11/2007 | Wysocki et al. |
| 2007/0271387 A1 | 11/2007 | Lydon et al. |
| 2007/0279584 A1 | 12/2007 | Howell et al. |
| 2008/0024594 A1 | 1/2008 | Ritchey |
| 2008/0062338 A1 | 3/2008 | Herzog et al. |
| 2008/0068559 A1 | 3/2008 | Howell et al. |
| 2008/0089545 A1 | 4/2008 | Jannard et al. |
| 2008/0100792 A1 | 5/2008 | Blum et al. |
| 2008/0144854 A1 | 6/2008 | Abreu |
| 2008/0151175 A1 | 6/2008 | Gross |
| 2008/0151179 A1 | 6/2008 | Howell et al. |
| 2008/0158506 A1 | 7/2008 | Fuziak |
| 2008/0211921 A1 | 9/2008 | Sako et al. |
| 2008/0218684 A1 | 9/2008 | Howell et al. |
| 2008/0262392 A1 | 10/2008 | Ananny et al. |

(56) References Cited

U.S. PATENT DOCUMENTS

| | | |
|---|---|---|
| 2008/0278678 A1 | 11/2008 | Howell et al. |
| 2009/0059159 A1 | 3/2009 | Howell et al. |
| 2009/0059381 A1 | 3/2009 | Jannard |
| 2009/0073375 A1 | 3/2009 | Nakada |
| 2009/0141233 A1 | 6/2009 | Howell et al. |
| 2009/0147215 A1 | 6/2009 | Howell et al. |
| 2009/0156128 A1 | 6/2009 | Franson et al. |
| 2009/0251660 A1 | 10/2009 | Figler et al. |
| 2009/0251661 A1 | 10/2009 | Fuziak, Jr. |
| 2009/0296044 A1 | 12/2009 | Howell et al. |
| 2010/0045928 A1 | 2/2010 | Levy |
| 2010/0061579 A1 | 3/2010 | Rickards et al. |
| 2010/0079356 A1 | 4/2010 | Hoellwarth |
| 2010/0105445 A1 | 4/2010 | Brunton et al. |
| 2010/0110368 A1 | 5/2010 | Chaum |
| 2010/0245754 A1 | 9/2010 | Matsumoto et al. |
| 2010/0296045 A1 | 11/2010 | Agnoli et al. |
| 2010/0309426 A1 | 12/2010 | Howell et al. |
| 2011/0102734 A1 | 5/2011 | Howell et al. |
| 2011/0164122 A1 | 7/2011 | Hardacker |
| 2011/0187990 A1 | 8/2011 | Howell et al. |
| 2011/0241976 A1 | 10/2011 | Boger et al. |
| 2011/0273365 A1 | 11/2011 | West et al. |
| 2011/0292333 A1 | 12/2011 | Kozaki et al. |
| 2012/0033061 A1 | 2/2012 | Ko et al. |
| 2012/0050668 A1 | 3/2012 | Howell et al. |
| 2012/0062357 A1 | 3/2012 | Slamka |
| 2012/0101411 A1 | 4/2012 | Hausdorff et al. |
| 2012/0133885 A1 | 5/2012 | Howell et al. |
| 2012/0176580 A1 | 7/2012 | Sonsino |
| 2012/0283894 A1 | 11/2012 | Naboulsi |
| 2013/0072828 A1 | 3/2013 | Sweis et al. |
| 2013/0077175 A1 | 3/2013 | Hotta et al. |
| 2013/0143519 A1 | 6/2013 | Doezema |
| 2013/0172691 A1 | 7/2013 | Tran |
| 2013/0201440 A1 | 8/2013 | Howell et al. |
| 2013/0308089 A1 | 11/2013 | Howell et al. |
| 2014/0049831 A1 | 2/2014 | Takeda et al. |
| 2014/0132913 A1 | 5/2014 | Sweis et al. |
| 2014/0176902 A1 | 6/2014 | Sweis et al. |
| 2014/0198293 A1 | 7/2014 | Sweis et al. |
| 2014/0226838 A1 | 8/2014 | Wingate et al. |
| 2014/0268008 A1 | 9/2014 | Howell et al. |
| 2014/0268013 A1 | 9/2014 | Howell et al. |
| 2014/0268017 A1 | 9/2014 | Sweis et al. |
| 2014/0361185 A1 | 12/2014 | Howell et al. |
| 2015/0085245 A1 | 3/2015 | Howell et al. |
| 2015/0230988 A1 | 8/2015 | Chao et al. |
| 2015/0253590 A1 | 9/2015 | Howell et al. |
| 2015/0277123 A1 | 10/2015 | Chaum et al. |
| 2015/0338677 A1 | 11/2015 | Block |
| 2016/0098874 A1 | 4/2016 | Handville et al. |
| 2016/0246075 A9 | 8/2016 | Howell et al. |
| 2016/0302992 A1 | 10/2016 | Sweis et al. |
| 2017/0068117 A9 | 3/2017 | Howell et al. |
| 2017/0074721 A1 | 3/2017 | Howell et al. |
| 2017/0090219 A1 | 3/2017 | Howell et al. |
| 2017/0131575 A1 | 5/2017 | Howell et al. |
| 2017/0146829 A1 | 5/2017 | Howell et al. |
| 2017/0289323 A1 | 10/2017 | Gelvin et al. |
| 2017/0303187 A1 | 10/2017 | Crouthamel et al. |
| 2018/0122208 A1 | 5/2018 | Peyrard |
| 2018/0314079 A1 | 11/2018 | Chao et al. |
| 2018/0335650 A1 | 11/2018 | Howell et al. |
| 2018/0348050 A1 | 12/2018 | Howell et al. |
| 2019/0004325 A1 | 1/2019 | Connor |
| 2019/0033622 A1 | 1/2019 | Olgun et al. |
| 2019/0033623 A1 | 1/2019 | Howell et al. |
| 2019/0117121 A1 | 4/2019 | Kutina et al. |
| 2019/0187492 A1 | 6/2019 | Howell et al. |
| 2019/0272800 A1 | 9/2019 | Tao et al. |
| 2019/0278110 A1 | 9/2019 | Howell et al. |
| 2019/0285913 A1 | 9/2019 | Howell et al. |
| 2019/0310132 A1 | 10/2019 | Howell et al. |
| 2019/0318589 A1 | 10/2019 | Howell et al. |
| 2019/0369402 A1 | 12/2019 | Woodman et al. |
| 2019/0378493 A1 | 12/2019 | Kim et al. |
| 2019/0387351 A1 | 12/2019 | Lyren et al. |
| 2020/0012127 A1 | 1/2020 | Howell et al. |
| 2020/0218094 A1 | 7/2020 | Howell et al. |
| 2020/0363835 A1 | 11/2020 | Blum et al. |
| 2020/0364992 A1 | 11/2020 | Howell et al. |
| 2021/0000347 A1 | 1/2021 | Stump |
| 2021/0026146 A1 | 1/2021 | Harder et al. |
| 2021/0271116 A1 | 9/2021 | Chao et al. |
| 2021/0364827 A9 | 11/2021 | Howell et al. |
| 2021/0364828 A1 | 11/2021 | Howell et al. |
| 2021/0373595 A1 | 12/2021 | Castaneda et al. |
| 2021/0379425 A1 | 12/2021 | Tran |
| 2021/0399691 A1 | 12/2021 | Saminathan et al. |
| 2022/0008763 A1 | 1/2022 | Saleh et al. |
| 2022/0011603 A1 | 1/2022 | Howell et al. |
| 2022/0034542 A1 | 2/2022 | Peters et al. |
| 2022/0054092 A1 | 2/2022 | Howell et al. |
| 2022/0178743 A1 | 6/2022 | Howell et al. |
| 2022/0260859 A1 | 8/2022 | Howell et al. |
| 2022/0335792 A1 | 10/2022 | Howell et al. |
| 2022/0357599 A1 | 11/2022 | Howell et al. |
| 2022/0415338 A1 | 12/2022 | Cheung et al. |
| 2023/0017635 A1 | 1/2023 | Howell et al. |
| 2023/0033660 A1 | 2/2023 | Howell et al. |
| 2023/0057654 A1 | 2/2023 | Howell et al. |
| 2023/0236444 A1 | 7/2023 | Howell et al. |
| 2023/0273464 A1 | 8/2023 | Howell et al. |
| 2023/0359266 A1 | 11/2023 | Howell et al. |
| 2023/0393422 A1 | 12/2023 | Moubedi et al. |
| 2023/0408850 A1 | 12/2023 | Howell et al. |
| 2024/0036361 A1 | 2/2024 | Howell et al. |

FOREIGN PATENT DOCUMENTS

| | | |
|---|---|---|
| CA | 2362895 A1 | 12/2002 |
| CA | 2 487 391 | 12/2003 |
| CA | 2388766 A1 | 12/2003 |
| CA | 2435873 C | 3/2004 |
| CN | 88203065 | 11/1988 |
| CN | 89214222.7 | 3/1990 |
| CN | 90208199.3 | 11/1990 |
| DE | 10123226 A1 | 11/2002 |
| EP | 0441791 B1 | 8/1991 |
| EP | 1134491 A2 | 9/2001 |
| EP | 1027626 B1 | 3/2016 |
| EP | 2290433 B1 | 4/2016 |
| FR | 2530039 A1 | 1/1984 |
| GB | 1467982 | 3/1977 |
| JP | 58-113912 | 7/1983 |
| JP | 58-113914 | 7/1983 |
| JP | 63-153218 | 10/1988 |
| JP | H02-159272 A | 6/1990 |
| JP | 02-181722 | 7/1990 |
| JP | H02-10252 U | 8/1990 |
| JP | 09-017204 | 1/1997 |
| JP | 10-161072 | 6/1998 |
| JP | 2000-039595 | 2/2000 |
| JP | 2002-02511706 A | 4/2002 |
| JP | 2002 341059 A | 11/2002 |
| JP | 2005-151292 | 6/2005 |
| JP | 2005-167902 | 6/2005 |
| JP | 6275987 | 2/2024 |
| KR | 2002-0044416 A | 6/2002 |
| TW | 484711 | 6/2001 |
| WO | 97/12205 A1 | 4/1997 |
| WO | 99/50706 A1 | 10/1999 |
| WO | 01/06298 A1 | 1/2001 |
| WO | 01/24576 A1 | 4/2001 |
| WO | WO 01/84095 A1 | 11/2001 |
| WO | 02/06881 A2 | 1/2002 |
| WO | WO 02/086599 A1 | 10/2002 |
| WO | WO 03/062906 A1 | 7/2003 |
| WO | 03/069394 A1 | 8/2003 |
| WO | 03/100368 A1 | 12/2003 |
| WO | 03/100503 A2 | 12/2003 |
| WO | WO 04/001373 A2 | 12/2003 |

(56) References Cited

FOREIGN PATENT DOCUMENTS

| WO | 04/012477 A2 | 2/2004 |
|---|---|---|
| WO | 04/025554 A1 | 3/2004 |
| WO | WO 05/036110 A1 | 4/2005 |

OTHER PUBLICATIONS

Office Action for U.S. Appl. No. 11/183,269, dated May 25, 2010.
Final Office Action for U.S. Appl. No. 11/183,269, dated Feb. 17, 2010.
Office Action for U.S. Appl. No. 11/183,269, dated Jun. 23, 2009.
Office Action for U.S. Appl. No. 11/183,269, dated Dec. 4, 2008.
Final Office Action for U.S. Appl. No. 11/183,269, dated Jun. 5, 2008.
Office Action for U.S. Appl. No. 11/183,269, dated Oct. 18, 2007.
Restriction Requirement for U.S. Appl. No. 11/183,269, dated Jun. 25, 2007.
Office Action for U.S. Appl. No. 13/085,402, dated Apr. 19, 2012.
Notice of Allowance for U.S. Appl. No. 13/085,402, dated Aug. 2, 2012.
Notice of Allowance for U.S. Appl. No. 13/085,402, dated Nov. 13, 2012.
Notice of Allowance for U.S. Appl. No. 13/085,402, dated Feb. 20, 2013.
Notice of Allowance for U.S. Appl. No. 13/085,402, dated Jun. 14, 2013.
Office Action for U.S. Appl. No. 13/955,336, dated Dec. 5, 2013.
Notice of Allowance for U.S. Appl. No. 13/955,336, dated Apr. 28, 2014.
Notice of Allowance for U.S. Appl. No. 13/955,336, dated Aug. 18, 2014.
Notice of Allowance for U.S. Appl. No. 13/955,336, dated Oct. 7, 2014.
Notice of Allowance for U.S. Appl. No. 13/955,336, dated Nov. 3, 2014.
Office Action for U.S. Appl. No. 14/557,409, dated Jun. 11, 2015.
Notice of Allowance for U.S. Appl. No. 14/557,409, dated Jan. 14, 2016.
Notice of Allowance for U.S. Appl. No. 14/557,409, dated Apr. 28, 2016.
Notice of Allowance for U.S. Appl. No. 14/557,409, dated Aug. 8, 2016.
Notice of Allowance for U.S. Appl. No. 14/557,409, dated Nov. 4, 2016.
Corrected Notice of Allowance for U.S. Appl. No. 14/557,409, dated Dec. 12, 2016.
Office Action for U.S. Appl. No. 15/375,423, dated Mar. 27, 2017.
Notice of Allowance for U.S. Appl. No. 15/375,423, dated Jul. 5, 2017.
Notice of Allowance for U.S. Appl. No. 15/375,423, dated Oct. 31, 2017.
Notice of Allowance for U.S. Appl. No. 15/375,423, dated Mar. 23, 2018.
Notice of Allowance for U.S. Appl. No. 15/375,423, dated Jul. 13, 2018.
Office Action for U.S. Appl. No. 16/049,120, dated Feb. 28, 2020.
Notice of Allowance for U.S. Appl. No. 16/049,120, dated Jun. 3, 2020.
Notice of Allowance for U.S. Appl. No. 16/049,120, dated Sep. 21, 2020.
Notice of Allowance for U.S. Appl. No. 16/049,120, dated Feb. 23, 2021.
Notice of Allowance for U.S. Appl. No. 16/049, 120, dated Jun. 3, 2021.
Notice of Allowance for U.S. Appl. No. 16/049, 120, dated Sep. 20, 2021.
Notice of Allowance for U.S. Appl. No. 16/574,254, dated Apr. 16, 2021.
Notice of Allowance for U.S. Appl. No. 16/574,254, dated Aug. 9, 2021.
Office Action for U.S. Appl. No. 16/821,810, dated Feb. 2, 2022.
Notice of Allowance for U.S. Appl. No. 16/821,810, dated Apr. 6, 2022.
Notice of Allowance for U.S. Appl. No. 16/821,810, dated Oct. 19, 2022.
Office Action for U.S. Appl. No. 17/484,080, dated Jan. 21, 2022.
Notice of Allowance for U.S. Appl. No. 17/484,080, dated May 31, 2022.
Notice of Allowance for U.S. Appl. No. 17/484,080, dated Sep. 13, 2022.
Notice of Allowance for U.S. Appl. No. 17/484,080, dated Jan. 31, 2023.
Notice of Allowance for U.S. Appl. No. 17/484,080, dated Jun. 1, 2023.
Office Action for U.S. Appl. No. 17/949,029, dated Nov. 23, 2022.
Notice of Allowance for U.S. Appl. No. 17/949,029, dated Mar. 1, 2023.
Notice of Allowance for U.S. Appl. No. 17/949,029, dated Jul. 3, 2023.
Office Action for U.S. Appl. No. 17/873,104, dated Oct. 6, 2022.
Office Action for U.S. Appl. No. 17/873,104, dated Nov. 4, 2022.
Notice of Allowance for U.S. Appl. No. 17/873,104, dated Dec. 16, 2022.
Notice of Allowance for U.S. Appl. No. 17/873,104, dated Mar. 22, 2023.
Restriction Requirement for U.S. Appl. No. 11/580,222, dated Jun. 18, 2008.
Office Action for U.S. Appl. No. 11/580,222, dated Sep. 12, 2008.
Office Action for U.S. Appl. No. 11/580,222, dated Jan. 28, 2009.
Notice of Allowance for U.S. Appl. No. 11/580,222, dated Apr. 20, 2009.
U.S. Appl. No. 12/462,286, filed Jul. 31, 2009.
Restriction Requirement for U.S. Appl. No. 12/462,286, dated Sep. 17, 2010.
Office Action for U.S. Appl. No. 12/462,286, dated Jan. 13, 2011.
Notice of Allowance for U.S. Appl. No. 12/462,286, dated Jun. 24, 2011.
Notice of Allowance for U.S. Appl. No. 12/462,286, dated Nov. 22, 2011.
Office Action for U.S. Appl. No. 13/367,346, dated May 15, 2013.
Notice of Allowance for U.S. Appl. No. 13/367,346, dated Oct. 10, 2013.
Office Action for U.S. Appl. No. 13/367,346, dated Jan. 28, 2014.
Notice of Allowance for U.S. Appl. No. 13/367,346, dated Aug. 15, 2014.
Notice of Allowance for U.S. Appl. No. 13/367,346, dated Mar. 19, 2015.
Office Action ffor U.S. Appl. No. 14/715,501, dated Sep. 23, 2015.
Office Action for U.S. Appl. No. 14/715,501, dated Mar. 25, 2016.
Office Action for U.S. Appl. No. 14/715,501, dated Oct. 17, 2016.
Office Action for U.S. Appl. No. 14/715,501, dated Jul. 20, 2017.
Office Action for U.S. Appl. No. 14/715,501, dated Jan. 8, 2018. .
Notice of Allowance for U.S. Appl. No. 14/715,501, dated May 9, 2018.
Notice of Allowance for U.S. Appl. No. 14/715,501, dated Sep. 11, 2018.
Office Action for U.S. Appl. No. 16/127,957, dated Jun. 4, 2020.
Office Action for U.S. Appl. No. 16/127,957, dated Sep. 30, 2020.
Notice of Allowance for U.S. Appl. No. 16/127,957, dated Dec. 21, 2020.
Notice of Allowance for U.S. Appl. No. 17/395,509, dated May 6, 2022.
Notice of Allowance for U.S. Appl. No. 17/395,509, dated Sep. 9, 2022.
Notice of Allowance for U.S. Appl. No. 17/395,509, dated Dec. 19, 2022.
Notice of Allowance for U.S. Appl. No. 17/395,509, dated Apr. 26, 2023.
Notice of Allowance for U.S. Appl. No. 17/737,866, dated Sep. 16, 2022.
Notice of Allowance for U.S. Appl. No. 17/737,866, dated Jan. 17, 2023.

(56) References Cited

OTHER PUBLICATIONS

Notice of Allowance for U.S. Appl. No. 17/737,866, dated May 15, 2023.
Notice of Allowance for U.S. Appl. No. 16/182,969, dated Jan. 28, 2022.
Office Action for U.S. Appl. No. 16/182,969, dated Jun. 24, 2020.
Notice of Allowance for U.S. Appl. No. 16/182,969, dated Oct. 14, 2020.
Notice of Allowance for U.S. Appl. No. 16/182,969, dated Sep. 1, 2021.
Office Action for U.S. Appl. No. 16/182,969, dated Jan. 24, 2023.
Notice of Allowance for U.S. Appl. No. 16/182,969, dated Jun. 30, 2023.
U.S. Appl. No. 12/806,312, filed Aug. 10, 2010.
Office Action for U.S. Appl. No. 12/806,312, dated Apr. 20, 2012.
Office Action for U.S. Appl. No. 12/806,312, dated Sep. 25, 2012.
Notice of Allowance for U.S. Appl. No. 12/806,312, dated Dec. 14, 2012.
Notice of Allowance for U.S. Appl. No. 12/806,312, dated Mar. 29, 2013.
U.S. Appl. No. 13/831,512, filed Mar. 14, 2013.
Office Action for U.S. Appl. No. 13/831,512, dated Jun. 4, 2013.
Office Action for U.S. Appl. No. 13/831,512, dated Feb. 24, 2014.
Office Action for U.S. Appl. No. 13/831,512, dated Jul. 2, 2014. .
Office Action for U.S. Appl. No. 13/831,512, dated Jan. 21, 2015. .
Office Action for U.S. Appl. No. 13/831,512, dated May 29, 2015. .
Office Action for U.S. Appl. No. 13/831,512, dated Feb. 24, 2016. .
Notice of Allowance for U.S. Appl. No. 13/831,512, dated Aug. 1, 2016.
Notice of Allowance for U.S. Appl. No. 13/831,512, dated Oct. 25, 2016.
Notice of Allowance for U.S. Appl. No. 13/831,512, dated Jan. 30, 2017.
Notice of Allowance for U.S. Appl. No. 13/831,512, dated Feb. 21, 2017.
Office Action for U.S. Appl. No. 15/396,428, dated Feb. 16, 2018.
Office Action for U.S. Appl. No. 15/396,428, dated Jun. 21, 2018.
Office Action for U.S. Appl. No. 15/409,723, dated Apr. 23, 2018. .
Office Action for U.S. Appl. No. 15/409,723, dated Oct. 31, 2018. .
Notice of Allowance for U.S. Appl. No. 11/183,256, dated Jan. 13, 2009.
Office Action for U.S. Appl. No. 11/183,256, dated Sep. 12, 2008.
Notice of Allowance for U.S. Appl. No. 11/183,256, dated Jul. 8, 2008.
Office Action for U.S. Appl. No. 11/183,256, dated Jan. 25, 2008.
Restriction Requirement for U.S. Appl. No. 11/183,256, dated Oct. 17, 2007.
Restriction Requirement for U.S. Appl. No. 11/183,256, dated Jun. 28, 2007.
Notice of Allowance for U.S. Appl. No. 11/546,685, dated Feb. 17, 2010.
Notice of Allowance for U.S. Appl. No. 11/546,685, dated Sep. 18, 2009.
Office Action for U.S. Appl. No. 11/546,685, dated Mar. 5, 2009.
Restriction Requirement for U.S. Appl. No. 11/546,685, dated Jan. 27, 2009.
U.S. Appl. No. 12/803,732, filed Jul. 1, 2010.
Notice of Allowance for U.S. Appl. No. 12/803,732, dated Sep. 1, 2011.
Notice of Allowance for U.S. Appl. No. 12/803,732, dated Nov. 15, 2011.
Notice of Allowance for U.S. Appl. No. 12/803,732, dated Jan. 30, 2012.
Notice of Allowance for U.S. Appl. No. 12/803,732, dated Apr. 17, 2012.
Notice of Allowance for U.S. Appl. No. 12/803,732, dated Jul. 5, 2012.
Notice of Allowance for U.S. Appl. No. 12/803,732, dated Oct. 19, 2012.
Notice of Allowance for U.S. Appl. No. 12/803,732, dated Feb. 13, 2013.
Office Action for U.S. Appl. No. 13/291,020, dated Jun. 4, 2012.
Office Action for U.S. Appl. No. 13/291,020, dated Apr. 23, 2012.
Notice of Allowance for U.S. Appl. No. 13/291,020, dated Aug. 2, 2012.
Notice of Allowance for U.S. Appl. No. 13/291,020, dated Nov. 2, 2012.
Notice of Allowance for U.S. Appl. No. 13/291,020, dated Feb. 11, 2013.
U.S. Appl. No. 13/831,419, filed Mar. 14, 2013.
Office Action for U.S. Appl. No. 13/831,419, dated Apr. 27, 2015.
Office Action for U.S. Appl. No. 13/831,419, dated Aug. 12, 2015.
Notice of Allowance for U.S. Appl. No. 13/831,419, dated Jan. 28, 2016.
Office Action for U.S. Appl. No. 13/831,419, dated Apr. 28, 2016.
Office Action for U.S. Appl. No. 13/831,419, dated Nov. 17, 2016.
Office Action for U.S. Appl. No. 13/831,419, dated Feb. 1, 2017.
Notice of Allowance for U.S. Appl. No. 13/831,419, dated Jun. 6, 2017.
Office Action for U.S. Appl. No. 13/831,419, dated Oct. 20, 2017.
Office Action for U.S. Appl. No. 13/831,419, dated Jun. 8, 2018.
U.S. Appl. No. 13/831,445, filed Mar. 14, 2013.
Office Action for U.S. Appl. No. 13/831,445, dated Feb. 20, 2015.
Notice of Allowance for U.S. Appl. No. 13/831,445, dated Oct. 21, 2016.
Notice of Allowance for U.S. Appl. No. 13/831,445, dated Jan. 9, 2017.
Corrected Notice of Allowance for U.S. Appl. No. 13/831,445, dated Jan. 23, 2017.
Notice of Allowance for U.S. Appl. No. 13/831,445, dated Apr. 25, 2017.
Office Action for U.S. Appl. No. 13/831,445, dated Feb. 6, 2018.
Notice of Allowance for U.S. Appl. No. 13/831,445, dated Aug. 8, 2018.
Office Action for U.S. Appl. No. 16/429,181, dated Sep. 30, 2020.
Notice of Allowance for U.S. Appl. No. 16/429,181, dated Feb. 1, 2021.
Notice of Allowance for U.S. Appl. No. 16/429,181, dated Jun. 17, 2021.
Notice of Allowance for U.S. Appl. No. 16/429,181, dated Aug. 19, 2021.
Notice of Allowance for U.S. Appl. No. 16/429,181, dated Oct. 4, 2021.
Office Action for U.S. Appl. No. 16/429,181, dated Feb. 9, 2022.
Notice of Allowance for U.S. Appl. No. 16/429,181, dated Aug. 10, 2022.
Office Action for U.S. Appl. No. 16/424,018, dated Jun. 10, 2020.
Notice of Allowance for U.S. Appl. No. 16/424,018, dated Oct. 20, 2020.
Notice of Allowance for U.S. Appl. No. 16/424,018, dated Mar. 8, 2021.
Office Action for U.S. Appl. No. 16/424,018, dated May 13, 2021.
Office Action for U.S. Appl. No. 16/424,018, dated Sep. 3, 2021.
Notice of Allowance for U.S. Appl. No. 16/424,018, dated Nov. 2, 2021.
Office Action for U.S. Appl. No. 16/424,018, dated Jan. 24, 2022.
Notice of Allowance for U.S. Appl. No. 16/424,018, dated Jun. 10, 2022.
Office Action for U.S. Appl. No. 16/424,018, dated Sep. 6, 2022.
Office Action for U.S. Appl. No. 16/424,018, dated Nov. 25, 2022.
Notice of Allowance for U.S. Appl. No. 16/424,018, dated Feb. 21, 2023.
Notice of Allowance for U.S. Appl. No. 17/942,347, dated Apr. 19, 2023.
Notice of Allowance for U.S. Appl. No. 17/942,347, dated Jul. 3, 2023.
Notice of Allowance for U.S. Appl. No. 17/942,347, dated Aug. 14, 2023.

(56) References Cited

OTHER PUBLICATIONS

Notice of Allowance for U.S. Appl. No. 17/964,853, dated Mar. 8, 2023.
Office Action for U.S. Appl. No. 17/964,853, dated Sep. 15, 2023.
Office Action for U.S. Appl. No. 18/129,660, dated May 19, 2023.
Office Action for U.S. Appl. No. 18/129,660, dated Jul. 7, 2023.
Notice of Allowance for U.S. Appl. No. 18/129,660, dated Aug. 24, 2023.
Office Action for U.S. Appl. No. 18/224,793, dated Sep. 7, 2023.
Notice of Allowance for U.S. Appl. No. 18/224,793, dated Oct. 2, 2023.
"±1.5g Dual Axis Micromachined Accelerometer", Freescale Semiconductor, Inc., Motorola Semiconductor Technical Data, MMA6260Q, Jun. 2004, pp. 1-7.
"APA Announces Shipment of the SunUV™ Personal UV Monitor", Press Release, Nov. 7, 2003, pp. 1-3.
"Camera Specs Take Candid Snaps", BBC News, Sep. 18, 2003, pp. 1-3.
"Cardo Wireless Attaching Clips and Wearing Headset", Cardo Systems, Inc., http://www.cardowireless.com/clips.php, downloaded Nov. 27, 2004, pp. 1-3.
"Environmental Health Criteria 14: Ultraviolet Radiation", International Programme on Chemical Safety, World Health Organization Geneva, 1979 http://www.ichem.org., pp. 1-102.
"Exclusive Media Event Marks Debut of Oakley Thump: World's First Digital Audio Eyewear", Oakley Investor Relations, Press Release, Nov. 15, 2004, pp. 1-2.
"Eyetop, Product-Features", eyetop eyewear, eyetop belt worn, http://www.eyetop.net/products/eyetop/features.asp., downloaded Nov. 6, 2003, pp. 1-2.
"Heart Rate Monitors", http://www.healthgoods.com, downloaded Dec. 4, 2004.
"How is the UV Index Calculated", SunWise Program, U.S. Environmental Protection Agency, http://www.epa.gov/sunwise/uvcalc.html, downloaded Oct. 14, 2004, pp. 1-2.
"Industrial UV Measurements", APA Optics, Inc., http://www.apaoptics.com/uv/, downloaded Jul. 12, 2004, p. 1.
"Motorola and Oakley Introduce First Bluetooth Sunglasses-Cutting Edge RAZRWire Line Offers Consumers On-The-Go Connections", Motorola Mediacenter-Press Release, Feb. 14, 2005, pp. 1-2.
"Oakley Thump: Sunglasses Meet MP3 Player", with image, http://news.designtechnica.com/article4665.html, Jul. 13, 2004.
"Personal UV monitor," Optics.org, http://optics.org/articles/news/6/6/7/1 (downloaded Dec. 20, 2003), Jun. 9, 2000, pp. 1-2.
"SafeSun Personal Ultraviolet Light Meter", http://healthchecksystems.com/safesun.htm, downloaded Jul. 12, 2004, pp. 1-4.
"SafeSun Personal UV Meter", Introduction, Optix Tech Inc., http://www.safesun.com, downloaded Feb. 5, 2004, pp. 1-2.
SafeSun Personal UV Meter, features, Optix Tech Inc., http://www.safesun.com/features.html, downloaded May 1, 2004, pp. 1-2.
"Sharper Image—The FM Pedometer", e-Corporate Gifts.com, http://www.e-corporategifts.com/sr353.html, downloaded Jan. 22, 2005, pp. 1-2.
"Sun UV™ Personal UV Monitor", APA Optics, Inc., http://www.apaoptics.com/sunuv/uvfacts.html, downloaded Dec. 20, 2003, pp. 1-3.
"Ultraviolet Light and Sunglasses", Oberon's Frequently Asked Questions, http://www.oberoncompany.com/OBEnglish/FAQUV.html, downloaded Feb. 5, 2004, pp. 1-2.
"Ultraviolet Light Sensor", Barrett & Associates Engineering, http://www.barrettengineering.com/project_uvs.htm, downloaded Feb. 5, 2004, pp. 1-3.
"Ultraviolet Radiation (UVR)", Forum North, Ontario Ministry of Labour, http://www3.mb.sympatico.ca/~ericc/ULTRAVIOLET%20RADIATION.htm, downloaded Feb. 5, 2004, pp. 1-6.
"What Are Gripples?", Gripping Eyewear, Inc., http://www.grippingeyewear.com/whatare.html, downloaded Nov. 2, 2005.

"With Racing Heart", Skaloud et al., GPS World, Oct. 1, 2001, http://www.gpsworld.com/gpsworld/content/printContentPopup.jsp?id=1805, pp. 1-5.
Abrisa Product Information: Cold Mirrors, Abrisa, Jun. 2001, p. 1.
Abrisa Product Information: Commercial Hot Mirror, Abrisa, Jun. 2001, p. 1.
Alps Spectacle, Air Conduction Glass, Bone Conduction Glass, http://www.alps-inter.com/spec.htm, downloaded Dec. 10, 2003, pp. 1-2.
Altimeter and Compass Watches, http://store.yahoo.com/snowshack/altimeter-watches.html, downloaded May 3, 2004, pp. 1-2.
Bone Conduction Headgear HG16 Series, "Voiceducer," http://www.temco-j.co.jp/html/English/HG16.html, downloaded Dec. 10, 2003, pp. 1-3.
Carnoy, David, "The Ultimate MP3 Player for Athletes? Could be.", CNET Reviews, May 14, 2004, pp. 1-4.
Clifford, Michelle A., "Accelerometers Jump into the Consumer Goods Market", Sensors Online, http://www.sensorsmag.com, Aug. 2004.
Comfees.com, Adjustable Sports Band Style No. 1243, http://shop.store.yahoo.com/comfees/adsportbansty.html, downloaded Apr. 18, 2003, pp. 1-2.
Cool Last Minute Gift Ideas!, UltimateFatBurner Reviews and Articles, http://www.ultimatefatburner.com/gift-ideas.html, downloaded May 10, 2005, pp. 1-3.
Dickie et al. "Eye Contact Sensing Glasses for Attention-Sensitive Wearable Video Blogging," Human Media Lab, Queen's University, Kingston, On K7L 3N6, Canada, est. Apr. 2004, pp. 1-2.
Dixen, Brian, "ear-catching", Supertesten, Mobil, Apr. 2003 (estimated), pp. 37-41.
Global Solar UV Index, A Practical Guide, World Health Organization, 2002, pp. 1-28.
Grobart, Sam, "Digit-Sizing Your Computer Data", News Article, Sep. 2004, p. 1.
Life Monitor V1.1, Rhusoft Technologies Inc., http://www.rhusoft.com/lifemonitor/, Mar. 1, 2003, pp. 1-6.
Manes, Stephen, "Xtreme Cam", Forbes Magazine, Sep. 5, 2005, p. 96.
Mio, PhysiCal, http://www.gophysical.com/, downloaded Jan. 27, 2004, 5 pages.
Monitoring Athletes Performance—2002 Winter Olympic News from KSL, Jan. 23, 2002, http://2002.ksl.com/news-3885i, pp. 1-3.
Niwa, "UV Index Information", http://www.niwa.cri.nz/services/uvozone/uvi-info, downloaded Jul. 15, 2004, pp. 1-2.
NuVision 60GX Steroscopic Wireless Glasses, Product Information, NuVision by MacNaughton, c. 1997, MacNaughton, Inc., pp. 1-2.
Pärkkä, Juha, et al., "A Wireless Wellness Monitor for Personal Weight Management", VTT Information Technology, Tampere, Finland, Nov. 2000, p. 1.
Pedometer, Model HJ-112, Omron Instruction Manual, Omron Healthcare, Inc., 2003, pp. 1-27.
PNY Announces Executive Attaché USB 2.0 Flash Drive and Pen Series, Press Release, PNY Technologies, Las Vegas, Jan. 8, 2004, pp. 1-2.
PNY Technologies, "Executive Attaché" http://www.pny.com/products/flash/execattache.asp downloaded Nov. 16, 2005.
Polar WM41 and 42 weight management monitor, http://www.simplysports/polar/weight_management/wm41-42.htm, downloaded Jan. 28, 2004, pp. 1-3.
Questions Answers, Pedometer.com, http://www.pedometer.com, downloaded May 5, 2005.
Razrwire, copyright Motorola, Inc., Jul. 2005, 1 page.
SafeSun Personal UV Meter, Scientific Data, Optix Tech Inc., http://www.safesun.com/scientific.html, downloaded May 1, 2004, pp. 1-3.
SafeSun Sensor, User's Manual, Optix Tech Inc., Jun. 1998, 2 pages.
SafeSun, Personal UV Meter, "Technical Specifications", Optix Tech Inc., http://www.safesun.com/technical.html, downloaded Jul. 12, 2004, pp. 1-2.

(56) References Cited

OTHER PUBLICATIONS

SafeSun, Personal UV Meter, Experiments, Optix Tech Inc., http://www.safesun.com/experiments.html, downloaded Feb. 5, 2004, pp. 1-2.
Shades of Fun, Blinking Light Glasses, http://www.shadesoffun.com/Nov/Novpgs-14.html, downloaded Jul. 9, 2005, pp. 1-4.
SportLine Fitness Pedomete—Model 360, UltimateFatBurner Superstore, http://www.ultimatefatburner-store.com/ac_004.html, downloaded May 10, 2005, pp. 1-2.
Steele, Bonnie G et al., "Bodies in motion: Monitoring daily activity and exercise with motion sensors in people with chronic pulmonary disease", VA Research & Development, Journal of Rehabilitation Research & Development, vol. 40, No. 5, Sep./Oct. 2003, Supplement 2, pp. 45-58.
Stevens, Kathy, "Should I Use a Pedometer When I Walk?", Healtheon/WebMD, Apr. 14, 2000.
Sundgot, Jørgen "2nd-gen Motorola Bluetooth headset", InfoSync World, Mar. 1, 2003, http://www.infosync.no/news/2002/n/2841.html, pp. 1-2.
Sunsensors, Segan Industries, Inc., http://www.segan-ind.com/sunsensor.htm, downloaded Feb. 5, 2004, pp. 1-3.
SunUV™, Personal UV Monitor User's Guide, APA Optics, Inc., 2003 pp. 1-52.
SunUV™, Personal UV Monitor, APA Optics, Inc., http://www.apaoptics.com/sunuv/models.html, downloaded Dec. 20, 2003.
Talking Pedometer, Sportline, Inc., Jun. 2001 (Possibly earlier), 1 page.
The unofficial ELSA 3D Revelator page, Dec. 30, 1999, pp. 1-15.
Top Silicon PIN Photodiode, PD93-21C, Technical Data Sheet, Everlight Electronics Co., Ltd., 2004, pp. 1-9.
UV Light Meter, UVA and UVB measurement, UV-340, Instruction Manual, Lutron, Jun. 2003 (estimated), pp. 1-5.
UV-Smart, UVA/B Monitor, Model EC-960-PW, Instruction Manual, Tanita Corporation of America, Inc., downloaded Nov. 16, 2001.
Vitaminder Personal Carb Counter, http://www.auravita.com/products/AURA/ORBU11420.asp. Downloaded Nov. 15, 2005, pp. 1-4.
Yamada et al. "Development of an eye-movement analyser possessing functions for wireless transmission and autocalibration," Med. Biol. Eng. Comput., No. 28, v.4, Jul. 28, 1990, http://link.springer.com/article/10.1007%2FBF02446149?LI=true, pp. 1-2.
Notice of Allowance for U.S. Appl. No. 17/949,029, dated Oct. 30, 2023.
Office Action for U.S. Appl. No. 18/144,557, dated Aug. 23, 2023.
Office Action for U.S. Appl. No. 18/144,557, dated Nov. 24, 2023.
Notice of Allowance for U.S. Appl. No. 18/144,557, dated Jan. 11, 2024.
Notice of Allowance for U.S. Appl. No. 18/238,467, dated Nov. 21, 2023.
Notice of Allowance for U.S. Appl. No. 16/182,969, dated Oct. 25, 2023.
Election of Species Requirement for U.S. Appl. No. 18/375,893, dated Nov. 14, 2023.
Office Action for U.S. Appl. No. 18/375,893, dated Dec. 14, 2023.
U.S. Appl. No. 60/460,154, filed Apr. 3, 2003, to Jannard.
Respondent's Disclosure of Invalidity Contentions with Exhibits A1-A13, Exhibits B1-B5, and Exhibits C1-C6, International Trade Commission Investigation No. 337-TA-1383, filed Feb. 29, 2024, pp. 1-1516.
Höllerer, T. and Feiner, S., "Mobile augmented reality." *Telegeoinformatics: Location-based computing and services* 21 (2004), pp. 1-39.
Mann, Steve and S. Mann. *Intelligent image processing*. IEEE, 2002, 121 pgs. [Part 1 of 3].
Mann, Steve and S. Mann. *Intelligent image processing*. IEEE, 2002, 130 pgs. [Part 2 of 3].
Mann, Steve and S. Mann. *Intelligent image processing*. IEEE, 2002, 110 pgs. [Part 3 of 3].
Mann, S., & Fung, J. "VideoOrbits on Eye Tap devices for deliberately diminished reality or altering the visual perception of rigid planar patches of a real world scene." *Eye*, 3, pp. 1-8.
Milgram, Paul, and Fumio Kishino. "A taxonomy of mixed reality visual displays." *IEIC Transactions on Information and Systems* 77.12 (1994), pp. 1-15.
DeVaul et al. MIThril Project Overview. https://www.media.mit.edu/wearables/mithril/overview.html, downloaded Mar. 2, 2022, pp. 1-5.
Rolland, Jannick P., and Hong Hua. "Head-mounted display systems." *Encyclopedia of optical engineering* 2 (2005), pp. 1-14.
Rolland, Jannick P., et al. "High-resolution inset head-mounted display." *Applied optics* 37.19 (1998), pp. 1-11.
Yoshida, Akitoshi, Jannick P. Rolland, and John H. Reif. "Design and Applications of a High Resolution Insert Head Mounted Display." (1994), pp. 1-13.
Nortel 922, Mobile Phone Museum, pp. 1-3.
Office Action for U.S. Appl. No. 17/949,029, dated Feb. 29, 2024.
Notice of Allowance for U.S. Appl. No. 18/238,467, dated Apr. 1, 2024.

\* cited by examiner

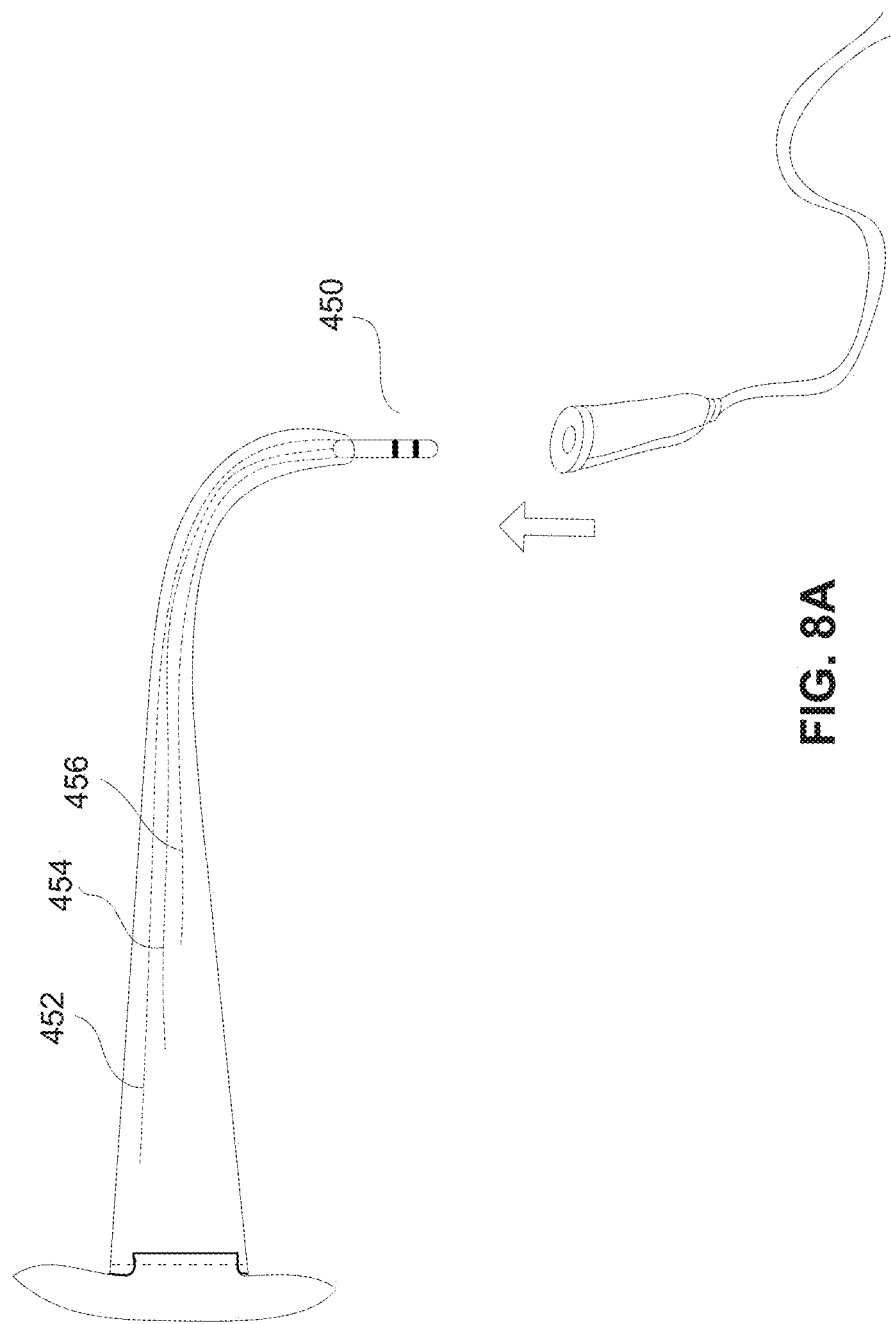

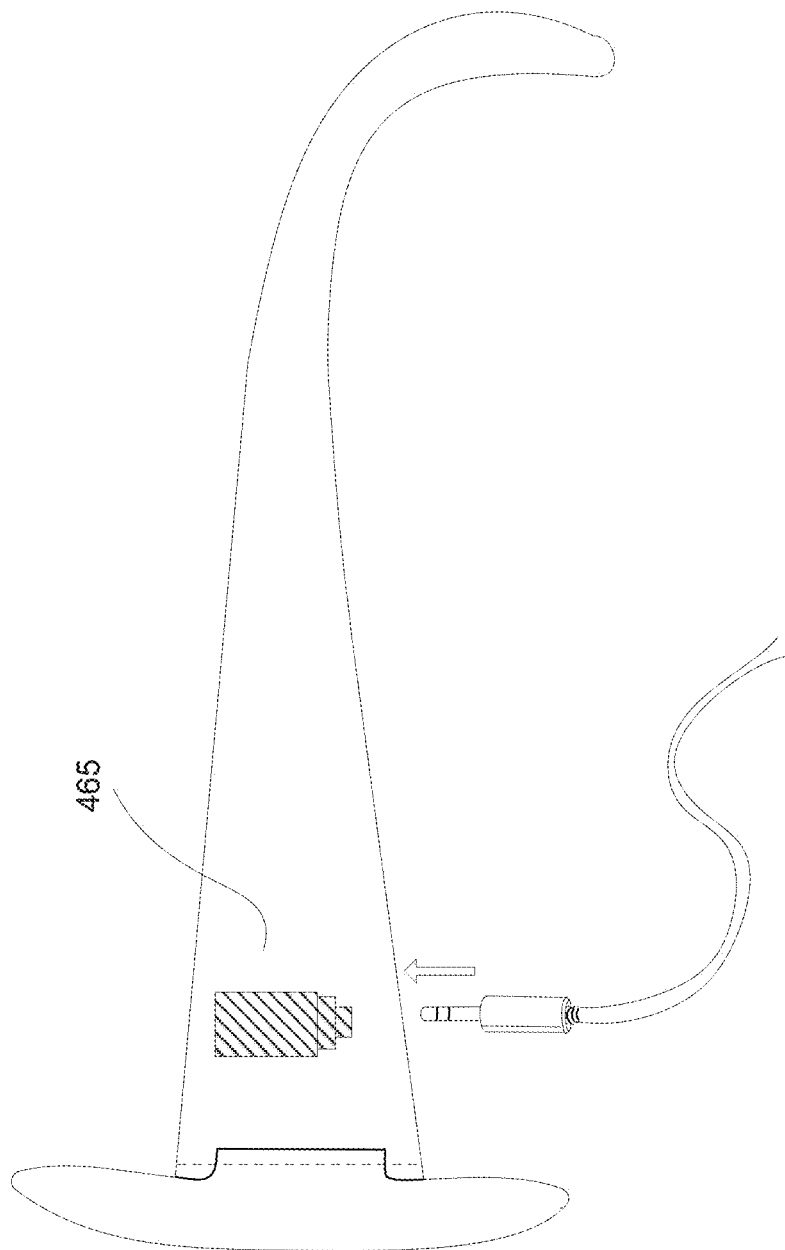

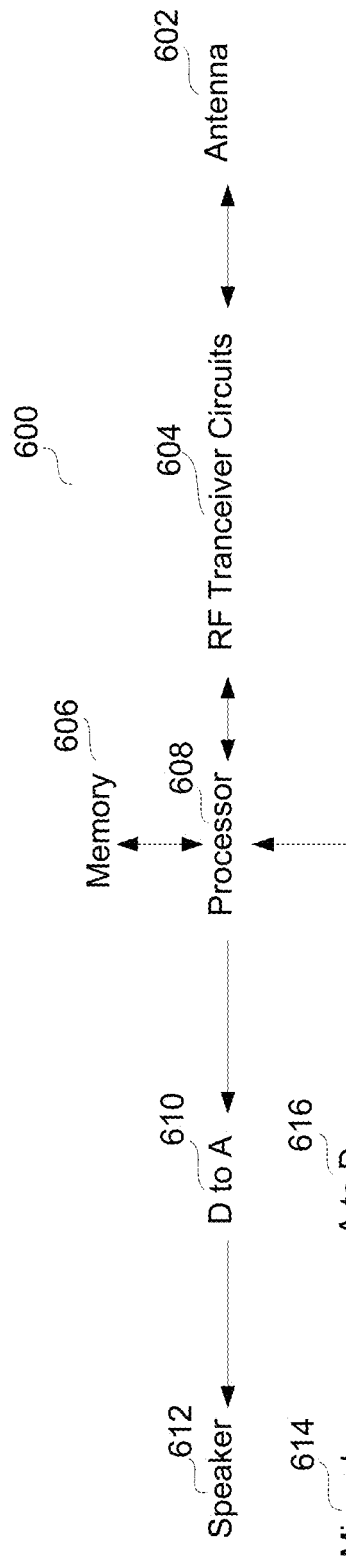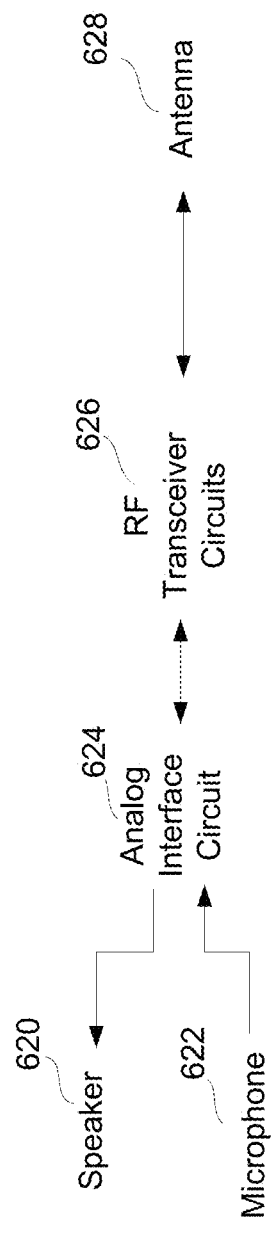
FIG. 11A
FIG. 11B

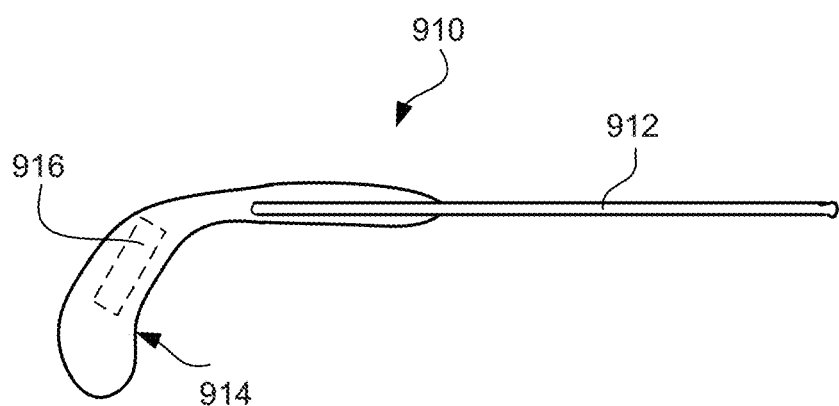
FIG. 17B
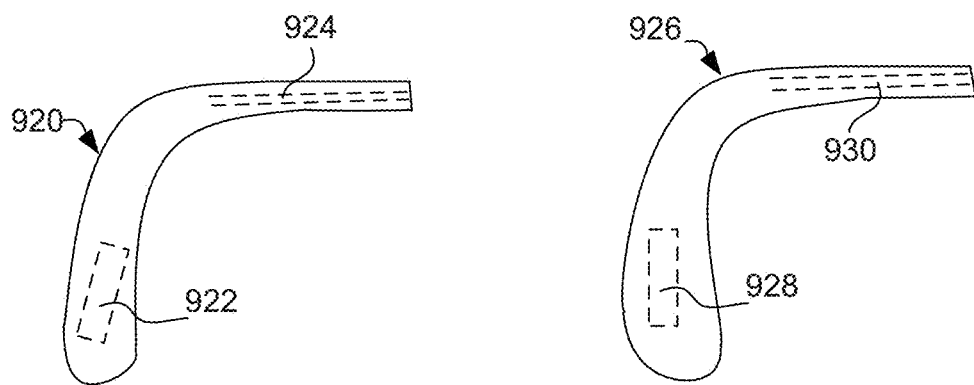
FIG. 17C  FIG. 17D

HEAD-WORN DEVICE WITH CONNECTION REGION

CROSS-REFERENCE TO RELATED APPLICATIONS

This application is a continuation of U.S. patent application Ser. No. 18/224,793, now U.S. Pat. No. 11,829,518, and entitled "HEAD-WORN DEVICE WITH CONNECTION REGION," which is hereby incorporated herein by reference, which is a divisional of U.S. patent application Ser. No. 18/129,660, filed Mar. 31, 2023, now U.S. Pat. No. 11,803,069, and entitled "EYEWEAR WITH CONNECTION REGION," which is hereby incorporated herein by reference, which is a continuation of U.S. patent application Ser. No. 16/424,018, filed May 28, 2019, now U.S. Pat. No. 11,630,331, and entitled "EYEWEAR WITH TOUCH-SENSITIVE INPUT SURFACE," which is hereby incorporated herein by reference, which is a continuation of U.S. patent application Ser. No. 13/831,419, filed Mar. 14, 2013, now U.S. Pat. No. 10,345,625, and entitled "EYEWEAR WITH TOUCH-SENSITIVE INPUT SURFACE," which is hereby incorporated herein by reference, which is a continuation of U.S. patent application Ser. No. 13/291,020, filed Nov. 7, 2011, now U.S. Pat. No. 8,430,507, and entitled "EYEWEAR WITH TOUCH-SENSITIVE INPUT SURFACE" which is hereby incorporated herein by reference, which is a continuation of U.S. patent application Ser. No. 12/803,732, filed Jul. 1, 2010, now U.S. Pat. No. 8,434,863, and entitled "EYEGLASSES WITH A PRINTED CIRCUIT BOARD" which is hereby incorporated herein by reference, which is a continuation of U.S. patent application Ser. No. 11/546,685, filed Oct. 11, 2006, now U.S. Pat. No. 7,806,525, and entitled "EYEGLASSES HAVING A CAMERA" which is hereby incorporated herein by reference, which is a continuation-in-part of U.S. patent application Ser. No. 11/183,256, filed Jul. 15, 2005, now U.S. Pat. No. 7,500,747, and entitled "EYEGLASSES WITH ELECTRICAL COMPONENTS," which is hereby incorporated herein by reference, which claims priority to each of: (i) U.S. Provisional Patent Application No. 60/592,045, filed Jul. 28, 2004, entitled "EYEGLASSES WITH A CLOCK OR OTHER ELECTRICAL COMPONENT," and which is hereby incorporated herein by reference; and (ii) U.S. Provisional Patent Application No. 60/605,191, filed Aug. 28, 2004, entitled "ELECTRICAL COMPONENTS FOR USE WITH EYEWEAR, AND METHODS THEREFOR," and which is hereby incorporated herein by reference.

U.S. patent application Ser. No. 11/183,256 also claims priority to each of: (i) U.S. Provisional Patent Application No. 60/618,107, filed Oct. 12, 2004, and entitled "TETHERED ELECTRICAL COMPONENTS FOR EYEGLASSES," which is hereby incorporated herein by reference; (ii) U.S. Provisional Patent Application No. 60/620,238, filed Oct. 18, 2004, entitled "EYEGLASSES WITH HEARING ENHANCED AND OTHER AUDIO SIGNAL-GENERATING CAPABILITIES," and which is hereby incorporated herein by reference; (iii) U.S. Provisional Patent Application No. 60/647,836, filed Jan. 31, 2005, and entitled "EYEGLASSES WITH HEART RATE MONITOR," which is hereby incorporated herein by reference; and (iv) U.S. Provisional Patent Application No. 60/647,826, filed Jan. 31, 2005, and entitled "EYEWEAR WITH ELECTRICAL COMPONENTS," which is hereby incorporated herein by reference.

U.S. patent application Ser. No. 11/546,685 also claims priority to each of: (i) U.S. Provisional Patent Application No. 60/725,896, filed Oct. 11, 2005, and entitled "EYEGLASSES WITH ELECTRICAL COMPONENTS," which is hereby incorporated herein by reference; (ii) U.S. Provisional Patent Application No. 60/725,999, filed Oct. 11, 2005, and entitled "EYEWEAR SUPPORTING AFTER-MARKET ELECTRICAL COMPONENTS," which is hereby incorporated herein by reference; (iii) U.S. Provisional Patent Application No. 60/787,850, filed Apr. 1, 2006, and entitled "EYEGLASSES WITH A HEART RATE MONITOR," which is hereby incorporated herein by reference; and (iv) U.S. Provisional Patent Application No. 60/846,150, filed Sep. 20, 2006, and entitled "EYEGLASSES WITH ACTIVITY MONITORING," which is hereby incorporated herein by reference.

This application is related to U.S. patent application Ser. No. 10/964,011, filed Oct. 12, 2004, now U.S. Pat. No. 7,192,136, and entitled "TETHERED ELECTRICAL COMPONENTS FOR EYEGLASSES," which is hereby incorporated herein by reference, which references to each of: (i) U.S. Provisional Patent Application No. 60/509,631, filed Oct. 9, 2003, and entitled "TETHERED ELECTRICAL COMPONENTS FOR EYEGLASSES," which is hereby incorporated herein by reference; (ii) U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference; (iii) U.S. Provisional Patent Application No. 60/562,798, filed Apr. 15, 2004, entitled "EYEWEAR WITH ULTRAVIOLET DETECTION SYSTEM," and which is hereby incorporated herein by reference; (iv) U.S. Provisional Patent Application No. 60/583,169, filed Jun. 26, 2004, entitled "ELECTRICAL COMPONENTS FOR USE WITH EYEWEAR, AND METHODS THEREFOR," and which is hereby incorporated herein by reference.

In addition, this application is related to each of: (i) U.S. patent application Ser. No. 10/822,218, filed Apr. 12, 2004, and entitled "EYEGLASSES FOR WIRELESS COMMUNICATIONS," which is hereby incorporated herein by reference; (ii) U.S. patent application Ser. No. 10/964,011, filed Oct. 12, 2004 now U.S. Pat. No. 7,192,136, and entitled "TETHERED ELECTRICAL COMPONENTS FOR EYEGLASSES," which is hereby incorporated herein by reference; (iii) U.S. patent application Ser. No. 11/006,343, filed Dec. 7, 2004 now U.S. Pat. No. 7,116,976, and entitled "ADAPTABLE COMMUNICATION TECHNIQUES FOR ELECTRONIC DEVICES," which is hereby incorporated herein by reference; (iv) U.S. patent application Ser. No. 11/078,855, filed Mar. 11, 2005 now U.S. Pat. No. 7,500,746, and entitled "EYEWEAR WITH RADIATION DETECTION SYSTEM," which is hereby incorporated herein by reference; (v) U.S. patent application Ser. No. 11/078,857, filed Mar. 11, 2005, and entitled "RADIATION MONITORING SYSTEM," which is hereby incorporated herein by reference; (vi) U.S. patent application Ser. No. 11/183,269, filed Jul. 15, 2005 now U.S. Pat. No. 7,380,936, and entitled "EYEWEAR SUPPORTING AFTER-MARKET ELECTRICAL COMPONENTS," which is hereby incorporated herein by reference; (vii) U.S. patent application Ser. No. 11/183,283, filed Jul. 15, 2005, and entitled "EVENT EYEGLASSES," which is hereby incorporated herein by reference; (viii) U.S. patent application Ser. No. 11/183,262, filed Jul. 15, 2005, and entitled "EYEGLASSES WITH HEARING ENHANCED AND OTHER AUDIO SIGNAL-GENERATING CAPABILITIES," which is hereby incorporated herein by reference; (ix) U.S. patent application Ser. No. 11/183,263, filed Jul. 15, 2005 now U.S. Pat. No. 7,380,936, and entitled "EYEGLASSES WITH A CLOCK OR OTHER ELECTRICAL COMPONENT," which is hereby incorporated herein by reference; (x) U.S. patent application Ser. No. 11/183,276, filed Jul. 15, 2005 now U.S. Pat. No. 7,255,437, and entitled "EYEGLASSES WITH ACTIVITY MONITORING," which is hereby incorporated herein by reference; and (xi) U.S. patent application Ser. No. 11/580,222, filed Oct. 11, 2006 now U.S. Pat. No. 7,581,833, and entitled "EYEGLASSES SUPPORTING AFTER MARKET ELECTRICAL COMPONENTS", which is hereby incorporated herein by reference.

BACKGROUND OF THE INVENTION

Many of us have experienced the inconvenience of trying to listen to a piece of music from a portable device in an outdoor environment, particularly in cold weather. First, we remove the device from inside our jacket. Then, we take off our gloves to find the right song, connect the device to a headset, and put on the headset. After we have finished listening, we go through the process again to put the device back into our jacket. To a certain degree, we are somewhat used to such procedures. However, to look at this objectively, going through the multi-step process just to listen to a piece of music is cumbersome. Such inconvenient procedures are not limited to hearing music. For example, it may not be much easier for us to use the cell phones or cameras and the like.

It should be apparent from the foregoing that there is still a need to increase the ease of handling electronic devices.

Also, typically, to participate in wireless communications, a user holds a mobile phone (e.g., wireless or a cellular phone) against his ear to hear an audio communication received in a wireless manner. The user usually also speaks towards a microphone embedded in the mobile phone to participate in the audio communication, again in a wireless manner. More recently, to facilitate hands-free operation of mobile phones, head-sets have been produced and utilized. Typically, a headset clips over or into an ear of the user to provide a speaker and a microphone in proximity to the ear and the mouth, respectively, of the user. Traditionally, the head-set was connected to the mobile phone by a cord (i.e., wire). In recent times, head-sets have been developed to operate in a wireless manner, without the need of a cord connected to the mobile phone. For example, one popular type of wireless head-set uses Bluetooth wireless transmissions to communicate between the head-set and the corresponding mobile phone.

Mobile phones often support both voice calls and text messaging. When the user does not make use of a head-set, the user often holds the mobile phone against their ear when participating in a voice call. One problem this presents is that the user is not able to see the screen of the mobile phone. As a result, the user has difficultly interacting with the keypad or screen of the mobile phone when the mobile phone is held against the user's head. Alternatively, when the user of a mobile phone makes use of a head-set, the user can receive and participate in voice calls in a hands-free manner. Unfortunately, however, the user would need to view a screen of the mobile phone to participate in text messaging.

Accordingly, there is a need for improved wireless communication techniques for users of mobile communication devices.

SUMMARY OF THE INVENTION

The present invention provides a pair of glasses with one or more embedded or partially embedded electrical components. In a number of the embodiments of the invention, with one or more electrical components in the glasses, the electrical components are much easier to operate. For example, you do not have to take an electronic device out from your pocket to use it. The electronic device may already be in your glasses, and you just have to turn it on.

In one embodiment, an eyewear for a user includes an eyewear frame; a first switch at the frame, the first switch having at least two operational states, and the operational states of the switch being configured to be changed by a user touching a surface of the frame, without moving any mechanical part at least partially exposed to the outside of the frame; and a first electrical component in the frame configured to be electrically coupled to the first switch to perform a function.

In another embodiment, an eyewear for a user includes an eyewear frame, electrical circuitry at least partially in the eyewear frame, and a touch sensitive input surface on the eyewear frame configured to provide an input to the electrical circuitry to perform a function via touching the touch sensitive input surface.

In yet another embodiment, an eyewear includes a switch with at least two operational states. The operational states of the switch can be configured to be changed by sliding a finger across a touch sensitive input surface of the frame, without moving any mechanical part at least partially exposed to the outside of the frame. The embodiment could also include an electrical component in the frame configured to be electrically coupled to the switch to perform a function.

In one embodiment, an eyewear frame for a user includes at least a front portion with two side portions; two speakers, one in each side portion; a connection region at one side portion, with an electrical connector having two conductive pads to connect to corresponding conductive contacts of a counterpart connector; a rechargeable battery; a microphone in the frame; and wireless communication circuitry in the frame. The connection region can be provided at an inside surface of one of the side portions. The eyewear frame can also include a touch-sensitive input surface on the eyewear frame configured to provide an input to the frame to perform a function.

In one embodiment, a headset includes an electrical connector having a conductive pad to connect to a corresponding conductive contact of a counterpart connector. The headset can also include a touch-sensitive input surface.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIGS. 8A-8E shows different embodiments of standard connectors located at different positions on the temple of a pair of glasses according to the invention.

FIGS. 11A-11B show different embodiments of the present invention illustrating some of the electrical components for wireless connections to a pair of glasses.

FIG. 17B is a diagram of a temple arrangement according to one embodiment of the invention.

FIG. 17C is a diagram of a cover that at least partially covers a temple according to one embodiment of the invention.

FIG. 17D is a diagram of a fit-over temple that at least partially fits over a temple according to one embodiment of the invention.

Same numerals in FIGS. 1-31 are assigned to similar elements in all the figures. Embodiments of the invention are discussed below with reference to FIGS. 1-31. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
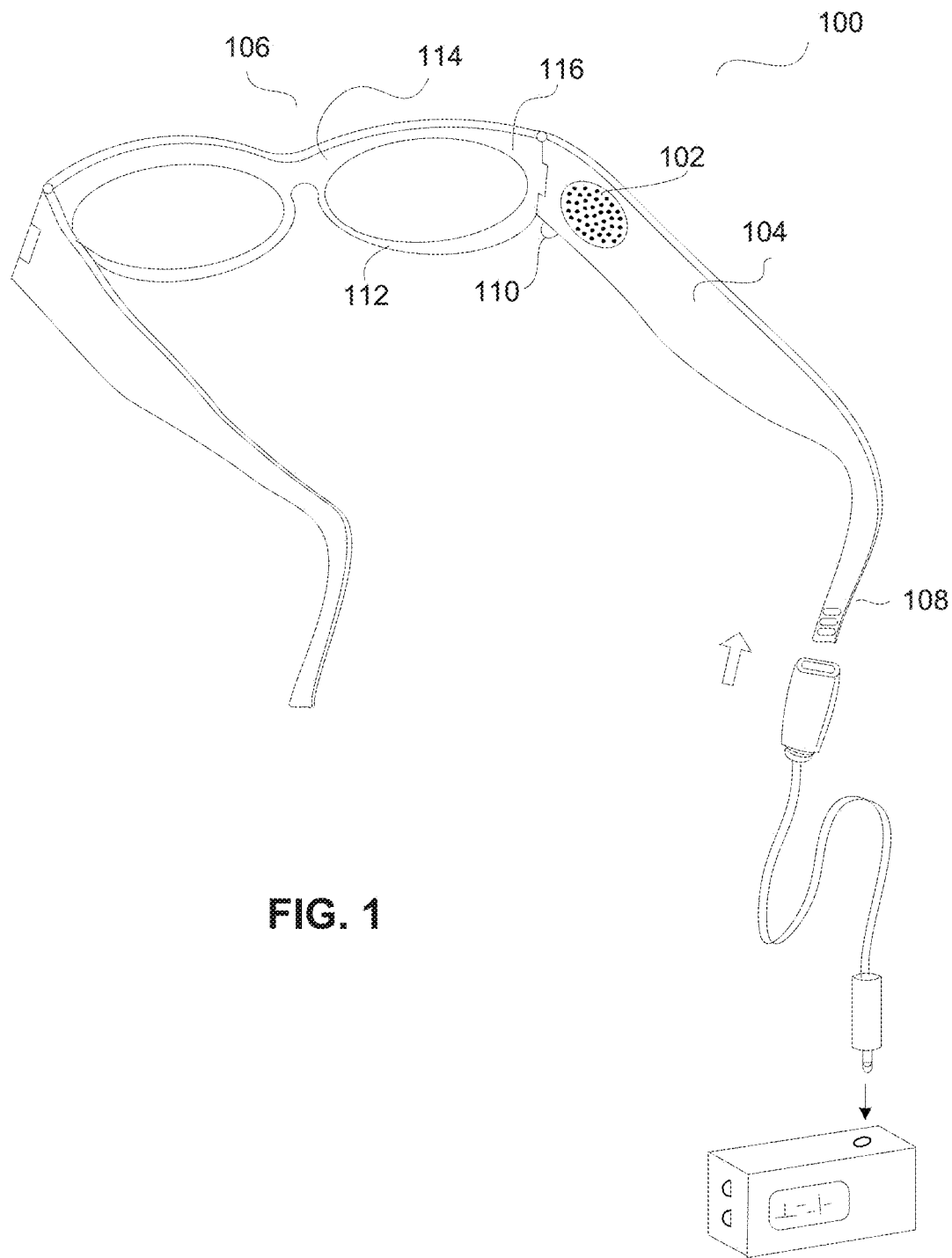
FIG. 1 shows one embodiment of the invention with a speaker in one of the temples of the glasses.

A number of embodiments according to the present invention regarding glasses with one or more electrical components attached, partially embedded or fully embedded are described. Many of them are applicable to different types of glasses, such as sunglasses, auxiliary frames, fit-over glasses, prescription glasses, safety glasses, swim masks, and goggles, such as ski goggles. In a number of embodiments, the frames of the glasses have more surface area than frames with minimal structure. For example, the temple regions of the glasses can have a tapered profile. They are wider or broader when they are closer to the lens holders. Then they get narrower. In one embodiment, a wider or broader temple implies that the temple spans across a wider or broader area longitudinally down from the top of the head of the user. FIG. 1 shows an example of such an embodiment.

FIG. 1 shows one embodiment 100 of the invention where there is a speaker 102 at least partially embedded in one of the temples 104 of the glasses 106. The speaker 102 is closer to one end of the temple 104 than the other end. The end of the temple that the speaker 102 is closer to is the end that is in the vicinity of the lens holder or the hinge of the glasses 106, instead of the end 108 that is free. The speaker can be partially embedded in the glasses. For example, the mouth of the speaker, where sometimes there can be small holes on a cover, can be exposed.

In the embodiment shown in FIG. 1, the speaker 102 outputs audio signals in the direction towards the user. In another embodiment, the speaker 102 outputs audio signals in the direction away from the user. For example, the mouth of the speaker 102 can be facing outwards away from the user.

There are different approaches to embed an electrical component into a pair of glasses. For example, the glasses can be made of plastic (e.g., plastic frames). One way to produce such frames is to first assemble electrical components onto a circuit board. The circuit board can be shaped to fit, for example, the temple of the glasses. The circuit board is placed into a mold. Then, hot, molten plastic is injected around the circuit board to form the temple piece of the glasses. To reduce weight, the wall of the glasses can be made relatively thin through injection molding techniques.

In another embodiment, the glasses have metallic frames. For example, the frames can be made of Titanium, which is a relatively light metal. Also, Titanium is relatively non-conductive and strong, and is quite immune to corrosion. Further, Titanium can be anodized or heat colored.

For glasses with metallic frames, to prevent circuits from being shorted or to reduce leakage current, one embodiment provides an insulating layer between the electrical components or circuit board and the metallic frames. One example of an insulting layer is a tape to encapsulate the electrical components. The tape is non-conducting so as to provide insulation and, to a certain degree, can also provide mechanical stiffness. One way to make such temples is to have two sheets of the metal die-stamped to form the two halves, or the two faces of the temple piece. A circuit board is made to fit into the space between the faces. Then, two die-cut pieces of insulator material (e.g., dielectric tape) can cover the top and the bottom surfaces of the circuit board. The board is then sandwiched between the faces to form the temple. In one example, the dielectric tape can be double-sided sticky tape, with one side sticking to the circuit board, and the other side sticking to the temple. An adhesive can be used to glue the two faces of the temple piece together.

In yet another embodiment, the frames are made of hard rubber. The frames can be manufactured in an approach similar to injection molding techniques, with circuit boards inserted into the mold along with the rubber at the time of molding.

Different types of speakers can be used, such as, standard, fixed-magnet/moving coil speakers; speakers with fixed-coil and a steel diaphragm; piezo-electric speakers; and electrostatic speakers.

Figure 2:
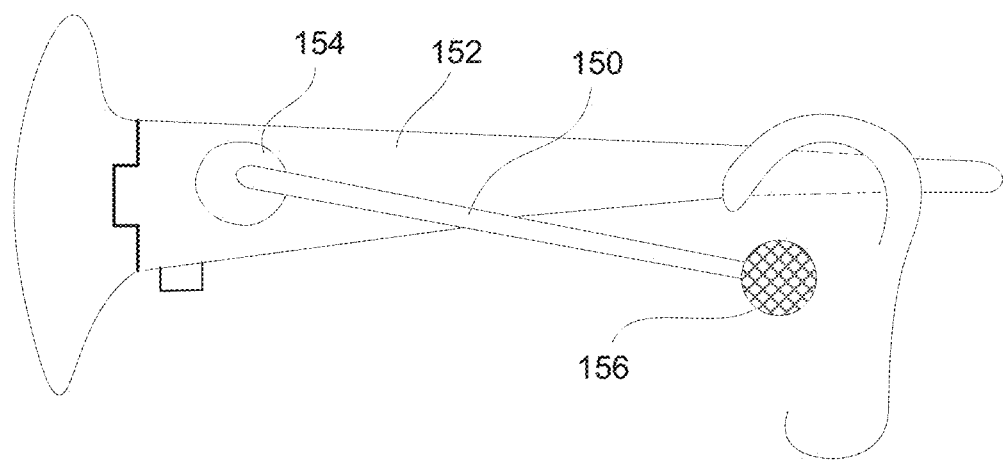
FIG. 2 shows a tube extending from a speaker at a temple of the glasses to guide sound to one of the ears of the user according to one embodiment of the invention.

In one embodiment, the glasses further include a tube, such as a plastic tube, extending from a speaker. The tube serves to guide sound generated by the speaker to one of the ears of the user. FIG. 2 shows an embodiment where a tube 150 is located on the outside of a temple 152. In another embodiment, the tube can be on the inside of a temple.

In one embodiment, the tube 150 can be rotated, such as from behind the temple 152 (if the tube is on the inside of the temple) to being downward at an angle towards one of the ears of the user, such as the position shown in FIG. 2. To increase flexibility, the tube can be attached to a rotating disk 154, which allows rotation about the speaker.

In another embodiment, the tube is malleable. This allows the tube to be placed in different positions.

Figure 3:
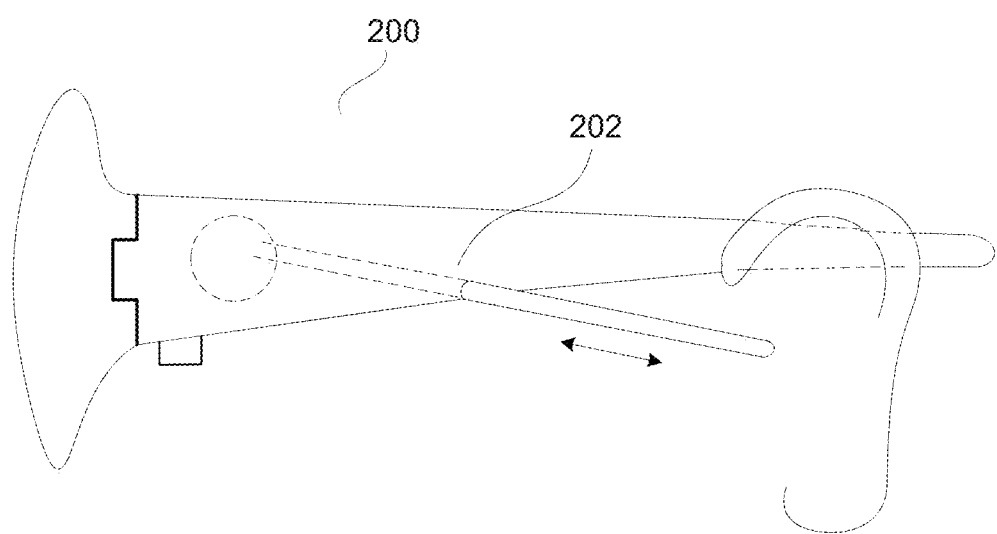
FIG. 3 shows a retractable tube extending from a speaker at a temple of the glasses according to one embodiment of the invention.

In one embodiment, the length of the tube is adjustable. FIG. 3 shows such an embodiment 200 of a pair of glasses with a retractable tube 202. In the figure, the tube is shown to be in its extended position.

To further enhance sound coupling, in one approach, there is a plug 156 at the end of the tube for inserting into an ear of the user. The plug can be an ear bud. The plug can provide a cushion, foam rubber or other materials. Such materials give comfort and/or enhance sound coupling to the ear canal.

Figure 4:
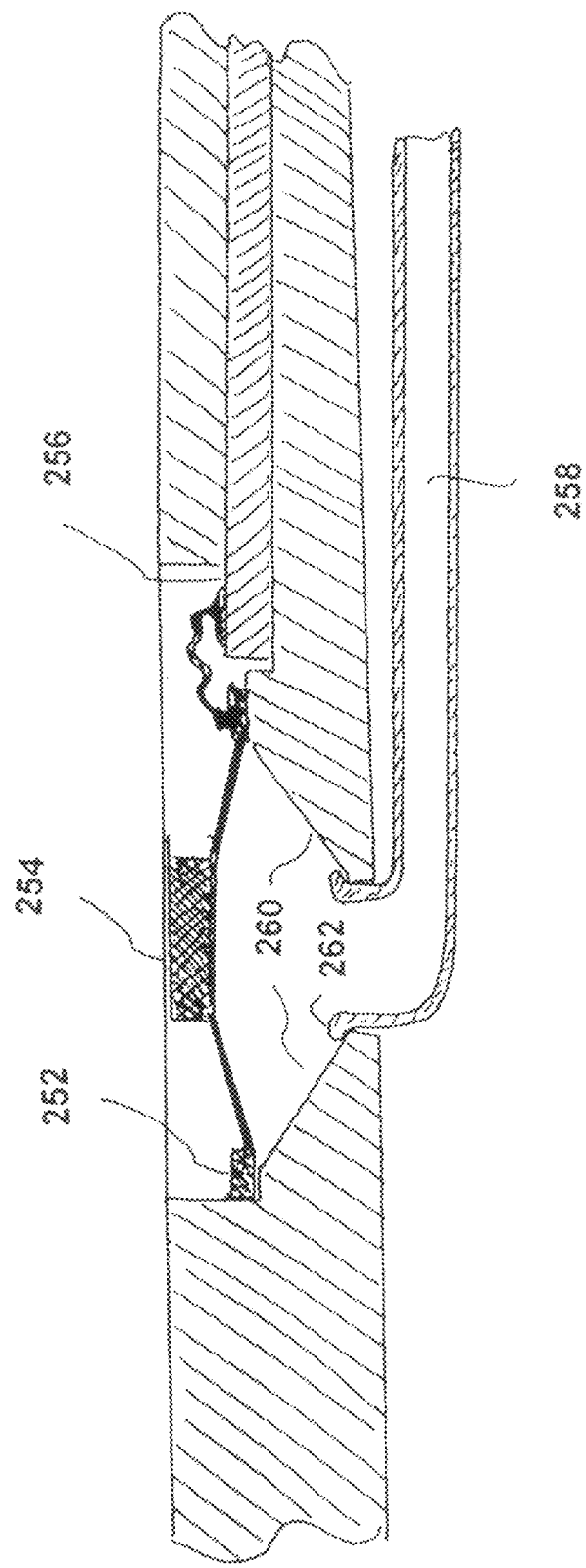
FIG. 4 shows a funnel at the output of a speaker in the glasses according to one embodiment of the invention.

In another approach, there is a funnel at the output of the speaker. FIG. 4 shows the cross section of such a funnel from a speaker at a temple region of the glasses. As shown in FIG. 4, the speaker 254 sits on a speaker frame 252, and the speaker 254 is electrically connected to a circuit board 256. As sound is generated from the speaker 254, the sound propagates to a tube 258 through a structure 260 in the shape of a funnel. Such a structure helps guide the sound to the tube (i.e., improved sound coupling). Also, FIG. 4 shows the tube, which can be the tube 150 shown in FIG. 2, mounted onto the temple region of the glasses with a circular lip 262. Such a lip 262 allows the tube 258 to rotate relative to the glasses. In the embodiment shown in FIG. 4, the speaker 254 is fully embedded in the glasses.

As an alternative to or in conjunction with the tube, the glasses can include a channel to likewise guide sound generated by the speaker to one of the ears of the user. For example, the channel can be formed within a temple. The temple also has an opening to output the sound towards the user's ear.

FIG. 1 shows one speaker at one of the temples. There can be more than one speaker at each temple. In one embodiment, there can also be at least one speaker at each temple. The two speakers can generate stereo effects.

In another embodiment, the glasses can provide four or more speakers to give a high fidelity sound or a surround sound effect. For example, each temple can include one speaker in front of the user's ear, and one speaker behind the user's ear. The different speakers can generate different portions or sections of the sound. Further, if a base (discussed below) or portable electronic device is coupled to the glasses, the base or portable electronic device can contain another speaker, such as a base or woofer speaker. Such embodiments enable the glasses to provide a personal high-fidelity sound or a surround-sound environment.

Electrical signals can be coupled to an electrical component, such as a speaker, in a pair of glasses through a number of mechanisms. In one embodiment, there is an electrical connector at least partially embedded in the glasses. In other words, at least a portion of the connector is inside the glasses. The connector is electrically coupled to the speaker (or other electrical component) by, for example, a conductor. The conductor can be on a printed-circuit board. In one embodiment, the conductor is also embedded in the glasses.

Figure 5:
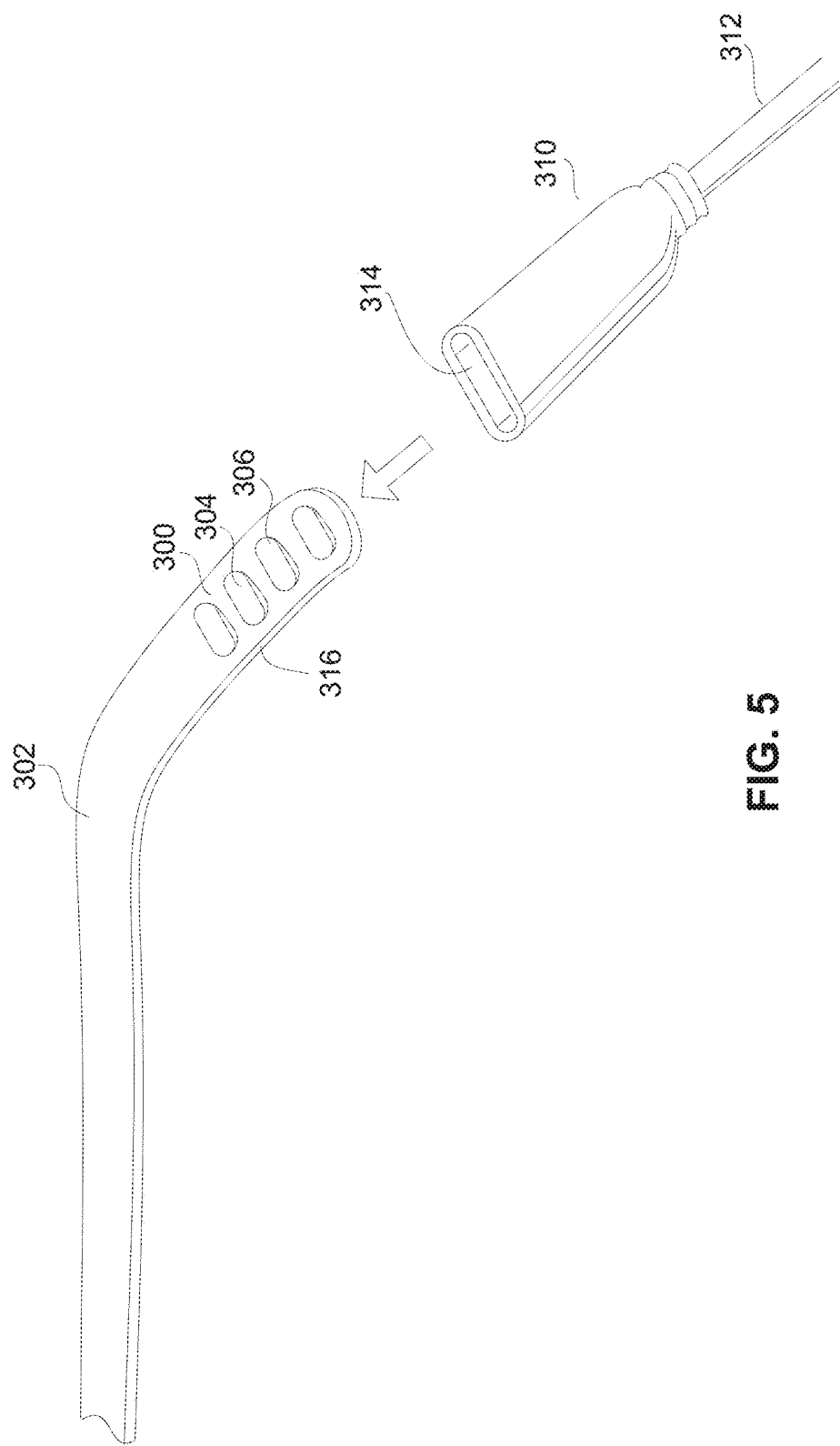
FIG. 5 shows a male connector at the end of a temple according to one embodiment of the invention.

Regarding connectors, FIG. 5 shows one embodiment where the connector is not a standard connector. The end 108 of the temple 104 of the glasses 106 shown in FIG. 1 has a similar connector. In FIG. 5, the connector is a male plug or a male connector 300 at the end of a temple 302 of a pair of glasses. The connector 300 is connected to the speaker through, for example, one or more wires embedded in the temple. Electrical signals external to the glasses can then be coupled to the speaker (or other electrical component) through the plug.

As shown in FIG. 5, the free end of the temple 302 can have a relatively flat cross section. There can be one or more electrically-conductive contacts, such as 304 and 306, on one or both of the flat surfaces of the temple. In FIG. 5, four contacts are shown on one surface of the temple. The contacts, 304 and 306, can be metal pads or bumps.

In one embodiment, a non-standard connector can be made using printed-circuit board technologies. First, a printed-circuit board with printed conductors connected to metal contact bumps is produced. Then plastic is overmolded around the printed-circuit board, with the mold designed to shut off around the bumps or pads. The overmolded plastic can serve as the temple, and the pads would be left exposed. Thus, portions of the printed circuit board are covered by plastic, and areas with the bumps or pads are exposed for connection. These pads serve as the connectors for the glasses.

Regarding printed-circuit boards, there can be one or more circuit boards in the glasses. For example, there can be a circuit board in one of the temples of the glasses. Or, the circuits can be divided into two circuit boards, one in each temple of the glasses. The circuit boards can carry additional electrical components to be described below.

In one embodiment, the circuit boards are rigid. In another embodiment, the circuit boards are made of flexible materials, such as a polyimide sheet, like Kapton®. In one embodiment, the circuit board is configured or adapts to the shape of the temple in which it resides.

As shown in FIG. 5, the end of the temple 302 serves as a male connector (plug) 300. The non-standard male connector 300 can be received by a non-standard female connector (plug) 310. Typically, the female connector 310 makes electrical and physical connection through grabbing around the male plug. The female connector 310 can be connected to a cable 312.

Figure 6A:
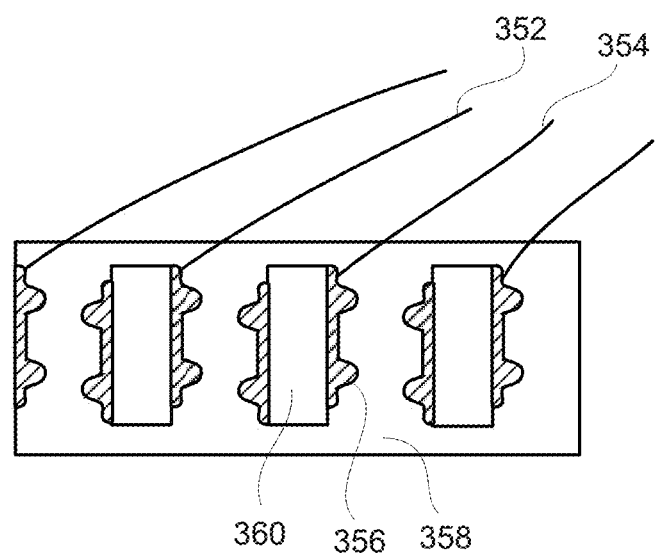
FIGS. 6A-6B illustrate a process to make a non-standard female plug couple to a male connector at a pair of glasses according to one embodiment of the invention.
Figure 6B:
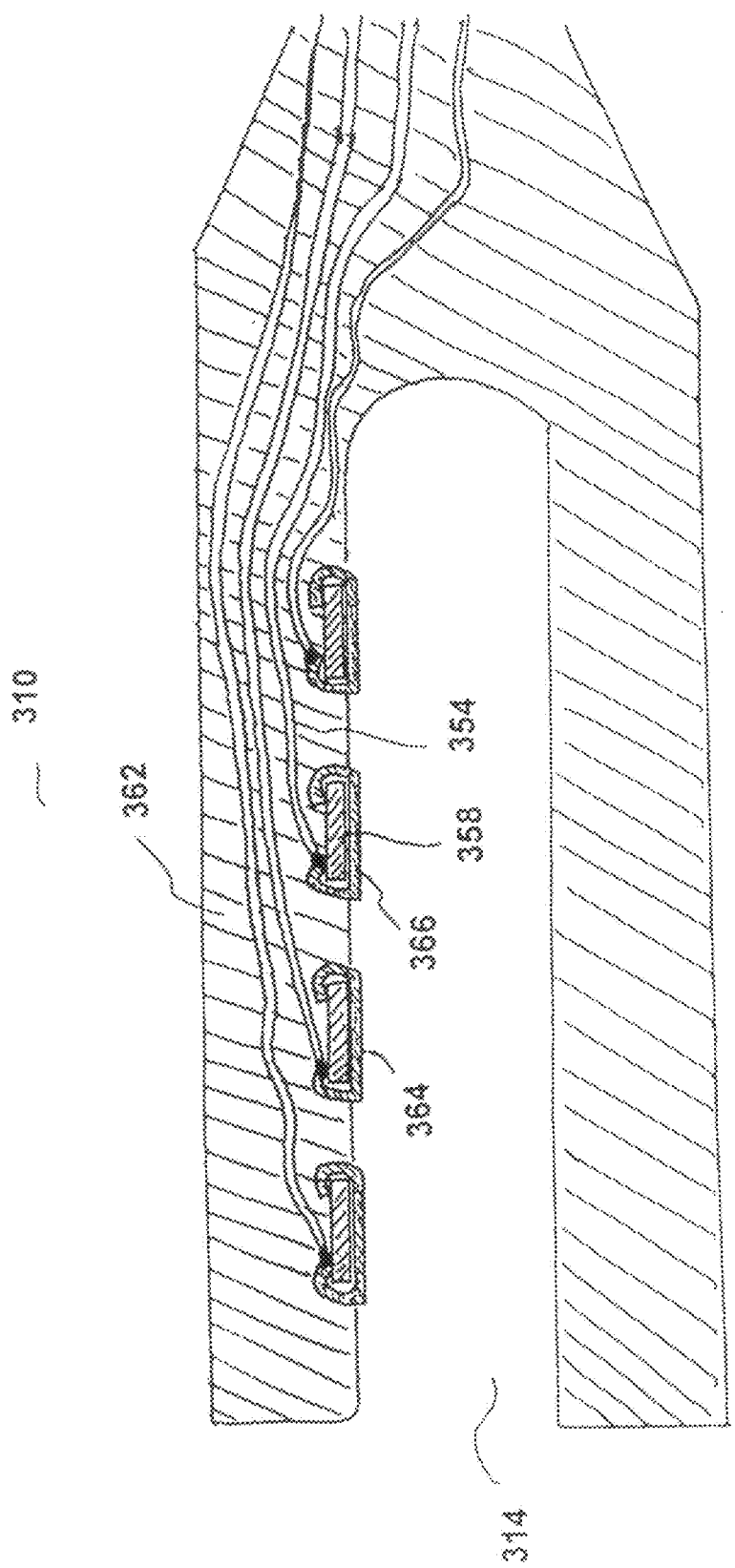

FIGS. 6A-6B illustrate a process to make the non-standard female plug 310. First, an electrical wire 354 is attached to a small sheet or piece of metal 356. FIG. 6A shows a number of such wires, with a number of the metal sheets or pieces crimped to a hard PVC 358. The figure shows the back side of the crimped board with the wires and with a number of holes, such as 360. Then the frame is overmolded with a soft PVC. FIG. 6B shows a cross section of the overmolded frame 362 with the soft PVC. As shown in the figure, a number of the metal sheets, such as 364 and 366, are exposed. They are the metal contacts in the female connector 310. Instead of the above approach, alternatively, a wire can be attached to a sheet of metal by putting the wire between the metal and the plastic as the metal is crimped onto a plastic. When the temple (i.e., male connector 300) is inserted into the female plug, the soft PVC material stretches slightly, providing a spring-force to keep the contacts connected.

The hard PVC can have a hardness of over 80 durometer, while the soft PVC can have a hardness of less than 50 durometer. The hard PVC can be replaced by other materials, such as Polypropylene or cloth. The soft PVC can be replaced by Silicone, or a thermo-plastic elastomer, such as Kraton®.

Referring to both FIG. 5 and FIG. 6B, when the male connector 300 is inserted into the slot 314 of the female connector 310, the metal pads, 304 and 306, will get in contact, or mate, with the metal sheets, 364 and 366.

In one embodiment, as long as the male connector 300 is pushed all the way into the female connector 310, the pads are aligned correctly to the sheets for electrical connections. In another embodiment, there is an alignment mechanism to guide the position of the temple relative to the female connector so as to ensure the conductive sheets to be in contact with the conductive pads. For example, there can be a registration location to indicate that the male connector is at the appropriate position relative to the female connector. There can be an alignment extension, which can be a partial sphere, close to the end of the temple 302, such as between the pads 304 and 306, at 316. And, there can be a corresponding alignment notch at the female connector 310. When the extension is received or caught by the notch, the male connector 300 is in the appropriate position relative to the female connector 310. In other words, the alignment is proper, and the pads and the sheets are in contact.

Figure 7:
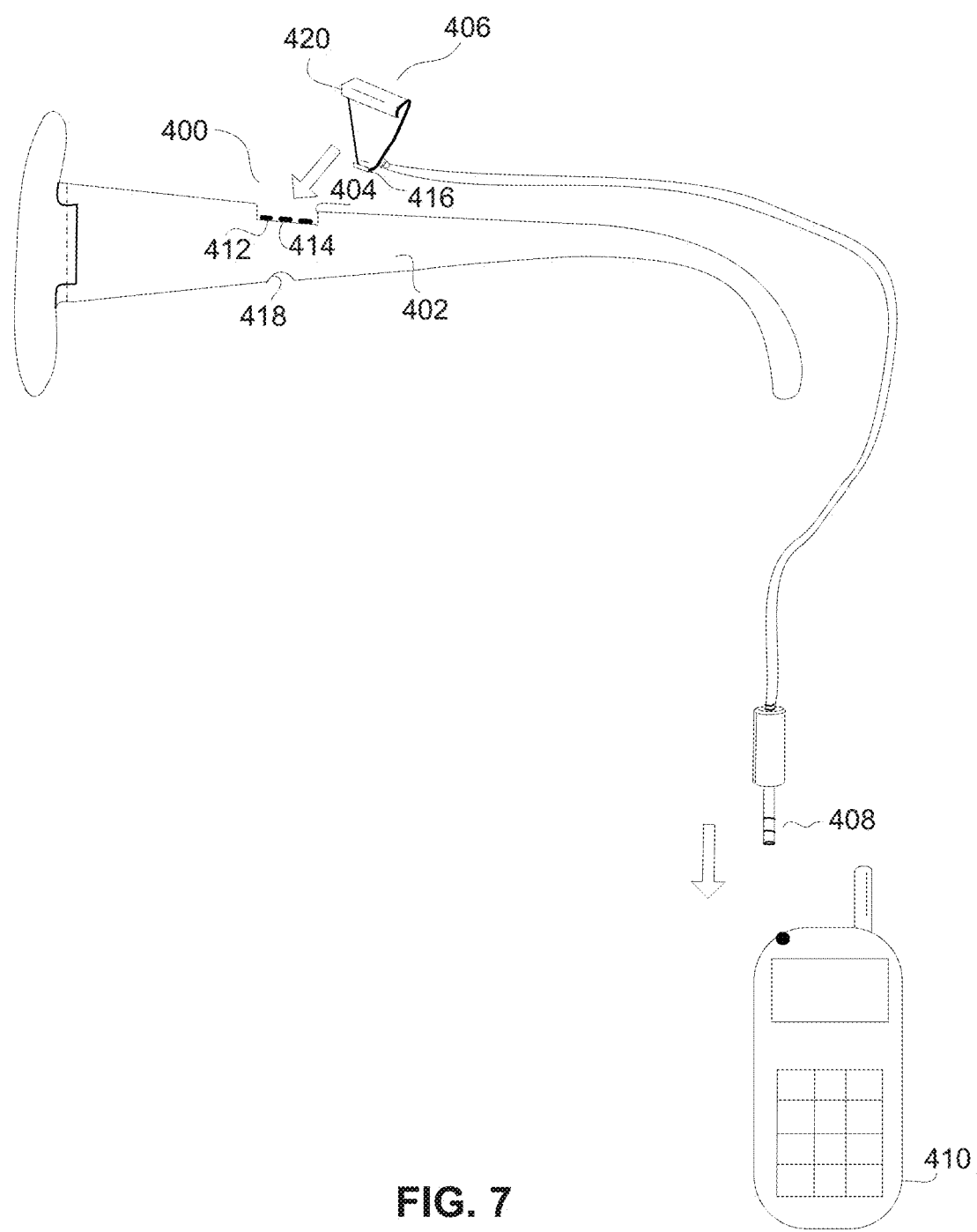
FIG. 7 illustrates another non-standard connector, applicable to clamp onto a temple of a pair of glasses according to an embodiment of the invention.

FIG. 5 shows the non-standard male connector 300 at one end of a temple of a pair of glasses. In yet another embodiment, a non-standard connector can be at another location. FIG. 7 shows another example of a non-standard connector 400. The connector 400 includes one or more conductive pads, 412 and 414, on the top side of a temple 402. The connector 400 is designed to receive another connector 406 that grabs onto the side of the temple 402. There can be an indentation 404 on the temple 402 to receive the other connector 406. The other connector 406 can include a top 420 and a bottom 416 clip. There are a number of conductive pads or sheets inside the other connector 406. The indentation 404 provides an alignment to indicate where the top clip 420 of the other connector 406 should grab onto the temple 402 for connection. At that position, the conductive pads at the temple will be in contact with the conductive pads or sheets at the other connector 406. There can also be another indentation 418 at the temple 402 to receive the bottom clip 416. This can further enhance the alignment process and to secure the connection.

In FIG. 7, the other connector 406 is coupled to one end of a cord and a plug 408, which can be inserted into a portable device 410, can be connected to another end of the cord. The portable device, for example, can be a cell phone. This type of non-standard clip-type connector could be easily applied to the temple with one hand, for example, while the user is driving a car.

A number of non-standard connectors have been described. In another embodiment, the contacts are based on standard connectors, which can be off-the-shelf connectors. FIGS. 8A-8E show a number of examples of such connectors.

In one embodiment, the standard connector is a standard cylindrical plug located at the end of a temple. From a different perspective, the temple molds around the end of the plug. FIG. 8A shows one such embodiment. The plug 450 can be a standard audio connector or a 3-wire or three terminal plug, such as a 3.5 mm male stereo mini-phone plug. The 3 wires for such a plug are typically one for ground, the other two applicable for two signals, such as for creating stereo effects. FIG. 8A also shows the three wires, 452, 454 and 456, inside the temple, extended from the plug 450. These wires are for connection to electrical components of the glasses.

In one embodiment, the cylindrical plug 450 shown in FIG. 8A can be protected, encapsulated or shrouded. Or, at least a portion of the plug is protected, encapsulated or shrouded. Such protection can, for example, be for aesthetic reasons, or to prevent the plug from scratching the face of the user when the user is putting on the pair of glasses. In FIG. 8A, the plug 450 is partially embedded in a temple.

Instead of a three terminal plug, other types of standard cylindrical plugs applicable to different embodiments of the present invention include a serial connector with 3 pins, typically one for ground, one for transmitting data (Tx) and the third for receiving data (Rx); or (b) a 2-wire connector, one served as ground, the other for carrying, such as power and modulated signals.

In yet another embodiment, instead of a cylindrical plug, the standard connector at the end of a temple of a pair of glasses is a USB or a FIREWIRE connector.

A number of embodiments have been described where the standard connector(s) at the glasses are male connectors. In yet another embodiment, the standard connector(s) in the glasses are female connectors. For example, there can be a 3.5 mm female stereo mini-phone plug at the end of a temple of a pair of glasses. At least a portion of the female connector can be protected, encapsulated or shrouded. For example, the female connector can be recessed within the end of a temple.

Figure 8B:
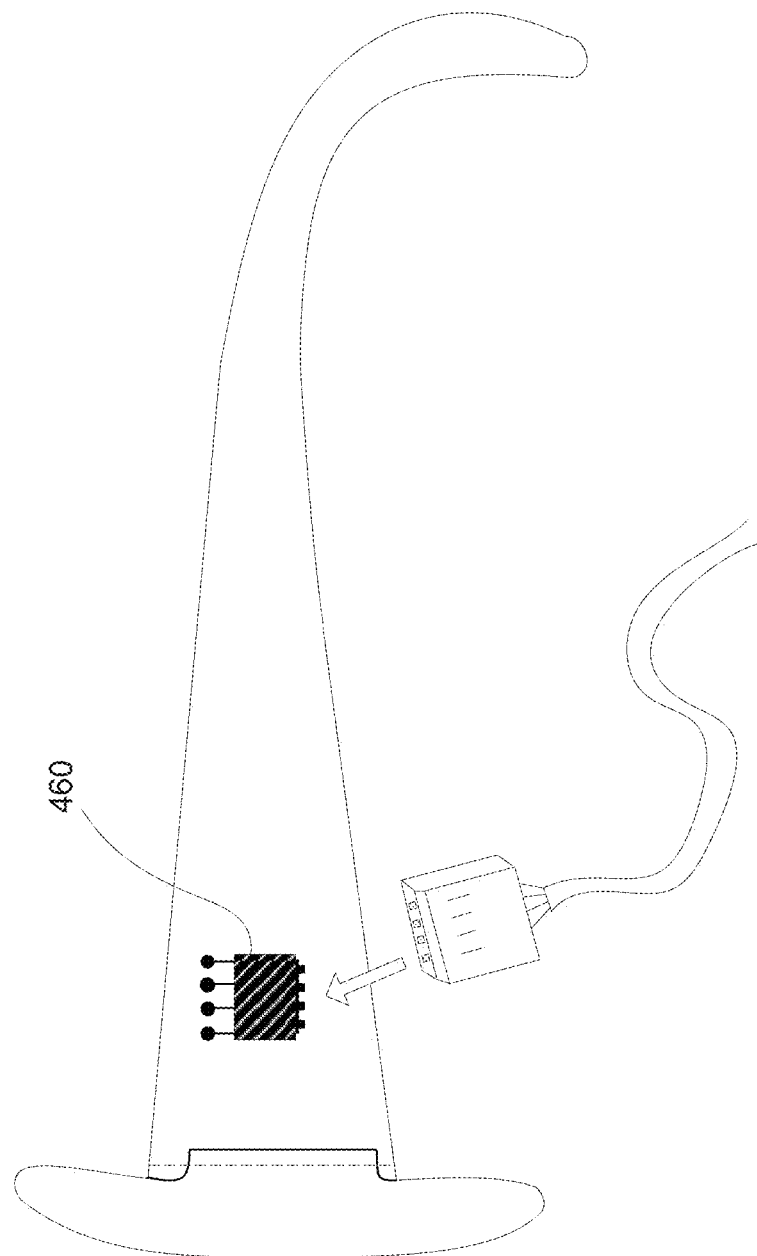
Figure 8D:
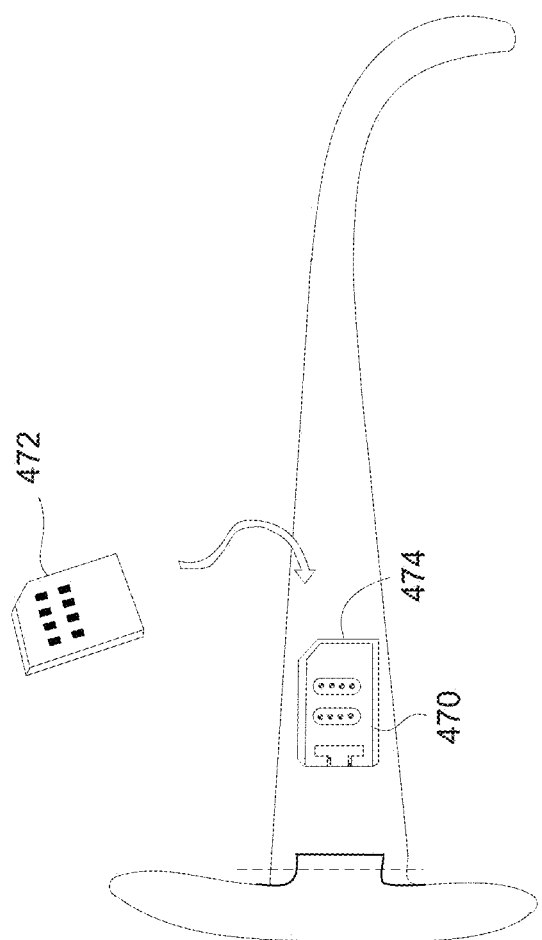
Figure 8E:
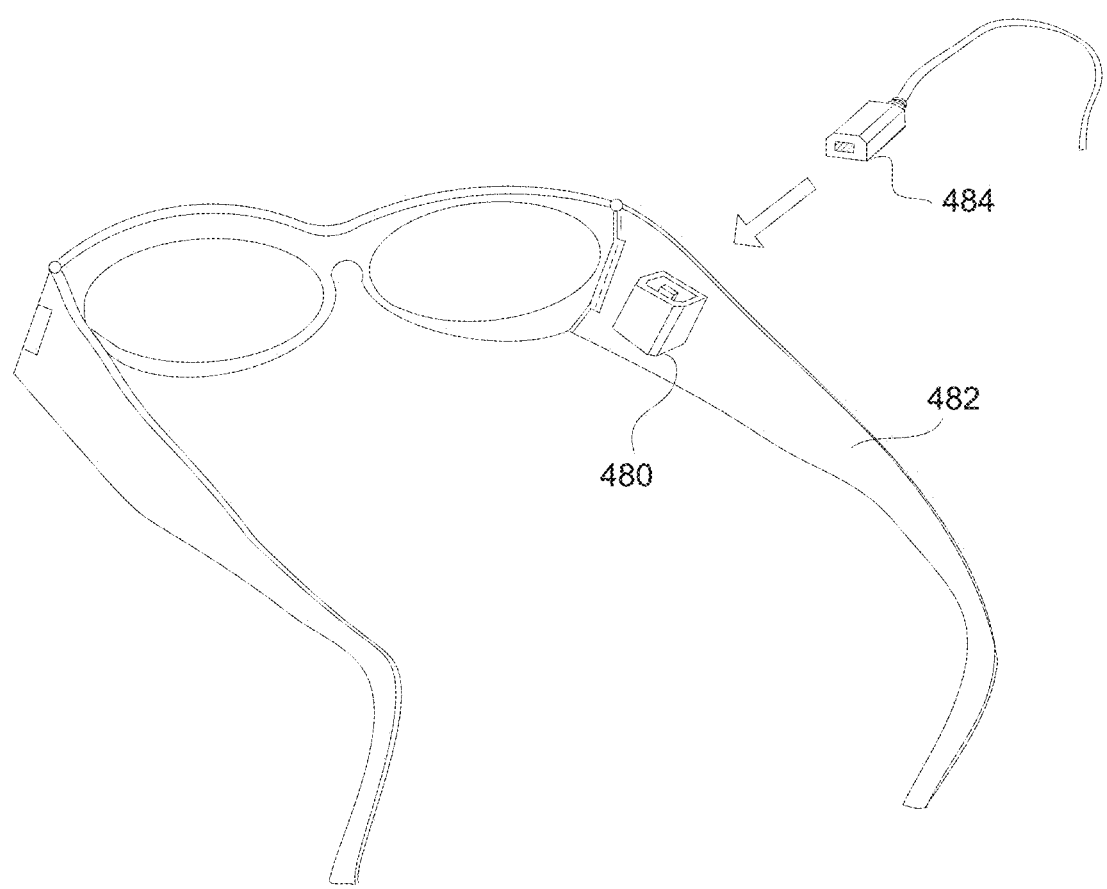

FIGS. 8B-8E show different examples of standard connectors located or partially embedded not at the end of a temple of a pair of glasses, but, for example, on the side of the temple, such as on the inside surface or the outside surface of a temple. FIG. 8B shows a 0.10" header plug 460, commonly known as a MOLEX connector, on such a surface. FIG. 8C shows a female mini-phone plug 465 on such a surface. FIG. 8D shows a card connector 470 to receive a card 472, such as a removable media card (e.g., memory card). There can be a cover 474 to secure and/or protect the media card 472 in place after it is inserted into the card connector 470. FIG. 8E shows a female USB connector 480 on the inside surface of a temple 482 to receive a male USB connector 484.

Figure 8F:
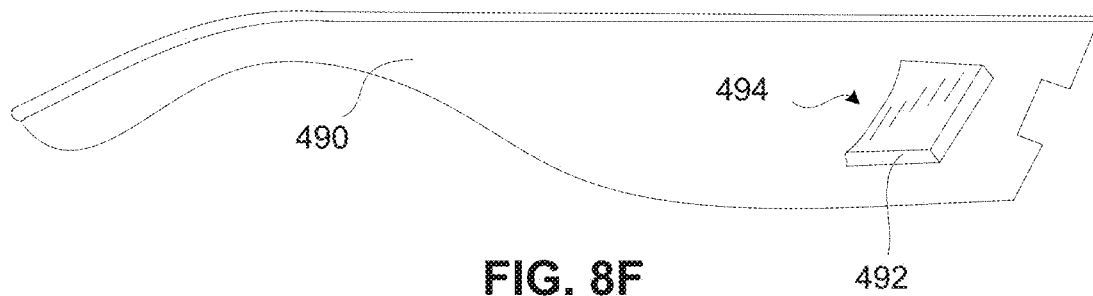
FIGS. 8F-8H are diagrams pertaining to providing a removable electronic device with an eyeglass frame according to one embodiment of the invention.
Figure 8G:
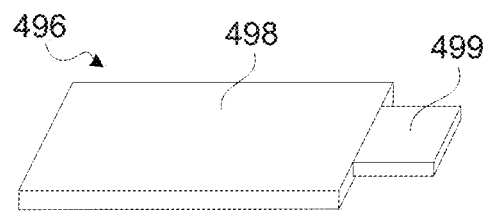
Figure 8H:
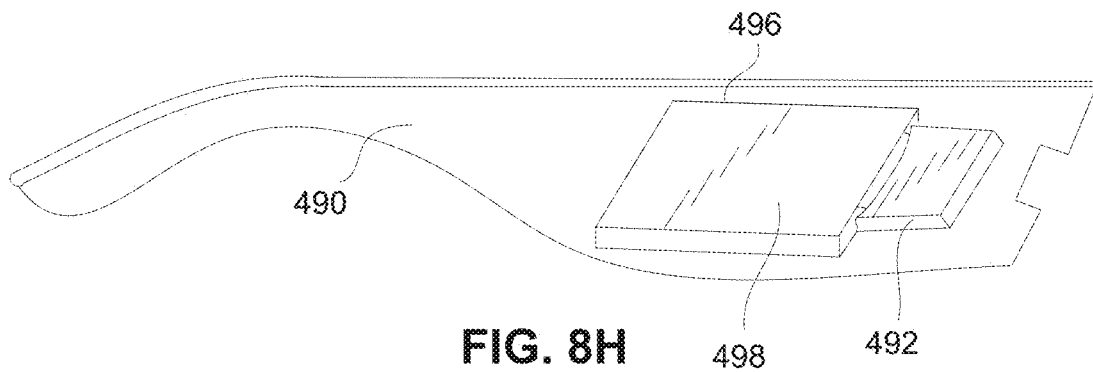

FIGS. 8F-8H are diagrams pertaining to providing a removable electronic device with an eyeglass frame according to one embodiment of the invention. FIG. 8F illustrates a temple 490 that includes a connector 492. The connector 492 includes an opening 494. A removable electronic device can be coupled to the temple 490 using the connector 492. More particularly, FIG. 8G illustrates a removable electronic device 496 that includes an electronic device housing 498 and a connector 499. As an example, the removable electronic device 496 can be a memory storage device, sometimes referred to as a memory card. FIG. 8H illustrates the removable electronic device 496 coupled to the temple 490. The removable electronic device 496 is coupled to one side of the temple 490, such side can be either an inside or outside surface of the eyeglass frame. When the removable electronic device 496 is coupled to the temple 490, the connector 499 of the removable electronic device 496 is inserted into the opening 494 of the connector 492. Physical forces between the connector 499 and the connector 492 operate to secure the removable electronic device 496 to the temple 490, yet permit the removable electronic device 496 to be removable therefrom.

In one embodiment, the connector 492 is not electrically connected to any electronic circuitry within the temple 490 or other parts of the eyeglass frame. In other words, the connector 492 provides a convenient means by which removable electronic devices can be coupled to the eyeglass frame. In another embodiment, the connector 492 can be coupled to electrical circuitry within the temple 490 or elsewhere within the eyeglass frame. Such an embodiment allows the electronic components within the removable electronic device 496 to be utilized with the electrical circuitry within the temple 490 or elsewhere within the eyeglass frame. For example, the removable electronic device 496 can provide data storage and/or other software modules to be utilized by or to utilize the other electrical circuitry within the temple 490 or elsewhere within the eyeglass frame. In any case, by attaching the removable electronic device 496 to the temple 490 (and thus the eyeglass frame), the removable electronic device 496 is able to be conveniently carried by the user of the eyeglass frame. In one implementation, the eyeglass frame, which includes the connector 492, becomes a docking station for the removable electronic device 496. As such, a variety of different removable electronic devices can be interconnected with the eyeglass frame, as desired. For example, the eyeglass frame can thus support different function or operations depending on the removable electronic device that is attached. For example, the eyeglass frame might operate as a camera, data storage device, FM radio, MP3 player, mobile telephone, pedometer, hearing enhancer, sun sensor, time piece, etc.

In one embodiment, the removable electronic device 496 can align itself with the orientation of the temple 490, such as shown in FIG. 8H. In FIG. 8G, the electronic device housing 498 can be said to have an elongated housing. The configuration (e.g., shape) and/or color of the removable electronic device 496 can also be designed to conform or complement the design of the temple 490. In one embodiment, the temple 490 might also have a recessed region to allow the portable electronic device to be less visually perceptible when attached to the temple 490 or to provide a more consistent contour of the temple 490.

In one embodiment, the connector 499 is a male connector, and the connector 492 is a female connector or a similarly sized structure. In one implementation the connector 499 is a peripheral bus connector, such as a Universal Serial Bus (USB) connector. In such cases, the connector 492 can also be a peripheral bus connector (either electrically functional or non-functional as noted above).

Although the embodiment illustrated in FIGS. 8F-8H utilize connectors, namely, electrical connectors, the removable electronic device 496 could be attached to the temple in other ways. For example, other means to provide physical forces to hold the removable electronic device 496 in place can be used.

Figure 8I:
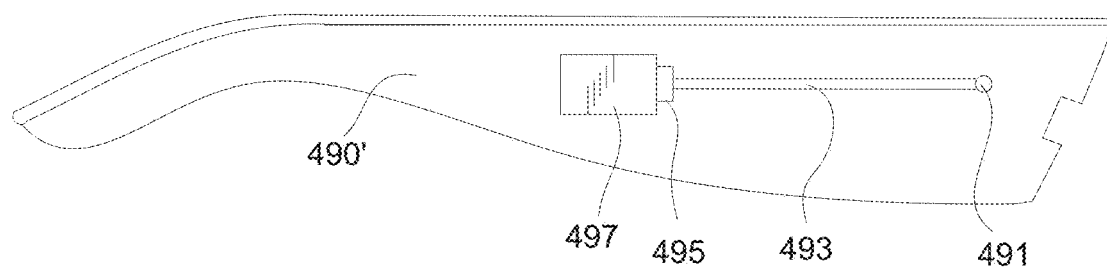
FIG. 8I is a diagram of a temple of an eyeglass frame according to another embodiment of the invention.

FIG. 8I is a diagram of a temple of an eyeglass frame according to another embodiment of the invention. In this embodiment, the temple 490' includes an opening 491 through which a cable 493 extends outward. The cable 493 has an electrical connector 495 connected at its end. The electrical connector 495 is electrically connected to electrical circuits within the temple 490' or elsewhere within the eyeglass frame such as by way of one or more wires contained within the cable 493. In one implementation, the length of the cable 493 is about one to four inches. The temple 490' shown in FIG. 8I also includes a receptacle 497. The receptacle 497 is affixed to or integral with the temple 490 to receive the electrical connector 495. Typically, the receptacle 497 provides a holding mechanism for the electrical connector 495 when not been utilized. When the electrical connector 495 is being utilized, the electrical connector 495 is removed from the receptacle 497 and coupled to a corresponding counterpart connector of another electrical device. The cord 493 can provide ease-of-use so that the electrical connector 495 can be maneuvered to couple to the counterpart connector. In one embodiment, the temple 490' can provide a recess for receiving the entire cable 493, with the outer surface of the receptacle 497 being substantially flush to the surface of the temple 490. So when the connector 495 is not in use, the connector 495 can be in the receptacle 497, with the cable 493 in the recess. In one embodiment, when the cable 493 is in the recess and the connector 495 inside the receptacle 497, the cable 493 has substantially no slack. Also, in another embodiment, the cable 493 can be retractable into the opening 491. In the embodiment shown in FIG. 8I, the electrical connector 495 is a male connector, and the receptacle 497 is a female connector or a similarly sized structure.

A number of standard and non-standard connectors have been described. Other types of connectors can also be used. In one embodiment, there is a connector adapter, which serves to transform such other type of connectors to a different interface. For example, an adapter can be a cord with one type of connector at one end and a different type of connector at the other end.

In one or more of the above embodiments, the glasses can access audio signals from another device through a connector at the glasses. The another device can be a multimedia asset players or a radio.

In one embodiment of the invention, the glasses have a storage medium (i.e., memory). The memory can be on a printed-circuit board and, for example, store 256 MBs or more. The memory can be a built-in or removable flash memory. The memory can be coupled to a device external to the glasses through one or more connectors at the glasses. As an example, a 256 MB flash memory is in one of the temples of a pair of glasses, and there is a USB connector at the free end of that temple to couple to an external device.

With the embedded storage medium, the glasses can upload information in the memory to or download information into the memory from an external device, such as a computer. A user can plug the glasses into the computer through a connector, either directly, or indirectly, with, for example, an intermediate wire in between. The user can store files in the glasses. Such an embodiment should reduce the chances of the user losing the files because the user has to lose the glasses as well.

Figure 9:
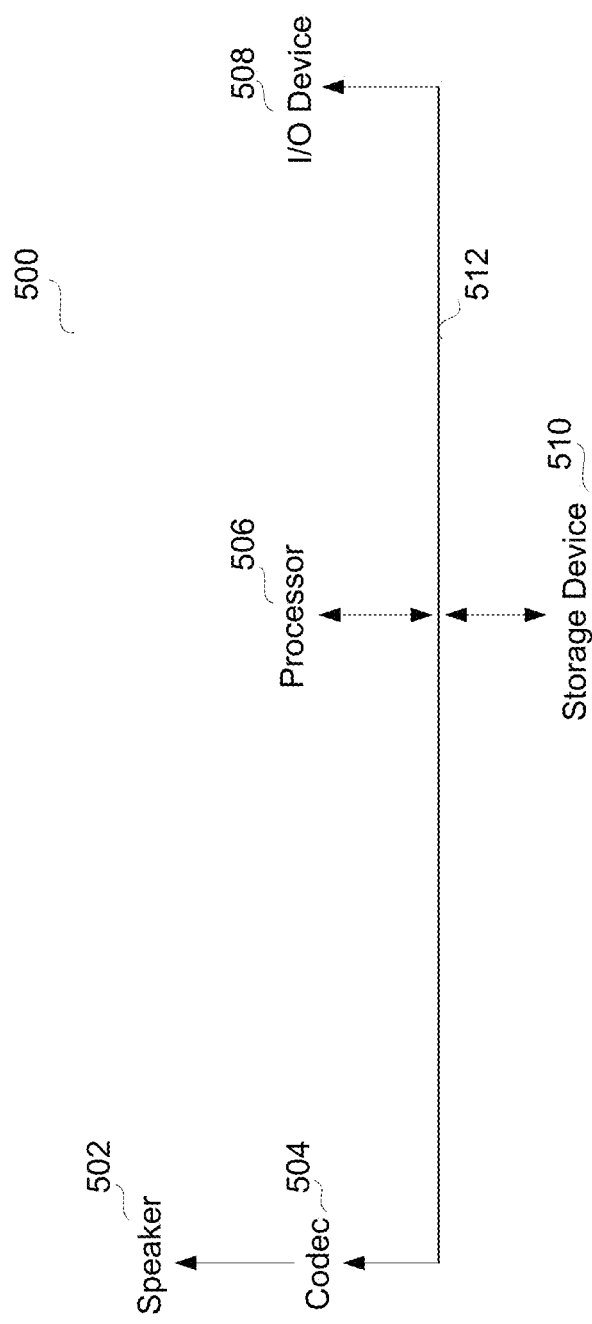
FIG. 9 shows some of the electrical components for a MP3 player according to an embodiment of the invention.

In yet another embodiment of the invention, a pair of glasses includes a multimedia asset player, such as a MP3 player. FIG. 9 shows some of the electrical components for a MP3 player 500 according to an embodiment of the invention. The player 500 includes a speaker 502 and a data bus 512, which facilitates data transfer among, for example, a processor 506, a storage device 510, and a coder/decoder (CODEC) 504. The processor 506, which can be a microprocessor or controller, controls the operation of the player 500. The storage device 510 stores the multimedia assets, such as MP3 files, or other types of media data that are appropriately formatted. In one example, the MP3 files are digitally encoded songs or other types of audio signals. The storage device 510 can include a number of separate storage elements. For example, the device 510 can be a flash memory device, or a minidisk device, and a cache, which can improve the access time and reduce power consumption of the storage device. The storage device 510 typically also includes a Read-Only Memory (ROM), which stores programs, utilities or processes to be executed in a non-volatile manner. The player 500 can also include a RAM, such as for the cache.

Once a media asset, such as a song, is selected to be played, the processor 506 would supply the asset to the CODEC 504, which decompresses the asset and produces analog output signals for the speaker 502. In one embodiment, the bus 512 is also coupled to an input/output device 508, which would allow a user to upload songs in the glasses to an external instrument, such as a computer, or download songs from the instrument to the glasses.

There are different approaches to select a song. In one embodiment, the songs or the media assets can be categorized in the MP3 player, and the categorization can be hierarchical, with multiple levels in the hierarchy. To illustrate, assume that there are three levels. The top level can be the name of the singer; the second level can be the time period when the asset was produced, and the third level can be the names of the songs. The entries, such as the name of the singer, can be abbreviated. There can be a small display and a control knob to allow a user to scroll down entries in a level. By pushing the knob, the user selects an entry, which can lead the user to a lower level. There can be an entry for moving up a level also. In another embodiment, the display is a touch-screen display, allowing entries to be entered directly on the display. In yet another embodiment, entries can be selected based on voice recognition.

A number of embodiments have been described with the glasses having a connector. In one embodiment, the glasses can have more than one connector. For example, a pair of glasses with two connectors also has a speaker. One connector is, for example, at a broad side of a temple, as in FIG. 8D. The connector can be for coupling to multimedia assets of a MP3 player. Another connector is, for example, at the end of a temple, as in FIG. 8A. That connector can couple power to the glasses. The speaker can play the multimedia assets accessed from one connector, based on power from another connector.

As described, power (e.g., external power source) can be coupled to the glasses through a connector. In one embodiment, the power source is embedded inside or inserted into the glasses. Different types of power sources are applicable. For example, the power source can be a battery, a fuel cell, a solar cell, or a re-chargeable battery. The rechargeable battery can be charged through a connector at the glasses.

In an earlier application, namely, U.S. Provisional Patent Application No. 60/509,631, filed Oct. 9, 2003, and entitled "TETHERED ELECTRICAL COMPONENTS FOR EYE-GLASSES," which has been incorporated herein by reference, there can be a base connected to the glasses through a cord. The cord can be just a piece of flexible conductor encapsulated by a flexible insulator. Typically, a cord includes a number of electrical wires or conductors. There can be one or more electrical components in the base, and there can also be one or more electrical components in the cord. The different types of connectors previously described can be located in the base. In one embodiment, a power source is an electrical component in the base tethered to a pair of glasses. In another embodiment, the glasses are tethered to a base that has a connector. The connector is connected to and draws power from an external electronic device. In this embodiment, electrical components in the glasses draw power from the external electronic devices.

Figure 10:
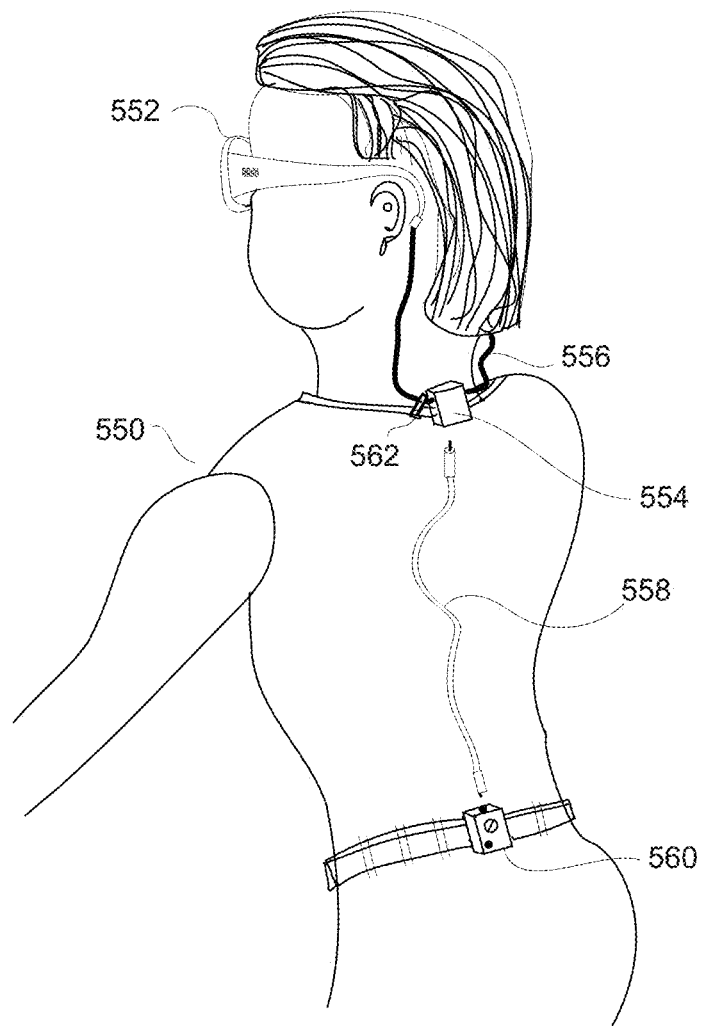
FIG. 10 shows an embodiment of the invention where a user is wearing a pair of glasses with electrical components, tethered to a base, which is connected to a portable device.

FIG. 10 shows an embodiment where a user 550 is wearing a pair of glasses 552, which include electrical components. There are also tethered electrical components in a base 554, which is connected to the glasses 552 through a cord 556. In addition, there is a wire 558 connected to a connector at the base 554 to a portable electronic device 560. The portable device 560 can be (a) a multimedia device, such as a MP3 player/recorder or a minidisk players, (b) a wireless communication device, such as a cell phone, or (c) a personal digital assistant, or other types of portable devices with computing and/or entertaining and/or communication capabilities.

Note that instead of connecting to the portable electronic device 560 through the base 554, in another embodiment, the glasses 552 directly connect to the portable device 560 through a cord.

In one embodiment, there is an attachment device 562, such as a pin or clip. The attachment device attaches at least a part of the glasses to the user's clothing. The attachment device 562 can serve to attach the cord 556 and/or the wire 558 and/or the base 554 to the user's clothing. The attachment can also be through other mechanisms, such as Velcro.

In a number of embodiments, the speaker described is assumed to emit audio signals. In one embodiment, the speaker emits ultrasonic signals. The glasses can be used, for example, as an insect repellant by transmitting ultrasound to repel insects, such as mosquitoes. In this embodiment, the one or more speakers broadcast the ultrasonic signals away from the user. In other words, the speakers face outwards, not inwards towards the user. In this embodiment, the glasses, which can include a base, also has a power source to provide power to the speaker. There can also be a control knob to turn the one or more speakers on/off on the glasses. There will be additional discussions on the control knob below.

In another embodiment, the glasses generating ultrasonic signals can be used to produce audio signals that are more directional. For example, two ultrasonic signals are generated by a speaker in the glasses, with their difference frequencies being the audio signals. The audio signals generated based on mixing the two ultrasonic signals can be much more directional than audio signals directly generated from the speaker.

Referring back to FIG. 1, in one embodiment, the glasses include a microphone 110. The microphone 110 can be at the end of a temple 104 close to a lens holder 112. Or, the microphone 110 can be in the lens holder 112, located directly adjacent to the temple 104. In yet another embodiment, there can be a small protrusion extending down from the temple to house the microphone.

With glasses having a microphone, one can use the glasses to record voices into, for example, a storage medium. The storage medium can be in the glasses, or can be in a base or a portable device attached to the glasses.

Different types of microphones can be used. For example, they can be electret microphones, crystal microphones, resistance microphones, piezoelectric microphones or moving-coil microphones.

In one embodiment, the glasses with a microphone also include a speaker that can generate directional sound. A user can speak into the microphone and his message can be transmitted from the glasses in a more directional manner.

In another embodiment, the glasses also include a notification electrical component to provide a notification to the user wearing the glasses. The notification can be to notify, alert or display information to the user. There can be a display located at the inside 114 of the lens holder, or at the vicinity of the junction 116 or the hinge of a lens holder and its corresponding temple facing the user. Or, there can be a display at the inside surface of a temple, or at other locations on the glasses. The display can be one or more light emitting diodes. To alert the user, one or more diodes can blink. The blinking can be of a specific sequence. Instead of diodes, the display can be a liquid crystal display. The display can provide indications or information to the user. For example, a number or a variable-height bar can be shown. Other than visual indications, the notification or alert can be audio, like a beeper.

In one embodiment, the notification electrical component is for selecting a multimedia asset in a multimedia asset player in a pair of glasses for the multimedia to play. The multimedia asset player can be a MP3 player.

A number of embodiments of the present invention have been described where electrical signals are transmitted to or from a pair of glasses through a physical connection. In one embodiment, electrical signals are wirelessly coupled to a pair of glasses. The coupling can be short range or long range. The coupling can be directly to the glasses, or to a base connected to a pair of glasses. The glasses with wireless coupling capabilities can be used to couple to a Bluetooth network, the Internet, a WiFi network, a WiMax network, a cell-phone network or other types of networks. The coupling can also be through a point-to-point link, such as an infrared link.

FIGS. 11A-11B show examples of some of the electrical components in or tethered to a pair of glasses for wireless connections, according to embodiments of the present invention. In FIG. 11A, a high frequency or RF antenna 602 wirelessly captures high frequency or RF signals for RF transceiver circuits 604. If the transceiver circuits are for a conventional superheterodyne system, the transceiver circuits 604 mix the RF signals down to IF signals. Then the IF signals are processed by baseband circuits. Digital outputs from the baseband circuits are coupled to a processor 608 for analysis and synthesis.

Outputs from the processor 608 are fed to a D-to-A converter 610 to generate audio signals for a speaker 612. Similarly, audio analog signals from a microphone 614 can be fed to an A-to-D converter 616 to generate digital low frequency signals for the processor 608 and then to the RF transceiver circuits 604. The low frequency signals are up-converted by the RF transceiver circuits 604 and wirelessly transmitted by the antenna 602.

In another embodiment, digital conversion is moved closer to the antenna. For example, instead of mixing RF into IF signals, the RF transceiver circuits 604 directly perform digital conversion from the RF signals.

Typically, high frequency filters are used at the front end of the RF transceiver circuits 604 for the RF signals. In one embodiment, to save space, FBAR (film bulk acoustic resonator) duplexer is employed. A set of piezoelectric filters can be used to separate incoming and outgoing signals. For cell phone operation, such filters can enable a user to hear and speak simultaneously. A number of these electronic devices can be on a circuit board in the glasses. Or, some of the devices are in the glasses, while other in the base tethered to the glasses.

FIG. 11B shows another example of some of the electrical components in or tethered to a pair of glasses for wireless connections according to the present invention. In this embodiment, there does not need to have digital data. A speaker 620 and a microphone 622 are connected to an analog interface circuit 624, which is coupled to a RF transceiver circuit 626 and an antenna 628. For the speaker application, the transceiver circuit 626 mixes the RF signals down into IF signals, which are converted by the analog interface circuit 624 into analog signals for the speaker 620. Similarly, for the microphone application, its analog signals are converted into the IF signals by the analog interface circuit 624 to be up converted by the transceiver circuit 626 into RF signals for the antenna 628. These types of circuitry are suitable for, such as, simple radios, analog cell phones, CB radios, walkee-talkees, police radios or intercom systems.

In one embodiment, most of the electrical components are not in the glasses. The pair of glasses includes an antenna to capture the wireless signals, and a connector. The wireless signals captured are transmitted through the connector to electrical circuits external to the glasses.

A number of processors have been described. The processors can use different types of operating systems. In one embodiment, Symbian Operating Systems are used. In another embodiment, operating systems, such as TinyOS, are used. The operating system could be programmed in C++ and then compiled into machine codes.

For privacy protection, signals can be encrypted before transmission. Encryption can take significant computation power, and may generate a fair amount of heat. In one embodiment, encryption capabilities are located in a base tethered to the glasses. There can be a fan inside the base. The fan can be turned on during encryption. In another embodiment, the fan is activated during other high capacity uses for heat dissipation purposes.

In yet another embodiment, there is a fan in the glasses. The fan is located at a temple of the glasses, in the region close to its lens holder. The fan is used to cool the wearer of the glasses.

In one embodiment, a pair of glasses has access to voice recognition software. The software can be embedded in (a) the glasses, (b) a base tethered to the glasses, (c) a portable device wired or wirelessly coupled to the glasses or to the base, or (d) a computing system wired or wirelessly coupled to the glasses. Or, the software or firmware can be in more than one of the above devices.

Glasses that can couple to signals wirelessly can be used in different applications. For example, the glasses can be a cell phone wireless head set, such as a Bluetooth cordless headset. Such short-distance wireless technologies allow the headset to connect to the user's cell phone without a wire. This would allow the user to drive, eat or perform other functions without getting tangled in a pesky wire.

In one embodiment, the cell phone is a VOIP (voice over Internet protocol) phone.

In one embodiment, for the glasses operating as a cell phone head set, the head set includes active noise cancellation mechanism. For example, the glasses include two microphones. One microphone is for capturing the voice of the user. But the microphone captures ambient noise also. It can be embedded in a protrusion extending from the end of the temple close to a lens holder, towards the mouth of the user, as the microphone 110 in FIG. 1. Another microphone can be located at the top of one of the lens holders pointing away from the mouth of the user. This microphone is for capturing ambient noise. As a first order approximation, outputs from the two microphones could be subtracted from each other to provide voice signals with noise reduced.

In yet another embodiment, the glasses with wireless coupling capabilities also have a multimedia asset player, such as a MP3 player. The glasses can be used to receive music directly in digital format over, for example, a data-capable network of a mobile operator. The music can be received, for example, at a speed of 16 Kbits per second, providing sound quality close to compact disc. If the music is transmitted in a compressed manner, such as in a MP3 format, then the music data can be received at a much lower speed. In one embodiment, the glasses also have a microphone and can serve as a cellular phone or a wireless headset of a cellular phone.

In yet another embodiment, the glasses can serve as a radio, again through electrical components in or tethered to the glasses. In this embodiment, the glasses can include a tuner with one or more control knobs. The knobs can be used to select channels and to set the volume.

In one embodiment, a pair of glasses allows personalization by including a preference indicator. The indicator allows a user to provide his preference, such as on whatever is being output by the glasses. In one example, the glasses also has a radio having a speaker and with electrical components for wireless connection. In this example, the indicator can be used by the user to provide his preference regarding whatever is being played by the radio at that time. This preference can be wirelessly transmitted from the glasses to a third party. To illustrate, when the user is listening to a piece of music, the user can indicate he likes the piece of music by pressing a control knob on the glasses. This piece of preference information is then transmitted and received by a service provider, which is then informed of the user's preference. Instead of a control knob, in another embodiment, the preference indicator is a system with a microphone and voice recognition software. The user can indicate his preference vocally.

In another example regarding the personalization process, the glasses can serve as a multimedia asset player, such as a MP3 player. The song that the user has shown preference can be stored in a storage device, which can be in the glasses.

Figure 12:
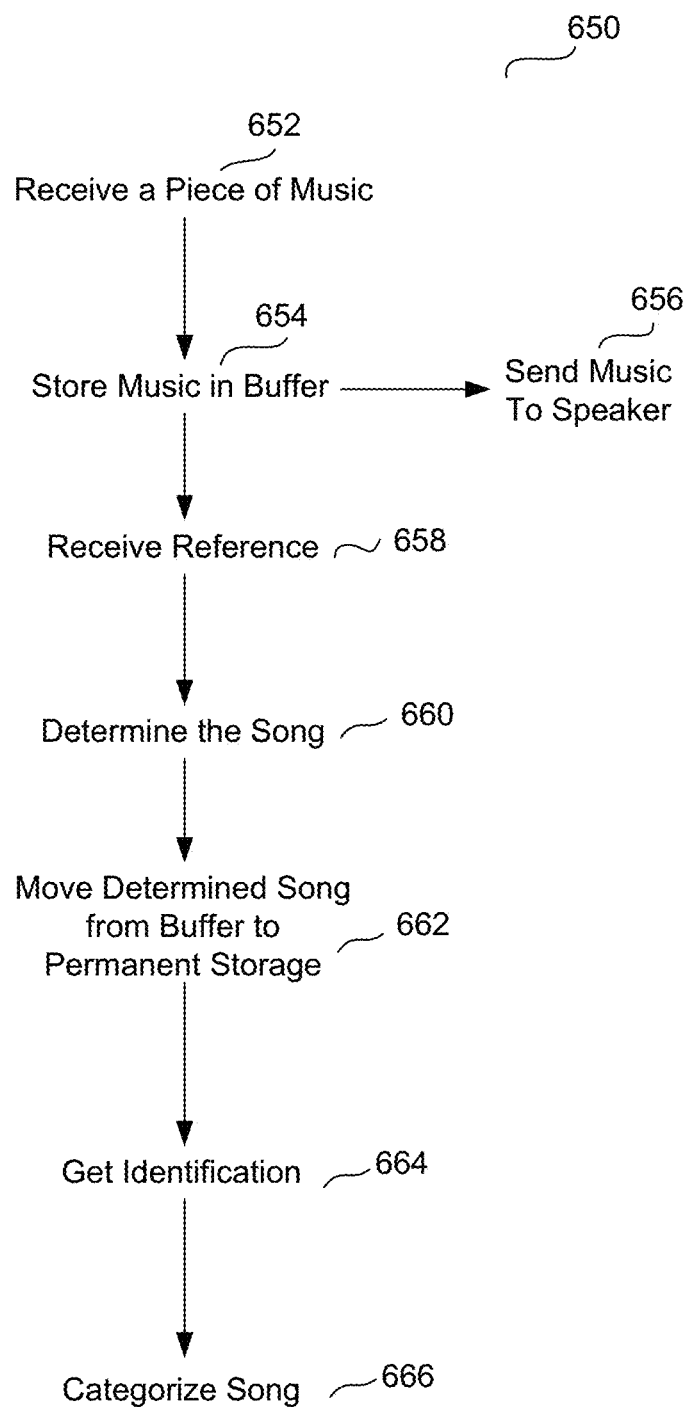
FIG. 12 shows a process for a personalized radio according to one embodiment of the present invention.

FIG. 12 shows a process 650 according to one embodiment of the present invention for a personalized radio.

Initially, a pair of glasses according to the present invention receives 652 a piece of music from a radio station. That piece of music is stored 654 in a buffer or a temporary storage area. This temporary storage area can be in the glasses or tethered to the glasses. The piece of music is also sent 656 to a speaker in the glasses.

Assume that the user likes the music. Based on the preference indicator, the user shows his preference. After the glasses receive 658 an indication of the user's preference, the glasses determine 660 the song corresponding to the indication. That piece of music can then be moved 662 from the buffer to a permanent storage area, such as into a flash memory. This would then allow the user to subsequently access the piece of music.

There are different ways to determine 660 the song or the content being played by the radio corresponding to the indication. For example, one rule is that when the user pushes the preference button or voices his preference, the song (or media asset or media file) that is being played is the one the user likes. Since the operating system knows what song is being played at what time, based on the rule, the song of preference is determined. Another rule is that when the user shows his preference, and there is no song being played at that instance, the song immediately preceding the break is the song of preference.

In another embodiment, the glasses can get 664 an identification for the song of preference. For example, the glasses can ask the user to provide an identification for the piece of music. This identification can be the type of music, the singer, the name of the music or other identification. In another embodiment, there can be meta data embedded, such as in the beginning part of the music (or media asset). Having such meta data embedded is not uncommon for music in digital format. The meta data can include identifications for the music. The glasses can get 664 such identification. Based on the identification, the song is categorized 666 accordingly, such as grouped with other songs having the same identification. Such categorization process would enhance the ease of accessing the song by the user at a later time.

Figure 13:
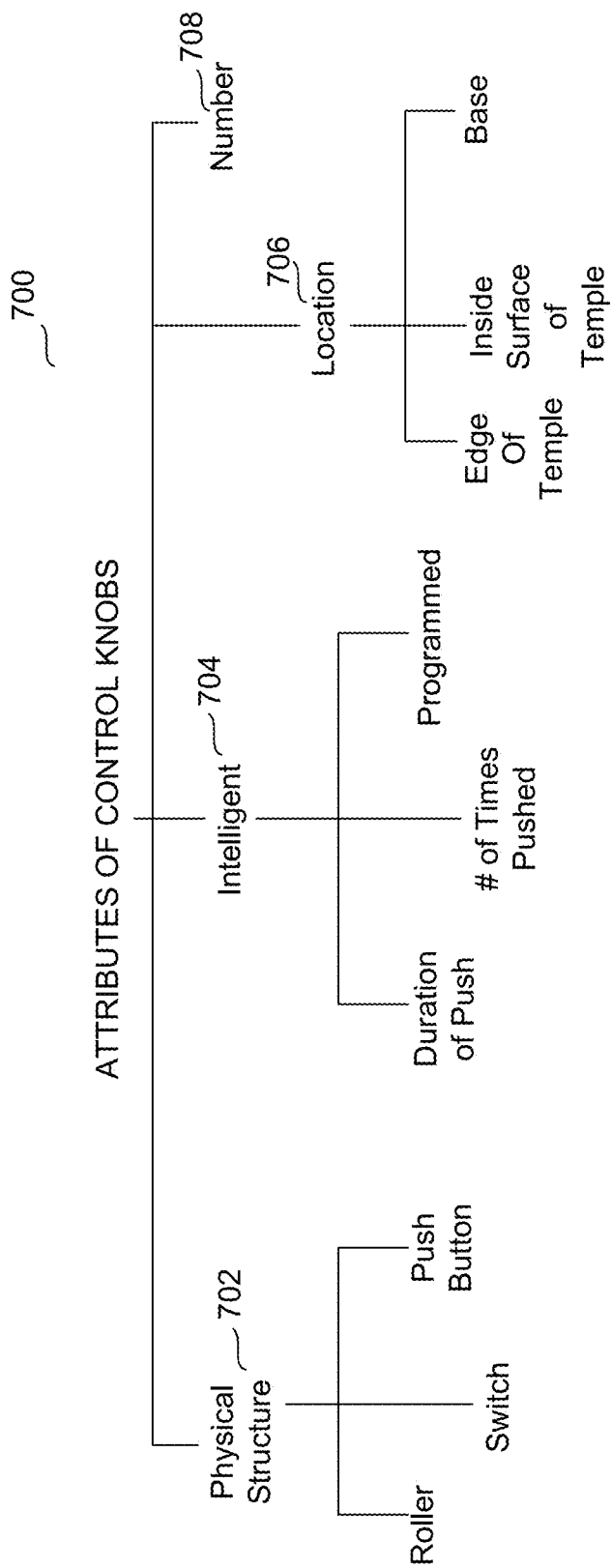
FIG. 13 shows a number of attributes of control knobs according to different embodiments of the present invention.

A number of control knobs have been described. FIG. 13 shows a number of attributes 700 regarding control knobs according to the present invention. The knobs can be of different physical structure 702. For example, a control knob can be a roller, a switch or a push-button. A control knob serving as an up/down controller can use two buttons, or a roller.

A control knob can be more intelligent 704. For example, a push-button control knob can serve different purposes depending on the duration the knob is being pushed. If a user pushes it for more than three seconds, the knob serves as an on-off toggle switch. In another example, a knob can serve multiple purposes, and the specific purpose depends on the number of times the knob is pushed.

A knob can also be programmed. A user can connect the glasses to a computer and program the knob accordingly. For example, one can program a knob such that if the knob is pushed more than three seconds, the knob would serve as an on/off switch for the glasses.

The location 706 of a control knob can vary for different applications. A control knob can be located on the glasses. A control knob can be on the top, the side or the bottom of the temple. A control knob can be located at the inside of a temple facing the user. Assume that there are a number of control knobs and all of them are on the edges of a temple, except one. By being at a position different from other control knobs, this knob can serve a specific purpose. For example, it can be an on/off control knob. In yet another embodiment, a control knob can be located in a base tethered to the glasses.

The number 708 of control knobs can vary depending on operations. For example, there is an on/off control knob and a volume up/down control knob. If the glasses are used for cell phone headset application, in one embodiment, there is also an answer/hang-up control knob. If the glasses serve as a radio, in one embodiment, there is also a tuning control knob, which can be two push buttons. If the glasses serve as a CD player, in one embodiment, there is a play control knob, a stop control knob, and a skip forward/backward control knob. If the glasses serve as a multimedia asset player, such as a MP3 player, in one embodiment, there is a save-this-song control knob, a skip-forward/backward-song control knob and a select-song-to-play control knob.

A number of embodiments of the present invention have been described regarding audio signals. In one embodiment, the glasses further serve as a camera.

Figure 14:
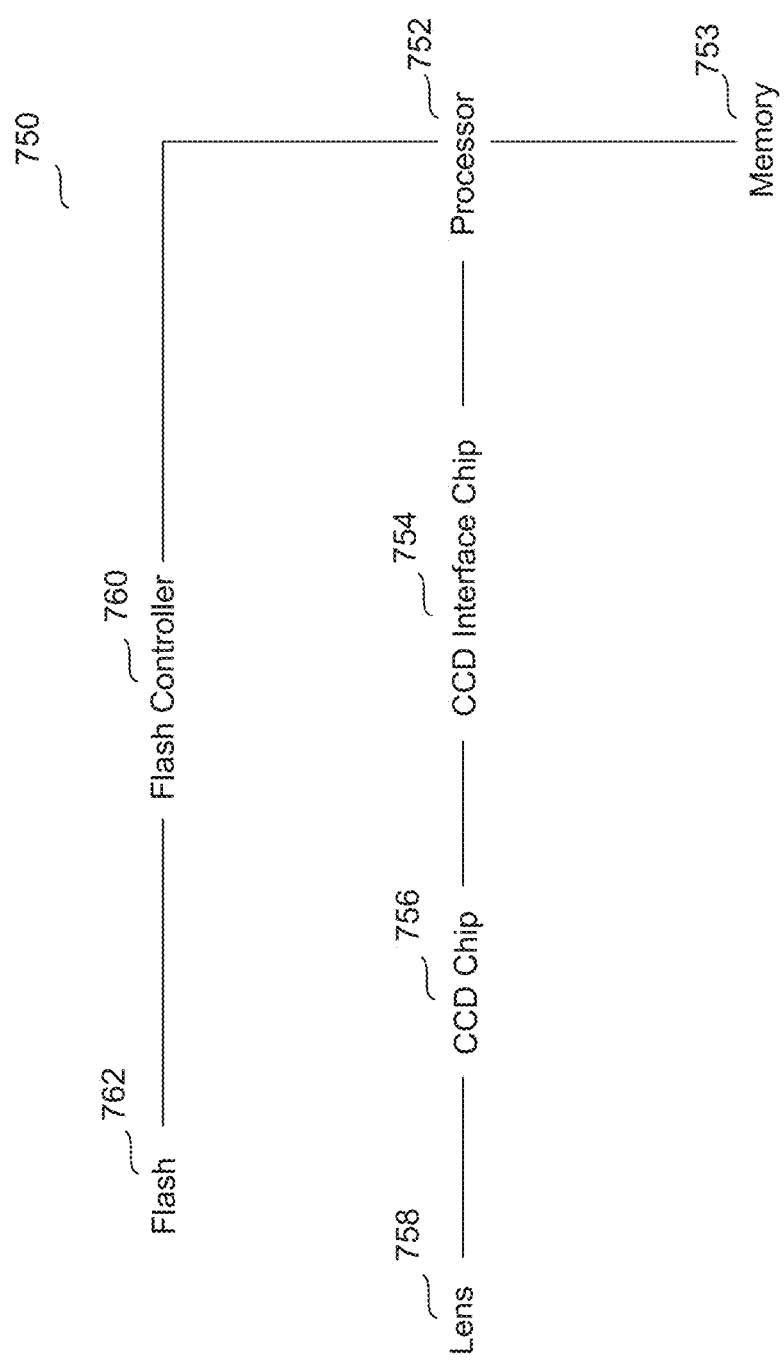
FIG. 14 shows some of the electrical components for capturing images with a pair of glasses according to an embodiment of the present invention.

FIG. 14 shows one embodiment of electrical components in a pair of glasses with image capturing capabilities. A processor 752 is coupled to a CCD interface chip 754 and then to a CCD chip 756. Images focused by a lens 758 are captured and collected by the CCD chip. In another embodiment, there is also be a flash controller 760 connected to the processor 752 to control a flash 762.

In one embodiment, a number of pixels of the CCD chip 756 are used as light sensors. The pixels can be used to adjust the sensitivity of the CCD chip 756 based on the amount of ambient light. For example, if the outside environment is dim, it would take a longer period of time to collect enough charges by the CCD chip 756 to re-create the image. This implies that the integration time of the CCD chip 756 should increase.

In yet another embodiment, the camera can pertain to a video camera. The capacity of the memory 753 increases so as to store the video images.

In one embodiment, the glasses do not offer adjustment on the image distance. The CCD chip 756 can be located, for example, at the focal point of the lens 758. In another embodiment, there is an image distance control knob. For example, a mechanical lever can be pre-programmed or pre-set to move the lens to one or more different positions. One position can be for close-up shots, such as objects from 2 to 4 ft, and another for scenic or vista images, such as objects greater than 6 ft.

Depending on the embodiment, electrical components of a camera can be in a pair of glasses, and/or a base tethered to the glasses, and/or a portable device tethered to the glasses or to the base. For example, the memory 753 can be in the base tethered to the glasses.

The location of the lens 758 can vary depending on the embodiment. In one embodiment, referring to FIG. 1, one location is at the bridge of the glasses, with the lens of the camera facing forward. In this situation, what the user sees is substantially what the captured image would be. In other words, in a general sense, what the user sees is what the user gets. With such an embodiment, it is relatively easy for a user to take pictures, hands-free. In another embodiment, another location for the lens 758 are at a side portion adjacent to a lens holder, before the joint of the corresponding temple, such as at 116 in FIG. 1. Again, the lens of the camera faces forward. Some of the electrical components of the camera can be in that location, and other components in the temple 104. These components are electrically connected through one of the joints, such as with a flexible pc board. In yet another embodiment, the lens 758 can face sideways and outwards in a temple of a pair of glasses, towards the left or right side of the user.

Regarding storing the images, in one embodiment, the images are stored locally. One approach to determine which image to store is the first-in-first-out approach. Once the camera is turned on, the camera takes pictures continually in an automatic mode, such as once every few seconds. When the memory becomes full or under other pre-set or pre-programmed condition, the first picture stored will be deleted when the next picture comes in. In another embodiment, the digital content in one picture is compared to the digital content in, for example, the fifth picture further down. If the difference between the two is not more than a pre-set threshold, the four pictures in between will be deleted. One approach to determine the difference is by comparing the total charges collected by the CCD chip for the two images. If the two sets of charges do not differ by more than a certain threshold, the images in between would be deleted.

The images captured can also be stored at a remote site. For example, the glasses can upload the images to a computer, wirelessly or through a wired connection from a connector at the glasses.

Figure 15:
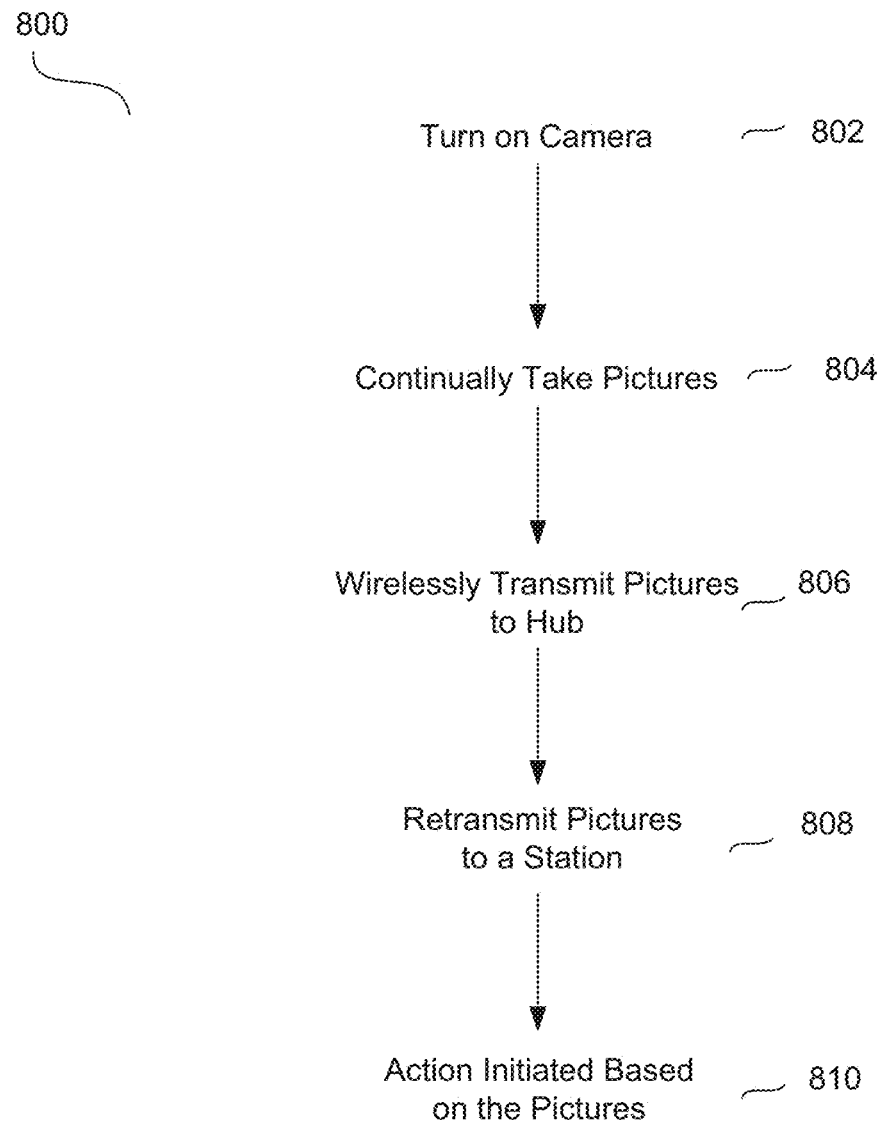
FIG. 15 shows an operation of taking actions based on images captured with a pair of glasses with wireless transceiver capability according to one embodiment of the invention.

FIG. 15 shows an operation 800 of taking certain actions based on images captured by a pair of glasses with a wireless transceiver, according to one embodiment of the invention. This operation can be used by a police officer on patrol. Before the officer gets out of his patrol vehicle to confront a suspect, the officer can inform the station. At that point, the camera is turned on 802.

There can be different approaches to turn on the camera. In one embodiment, an operator at the station can remind the officer to turn on the camera. Or, the operator can remotely turn on the camera. In yet another embodiment, the camera can be automatically turned on under certain condition. One such condition is that if the camera is out of the patrol vehicle, the camera is automatically turned on. With the glasses having the capability to wirelessly communicate with the patrol vehicle, one method to detect if the glasses are out of the patrol vehicle is based on the wireless signal strength of the glasses. The patrol vehicle can detect the signal strength of the wireless signals, which depends on the distance between glasses and the vehicle. A threshold can be set. If the signal strength is below the preset threshold, the glasses would be assumed to be out of the car, and the camera would be automatically turned on.

After the camera is turned on 802, the glasses start to continually take 804 pictures, such as once every few seconds. The pictures taken are automatically transmitted back 806 to the patrol vehicle in a wireless manner. In this situation, the patrol vehicle serves as a hub, which stores the pictures. Then, the hub re-transmits 808 the pictures back to the station. Note that the pictures can be compressed by standard algorithms before they are transmitted. This compression mechanism can be performed by a computer in the patrol vehicle. When the station gets the pictures, they are de-compressed before being viewed, such as by the operator. The pictures enable the operator at the station to see what the officer is confronting. This effectively allows the operator at the station to perform real-time monitoring of or for the officer. If it is a high risk situation, the operator can quickly react 810, such as by dispatching additional support for the officer. In one embodiment, the glasses can include not only a camera but also a microphone for audio pickup, such as sounds from the officer, suspect, witness or environmental sounds (such as door opening, gun shot, etc.).

Regarding ownership of the glasses, the user can own the glasses. In one embodiment, the user leases the glasses from a provider. For example, the user leases a ski goggle with a camera. After the user turns on the camera, as the user skis, the goggle automatically takes pictures. Later, the user can return the goggle to the provider or a kiosk, where the pictures can be retrieved and/or stored. Alternatively, the goggle can include a wireless transceiver and the images could be uploaded continually or automatically to the provider or the kiosk via a wireless network. The provider or the kiosk can transmit the images to a website, such as a website associated with the user. In another embodiment, the user picks up hardcopies of the images, e.g., a CD with the images or a DVD with the video, from the provider or the kiosk.

In one embodiment, the glasses allow the user to enter his identification. This can be done, for example, through a control knob at the glasses. Such identification is then linked to the images. Based on the identification, the user can return to the provider or kiosk at a subsequent time to pick up the images previously left behind.

Figure 16:
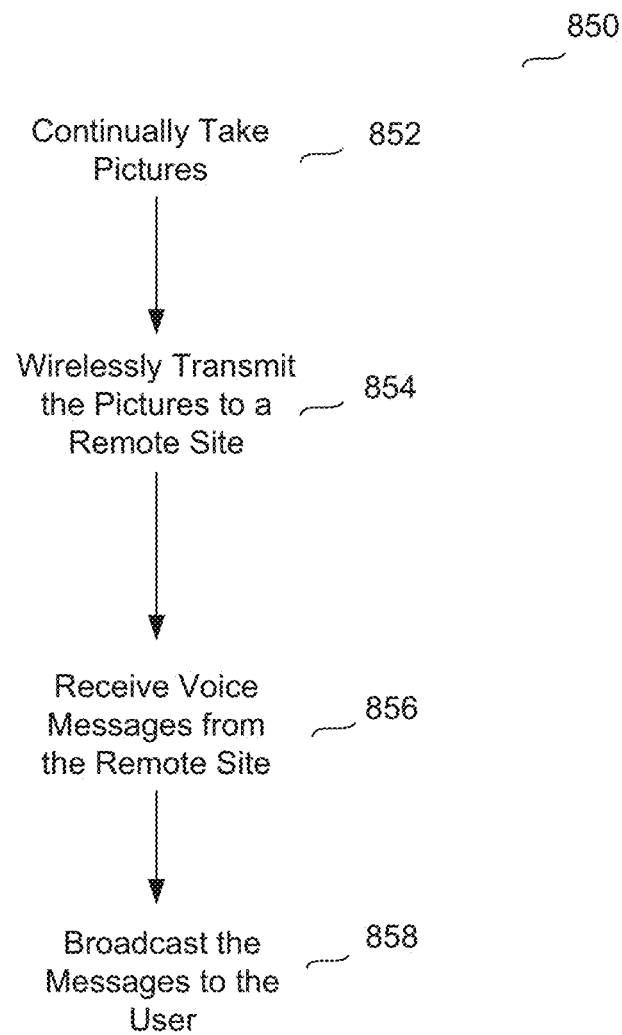
FIG. 16 shows an operation to provide messages to a user based on images captured by a pair of glasses according to an embodiment of the present invention.

In yet another embodiment, the pair of glasses with a camera also has a speaker and a wireless transceiver. It can be used to remotely control or direct the user wearing the glasses. FIG. 16 shows one such operation 850 according to one embodiment.

To illustrate the operation 850, assume that the user is a paramedic helping a patient. The glasses continually take pictures 852 of objects directly in front of the paramedic, such as images around four feet away from the eyes of the paramedic. The pictures are wirelessly transmitted 854 to a remote site, such as a hospital, to be viewed by a doctor. Again, this transmission can be a two-step process. For example, pictures can be transmitted to the paramedic's ambulance, which can then re-transmit to the remote site. The first transmission from the glasses to the ambulance can be through a low-power, short-range, broadband, wireless transmission protocol. The second transmission from the ambulance to the hospital can be through a much longer-range, higher power, broadband, wireless transmission protocol. Again, compression and de-compression techniques can be used to enhance the rate of transmission by reducing the amount of data to be transmitted.

Based on the images, the doctor sends out voice messages to the paramedic. These messages are wirelessly transmitted to and received 856 by the glasses. The speaker in the glasses outputs 858 the messages to the paramedic.

In another embodiment, the glasses also have a microphone, which allows the paramedic to communicate directly with the doctor also.

In one embodiment, the glasses can take pictures and can be a multimedia asset player. Pictures and the multimedia assets can share the same memory storage device. In this situation, the capacity for the multimedia assets and pictures can be interrelated. For example, a user can take more pictures if there are less multimedia assets, such as fewer songs in the storage device.

A number of embodiments have been described regarding electrical components in the temples of glasses. The locations selected are for illustration purposes. In other embodiments, some of the components are embedded fully or partially in other areas of the glasses, such as the lens holders or the bridges of the glasses. For example, there are glasses where there are shields at the edges of the lens holders of the glasses. These shields can wrap around, or better conform to the profile of, the face of the wearer. There can be transparent or translucent windows on these shields also. The shields are not limited to be in primary frames. They can be in, for example, fit-over glasses, auxiliary frames or safety glasses.

To illustrate, in fit-over glasses, such shields can go over or cover at least a portion of the primary frames. One or more electrical components can be in such shields. In still another embodiment, one or more electrical components can be in a strap tied to the corresponding eyewear, such as a sports strap tied to the corresponding sports eyewear. For example, the one or more electrical components can be at least partially embedded in or attached to a strap. As one particular example, an audio player or wireless communication module can be at least partially embedded in or attached to the strap. The strap may also provide electrical conductors (that are attached or internal to the strap). Such electrical conductors can be coupled to a speaker to produce audio output to the speaker, or can be coupled to a microphone to receive audio input from the microphone. The speaker and/or microphone can also be attached to or integral with the strap.

Note that in one embodiment, a pair of glasses does not have to include lenses. Also, a number of embodiments have been described with a pair of glasses tethered to a base. In one embodiment, a pair of glasses includes a base and a cord connecting the base to the glasses.

Figure 17A:
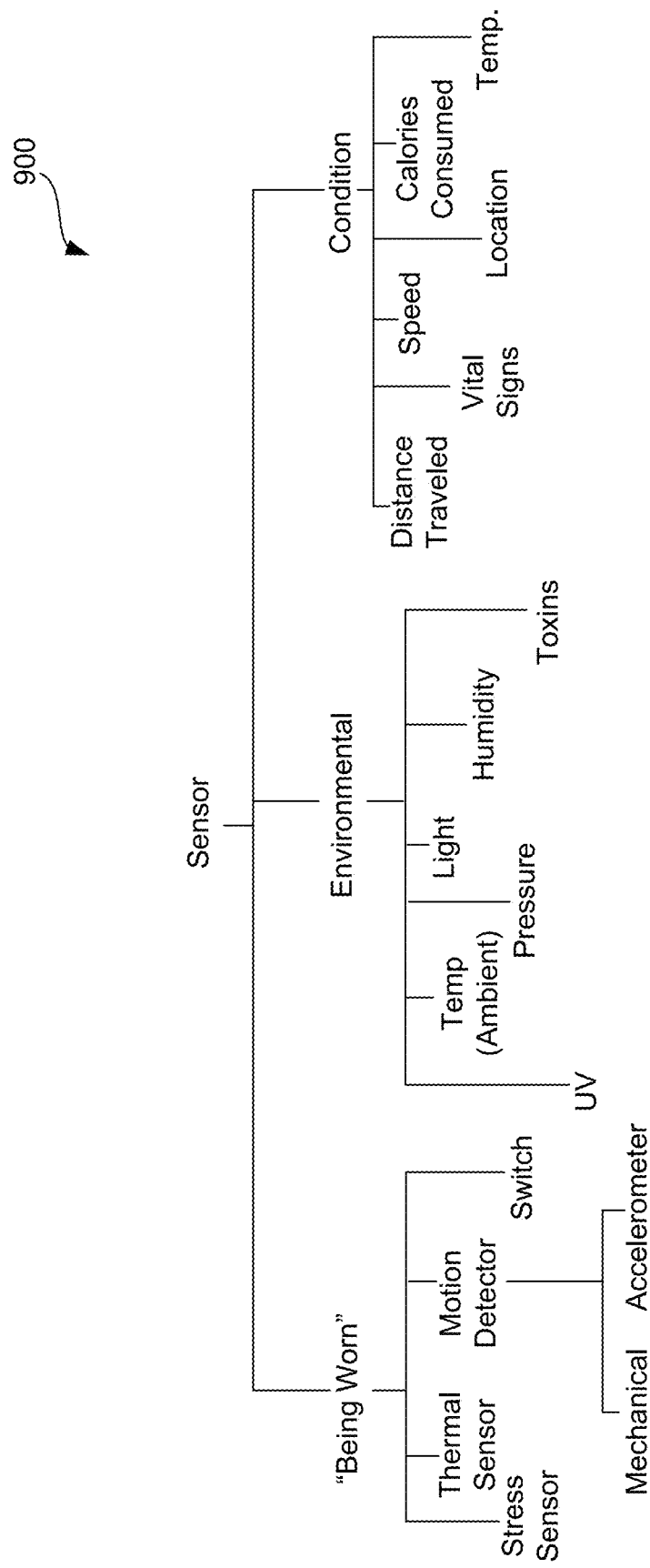
FIG. 17A is a chart that depicts examples of sensors in a pair of glasses according to different embodiments of the present invention.

In yet another embodiment, a pair of glasses also includes a sensor. FIG. 17A is a chart 900 that depicts examples of sensors in the glasses.

In one embodiment, the sensor is a "being worn" sensor. The "being worn" sensor indicates whether the glasses are being worn by its user. The "being worn" operation can be performed using, for example, a thermal sensor, a motion detector, a stress sensor or a switch.

In one embodiment, a motion detector is used as a "being worn" sensor. A threshold can be set, such that if the amount of motion exceeds the threshold, the eyewear is assumed to be worn. The motion detector can, for example, be achieved by a mechanical means or an accelerometer.

In another embodiment, the "being worn" sensor includes two thermal sensors. One sensor can be at approximately the middle of a temple, such as in a region that touches the head of the user wearing the glasses. The other sensor can be at the end of the temple, close to its hinge. If the temperature differential between the two sensors is beyond a certain preset value, the eyewear would be assumed to be worn. The differential is presumed to be caused by a person wearing the pair of glasses.

In yet another embodiment, the "being worn" sensor includes a stress sensor at the hinge of the temple. The assumption is that when the eyewear is worn, the hinge is typically slightly stretched because typically, the width of the head of the user is slightly wider than the width between the temples when the two temples are in the extended positions. If the value of the stress sensor is beyond a certain preset value, the glasses would be assumed to be worn.

In a further embodiment, the "being worn" sensor can be a switch. For example, at the hinge between a temple and its corresponding lens holder, there is a switch. When that temple is fully extended outwards, the switch is turned on. The switch can be a pin. When the temple is fully extended outwards, the pin is pressed. When both temples are fully extended outwards, in one embodiment, the glasses would be assumed to be worn by the user.

In one embodiment, another type of sensor is an environmental sensor. The environmental sensor can sense environmental conditions, such as one or more of ultraviolet radiation, temperature (e.g., ambient temperature), pressure, light, humidity and toxins (e.g., chemicals, radiation, etc.).

In another embodiment, another type of sensor is a condition sensor. The condition sensor can sense the conditions of the user of the glasses. Examples of physical sensors include sensing one or more of distance traveled, location, speed, calories consumed, temperature and vital signs associated with the user of the glasses. The distance traveled could represent the horizontal distance traveled or the vertical distance (i.e. elevation) traveled. The speed can be the rate of movement along the horizontal distance traveled and/or the vertical distance. In yet another embodiment, the condition sensor can sense the emotional conditions of the user of the glasses.

The sensors can be provided in a redundant or fault-tolerant manner. For example, sensors can come in pairs in the glasses. When one malfunctions, the other one will take over its operation. In another embodiment, the sensor information can be processed in a differential manner to examine changes to the sensor information. The sensors can by powered by a battery, solar energy, or kinetic energy. For reduced power consumption, the sensors can remain in a low-power state unless data is being acquired by the sensors. In yet another embodiment, two or more of the auxiliary sensors can communicate with one another (wired or wirelessly) to exchange data or control information.

A number of embodiments have been described regarding one or more electrical components at least partially embedded in a pair of glasses. In one embodiment, one or more electrical components are at least partially embedded in a temple tip of a pair of glasses. Temple tips are particularly common for wire or metal frames. The pair of glasses has a first and a second lens holders for receiving lenses. Each of the lens holders has a first side and a second side. The pair of glasses has a bridge element that couples the first side of the first lens holder to the second side of the second lens holder. The pair of glasses also includes a first temple and a second temple. The first temple is pivotally secured to the second side of the first lens holder through a joint, while the second temple is pivotally secured to the first side of the second lens holder through another joint. A temple typically has two ends, a first end and a second end. The first end can be the end that is pivotally secured to a lens holder through a joint, and the second end can be the other end of the temple. It is not uncommon that a temple includes a main body and an enclosure that grabs onto the main body of the temple. The second end is typically where the enclosure grabs onto the main body. The enclosure can be made of a different material than the main body of the temple. In one embodiment, such an enclosure is a temple tip, and there is an electrical component, partially or fully, embedded in the tip. There can also be a connector, such as the connector 300 shown in FIG. 5, at the temple tip. In another embodiment, the temple tip can include a female connector, which can be similar to the female connector 310 shown in FIG. 6B. As the temple tip grabs onto the main body of the temple, the female connector can make electrical contact with a male connector at the main body of the temple. Typically, particularly before a pair of glasses has been extensively worn, the temple tip can be removed and re-inserted back on to the main body of the temple without a lot of difficulties. Such a temple tip can be an after-market component, with different temple tips having different electrical components to serve different functions.

FIG. 17B is a diagram of a temple arrangement 910 according to one embodiment of the invention. In this arrangement, a temple tip is not considered as a part of the temple. The temple arrangement 910 includes a temple 912 that is associated with a pair of eyeglasses. Over the end of the temple 912 that is opposite the associated lens holder, a temple tip 914 is provided. The temple tip 914 can be held to the temple 912 by frictional forces and/or adhesive. The temple tip 914 includes at least one electrical component 916 that is at least partially embedded therein. The temple tip 914 can be manufactured and delivered to resellers or retailers as such. Alternatively, the temple tip 914 can be separately provided as an optional replacement temple tip for an existing temple tip. Hence, as after manufacture, upgrade to the eyewear can be had through replacing the existing temple tip with the replacement temple tip. The colors and shapes of the temple tip 914 can vary widely. In the after manufacturing environment, the reseller or retailer can be provided with a range of different colors and shapes so that a user can receive a replacement tip that reasonably matches the color and shape of the temple or that provides an altered appearance as desired by the user.

Besides a replacement temple tip such as illustrated in FIG. 17B, a temple tip can also be effectively modified by a fit-over temple or temple cover. FIG. 17C is a diagram of a temple cover 920 that at least partially covers a temple (e.g., temple 912) according to one embodiment of the invention. As another example, the temple cover 920 can be a fabric or other material, such as a sock or sleeve, that slides over and at least partially covers a temple tip. The temple cover 920 can include at one electrical component 922 that is either attached thereto or at least partially embedded therein. The temple cover 920 can also include an opening 924 so as to received a temple or a temple tip. The temple cover 920 can be held to a temple by frictional forces and/or adhesive. FIG. 17D is a diagram of a fit-over temple 926 that at least partially fits over a temple according to one embodiment of the invention. For example, the fit-over temple 926 can at least partial fit-over a temple tip. The fit-over temple 926 includes at one electrical component 928 that is either attached thereto or at least partially embedded therein. The fit-over temple 926 can also include an opening 930 so as to receive a temple. The fit-over temple 926 can be held to a temple by frictional forces and/or adhesive. As an example, the fit-over temple 926 can be plastic or other material. The colors and shapes of the fit-over temple 926 can vary widely. In the after manufacturing environment, the reseller or retailer can be provided with a range of different colors and shapes so that a user can receive a replacement temple cover or fit-over temple that reasonably matches the color and shape of the temple or that provides an altered appearance as desired by the user.

In one embodiment, a fit-over temple or temple cover according to the invention can further include a connector or cable to facilitate electrical connection with the at least one electrical component that is either attached to a temple or a temple tip or at least partially embedded therein.

In one embodiment, an electrical component is a component of an electrical circuit, and the electrical circuit is for performing at least a desired, intended or predetermined function.

A number of embodiments have been described above for an eyeglass frame, i.e., primary frame, are also applicable to an auxiliary frame. An auxiliary frame can attach to a primary frame through different techniques, such as using clips. Another technique to attach an auxiliary frame to a primary frame is by way of magnets. Examples of using magnets as an attachment technique can be found, for example, in U.S. Pat. No. 6,012,811, entitled, "EYEGLASS FRAMES WITH MAGNETS AT BRIDGES FOR ATTACHMENT."

A number of embodiments have been described where one or more electrical components are at least partially embedded in a pair of glasses. In yet another embodiment, the one or more electrical components are at least partially embedded in an eye mask.

Figure 18:
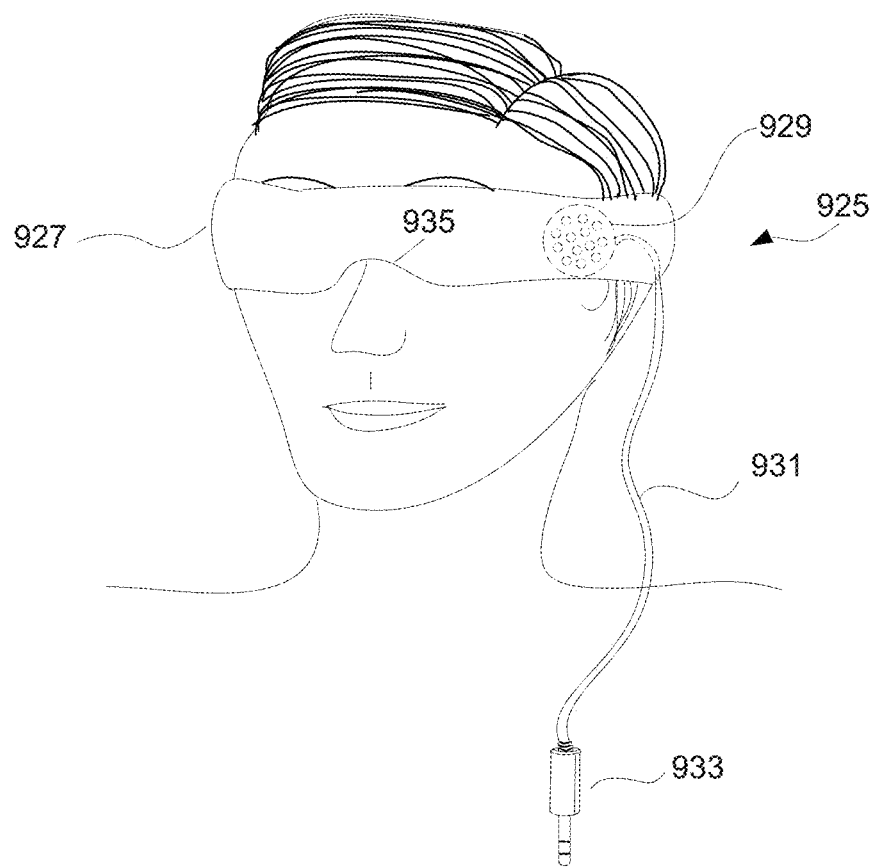
FIG. 18 shows an embodiment including an eye mask according to the invention.

FIG. 18 shows one embodiment 925 where one or more electrical components are at least partially embedded in an eye mask 927. The eye mask 927 includes a piece of fabric that is opaque so that when the mask is worn, the mask wraps around the eyes to block light from entering into the eyes of the user.

The embodiment 925 includes a wrapping mechanism to hold the fabric onto the head of a user so that when the mask is worn by the user, the mechanism allows the fabric to have a relatively tight and comfortable fit over the face of the user. In one approach the wrapping mechanism is achieved with the fabric in the shape of a band and having a certain degree of elasticity. When the mask is worn by the user, the elasticity of the fabric allows the mask to establish a relatively tight fit over the face of the user. In another example, the fabric is a long piece of material. The wrapping mechanism includes a clip or Velcro at the two ends of the piece of material to tie the two ends together. In another example, the wrapping mechanism includes two elastic pieces of elastic materials at the two ends of the fabric. To wear the mask, each elastic piece of material goes over one of the ears of the user so that the fabric establishes a relatively tight fit over the face of the user. In yet another embodiment, the mask 927 includes a notch 935 to accommodate the nose of the user. In another embodiment, there can be additional padding in the vicinity of the one or more electrical components so that if an electrical component is pressed against the user, the padding serves as a buffer or cushion.

In one embodiment, a speaker 929 can be at least partially embedded in the mask 927, and can be positioned close to and facing one of the ears of the user. The speaker 929, through an electrical connector, is electrically connected to a cable 931. The cable 931 can also have a connector 933 at its distal end. The connector 933 can be plugged into another device, such as a MP3 player or a CD player. After putting on the mask, with the connector 933 plugged into the another device, the user would be able to hear, for example, audio sounds such as music. The eyemask 925 can be applied to different areas. For example, the user can be on a plane, and would like to rest. The user can put on the eyemask 925, and plug the connector 933 into a media outlet at an armrest of her seat in the plane. Thus, the user can enjoy music while taking a rest. The embodiment 925 could also include a plurality of speakers, such as one for each of the user's ears.

In another embodiment, the eyemask 927 includes the speaker 929 and a battery that is electrically connected to the speaker 929. The battery can be in a pocket on the eyemask and can be replaceable. The battery can also be a rechargeable battery, such as a lithium-ion battery, and there is a connector at least partially embedded in the eyemask. The connector can be used to recharge the battery.

Figure 19:
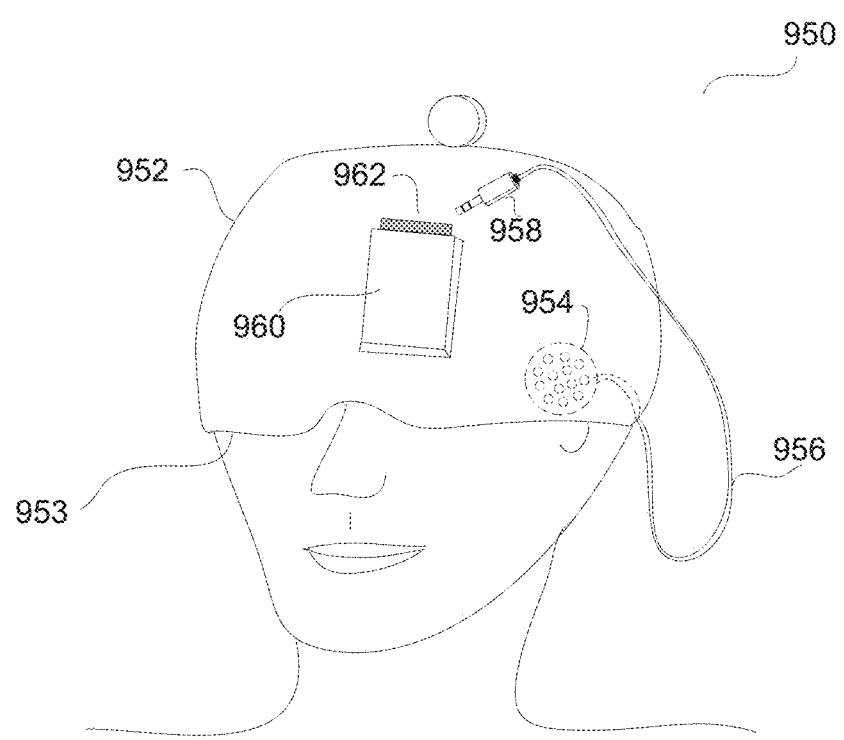
FIG. 19 shows an embodiment including a night cap according to the invention.

FIG. 19 shows another embodiment 950 where one or more electrical components are at least partially embedded in a night cap 952. In one embodiment, the cap 952 is at least partially made of fabric. In another embodiment, the cap 952 is entirely made of fabric. The cap includes a wrapping mechanism. When the cap is worn, the wrapping mechanism holds the cap onto the head of the user, and allows the cap to have a relatively tight and comfortable fit over the head of the user. Again the wrapping mechanism can be an elastic band at the base 963 of the cap 952. Or, the wrapping mechanism can include clips or Velcro as previously described.

The cap can include at least one speaker 954, which is at least partially embedded in the cap 952. When the cap 952 is worn by a user, the speaker 954 is positioned close to and facing one of the ears of the user. The speaker 954 can, for example, be electrically connected through a connector to a device 962 in a pocket 960 on the cap 952. The electrical connection can be through a cable 956 external to the cap 952. The cable 956 also can have a connector 958 to be plugged into the device 962. In another embodiment, the cable 956 is embedded in the cap. The device 962 can be an asset player, such as a MP3 player, with a battery. Through the connector 958, audio signals from the device 962 can be received by the speaker 954 and heard by the user. There can be one or more additional pockets on the night cap for one or more additional electrical components. When worn, the night cap does not have to cover the eyes of the user. In yet another embodiment, when worn, the night cap further covers the eyes of the user, as shown in FIG. 19. In one embodiment, the embodiment 950 further includes padding in the vicinity of an electrical component to serve as a buffer or cushion between the user and the electrical component.

A number of embodiments have been described involving a speaker in an eyemask or a night cap. In one embodiment, the audio output from the speaker can serve to cancel the environmental sounds in the vicinity of the user. For example, if the user is on an airplane, the surrounding environmental sound has a relatively high level of white noise. This white noise can be detected by a pickup device and cancelled by noise cancellation circuitry provided within the eyemask or night cap. Namely, the audio output from the speaker serves to cancel the white noise of the user's environment. In another embodiment, the electrical component embedded or partially embedded is not a speaker, but can be a sensor, which can sense a physiological function of the user.

Figure 20A:
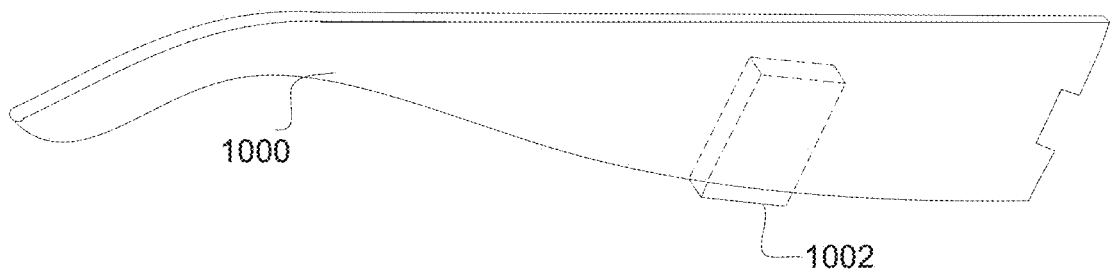
FIG. 20A is a diagram illustrating a temple having a slot for receiving a removable electronic device according to one embodiment of the invention
Figure 20B:
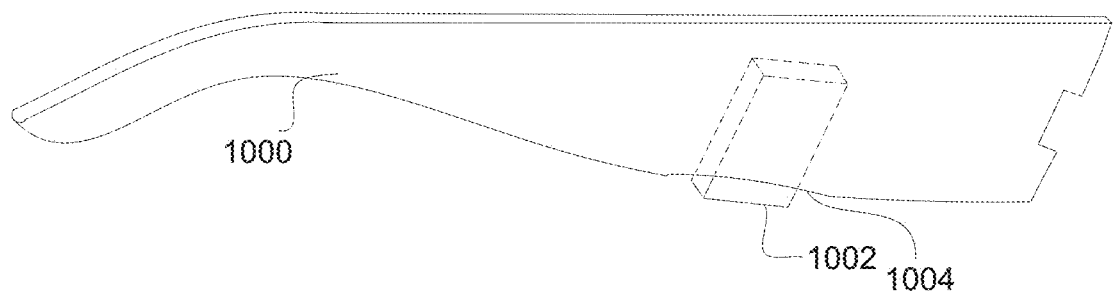
FIG. 20B is a diagram illustrating the temple having a recessed lower portion according to another embodiment of the invention.

FIG. 20A is a diagram illustrating a temple 1000 having a slot for receiving a removable electronic device 1002 according to one embodiment of the invention. In one example, the removable electronic device 1002 can be a memory storage device, sometimes referred to as a memory card. As shown in FIG. 20A, the removable electronic device 1002 is inserted into the slot. Although the slot could be electrically non-functional, typically the slot provides an avenue for the removable electronic device 1002 to be physically and electrically connected to electrical circuitry within the temple 1000 or elsewhere within the eyeglass frame. FIG. 20B is a diagram illustrating the temple 1000 having a recessed lower portion 1004 according to another embodiment of the invention. The recessed lower portion 1004 facilitates the insertion and removal of the removable electronic device 1002. In either embodiment, the removable electronic device can be manually inserted and removed or can use more complicated mechanical mechanisms to assist with the insertion and removal (e.g., spring-based push and release structure).

Figure 21A:
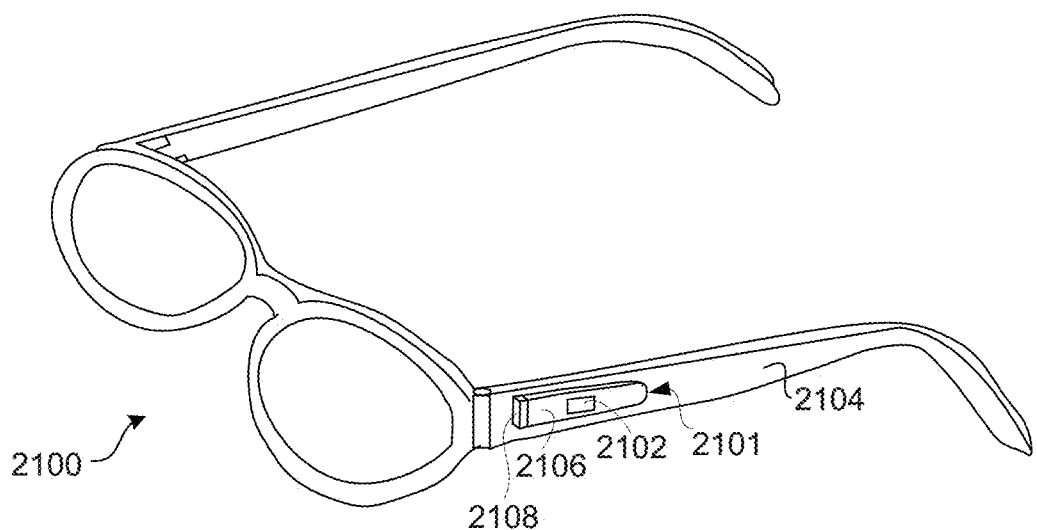
FIGS. 21A and 21B are diagrams illustrating a pair of glasses having a camera coupled thereto, according to one embodiment.
Figure 21B:
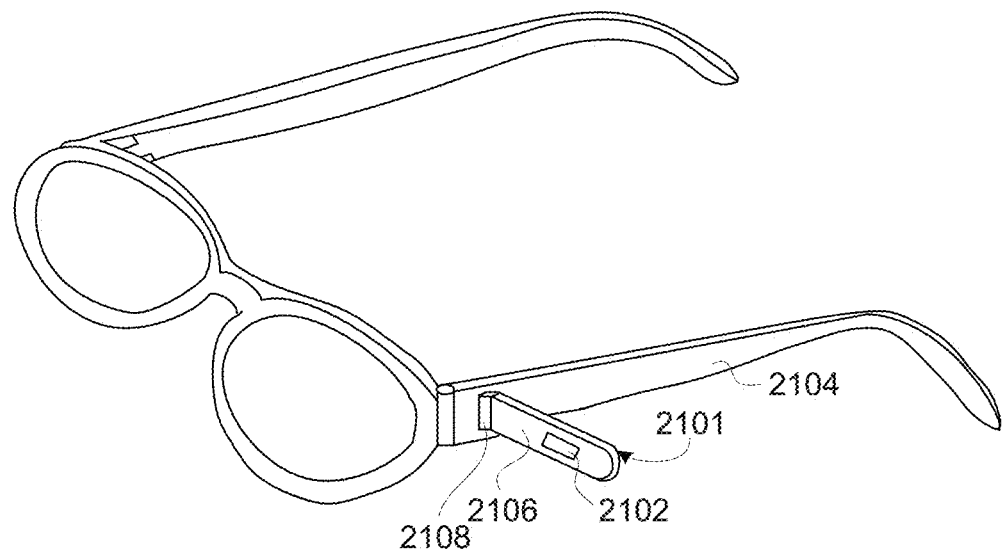

FIGS. 21A and 21B are diagrams illustrating a pair of glasses 2100 having a camera 2101 coupled thereto, according to one embodiment. The camera includes an image sensor 2102 and a camera housing 2106 (also referred to as a camera support arm). In this embodiment, the camera 2101 is rotatably coupled to an exterior surface of a temple 2104 of the pair of glasses 2100. The camera support arm 2106 is attached to the temple 2104. The camera support arm 2106 can couple to the temple 2104 using a hinge 2108. In one implementation, the hinge 2108 can use a spring or cam mechanism so that the camera support arm 2106 is held either against the temple 2104 when not in use or held in an open or extended position when in use. FIG. 21A illustrates one position of the camera support arm 2106 when the camera 2101 is not in use. FIG. 21B illustrates one position of the camera support arm 2106 when the camera 2101 is in use. The presence of the camera 2101 with the pair of eyeglasses 2100 enables a wearer of the pair of eyeglasses 2100 to take pictures of what the wearer is looking at. It should be noted that other supporting circuitry such as data storage for pictures, switches, battery, and electronics for the camera 2101 can be in the temple 2104, in the camera support arm 2106, elsewhere in the pair of glasses 2100, or even tethered thereto. However, in one implementation, the camera 2101 is completely self-contained in the camera housing 2106. In one embodiment, the hinge 2108 can also serve as a switch to turn the image sensor 2102 on or off.

In one implementation, to improve overall appearance of the pair of glasses 2100, the temple 2100 can provide a recess for receiving the camera support arm 2106 when the camera is not being utilized. Such may improve the aesthetic appearance of the pair of glasses 2100.

In another implementation, the pair of glasses 2100 can further provide a viewfinder. The viewfinder can assist the user in directing the image sensor 2102 towards whenever the user desired to photograph. The viewfinder can be a separate apparatus that is extended by user action or can be a viewfinder that is visually present or presented on one of the lenses. In one example, the viewfinder can be an extendable viewer through which the user can look through to determine the field of reference of the image sensor 2102. The viewfinder can be extendible from either of the temples, such as in a telescoping, sliding or flipping action. Additionally, when the camera support arm 2106 is extended, a viewfinder can be automatically initiated. For example, indicators on one of the lens can be visually presented, such as through optical projection from one or more light sources. In another embodiment, the viewfinder can be always present, such as with indicators on one of the lens of the pair of glasses 2100. The indicators can be a few faint dots to define an area (e.g., a square) on the lens.

In one embodiment, the camera support arm (camera housing) 2106 is removably coupled to the hinge 2108. As such, the camera 2101 can be removed from or attached to the pair of glasses 2100. Indeed, the camera support arm (camera housing) 2106 can be a camera body that houses electronics for the camera 2101. In such case, the camera 2101 can operate as a camera apart from the pair of glasses 2100.

In one implementation, the camera support arm 2106 has a connector and the hinge 2108 has a counterpart connector. In one example, the connectors are peripheral bus connectors, such as USB connectors. In such case, the camera support arm 2106 can be attached and removed from the pair of glasses 2100. Such a connection via the connectors can be electrically functional or non-functional. If functional, electrical components in the pair of glasses 2100 can be electrically connected to electrical components in the camera 2101.

Still further, in one embodiment, the connector at the end of the hinge 2108 enables connection of a variety of different peripheral devices to the pair of glasses 2100. For example, the different peripheral devices (portable electronic devices) can be the camera, a memory card, or a media player. In one embodiment, electrical components integral with the pair of glasses 2100 can be shared by the different peripheral components. The hinge 2108 is not necessary in other embodiments, see FIGS. 8F-8H, where a connector is attached or integral with a temple of a pair of glasses. If desired, the camera 2101 or other peripheral devices can include in its structure a hinge or other mechanism to permit positioning the camera or other peripheral devices.

In still another embodiment, an angled or hinged adapter can be inserted between a connector attached to the pair of glasses 2100 and a connector of the camera 2101 or other peripheral devices. The adapter can be electrically functional or non-functional.

Figure 22:
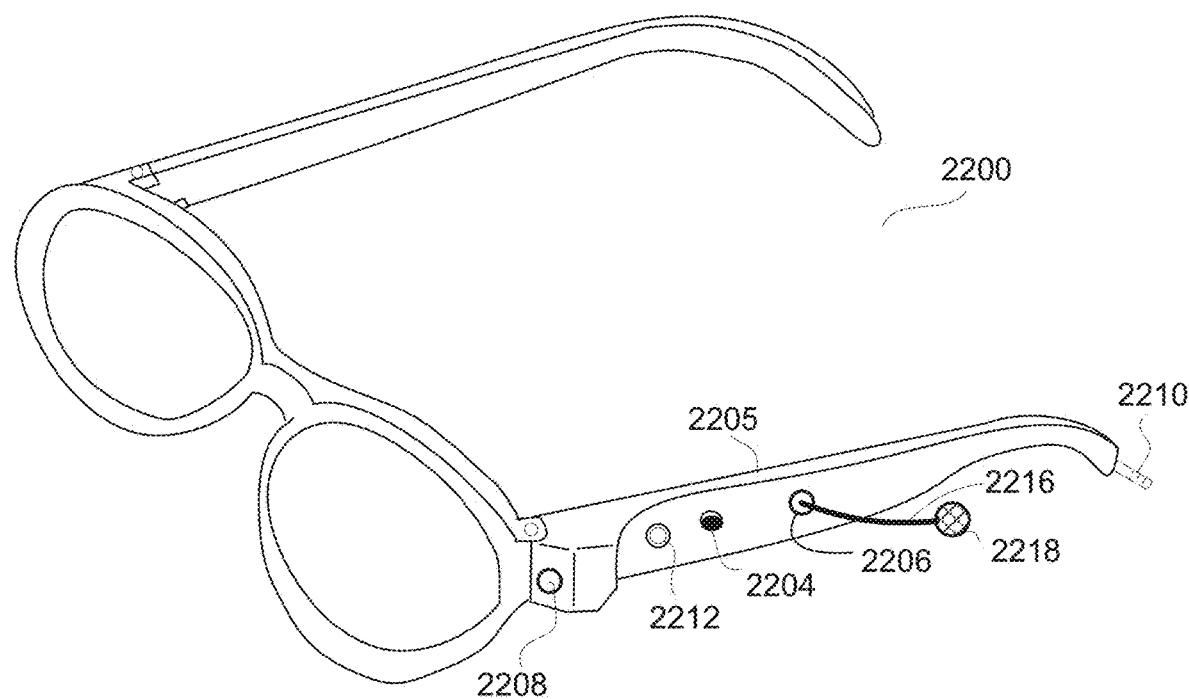
FIG. 22 is a diagram of a pair of glasses having a camera according to one embodiment of the invention.

In yet in another embodiment, a pair of glasses functioning as a headset with a speaker and a microphone further includes a camera. FIG. 22 is a diagram of a pair of glasses 2200 having a camera according to one embodiment of the invention. The glasses 2200 include a temple 2205 that has a microphone 2204, a speaker 2206 and a camera 2208 with a connector 2210. The connector 2210 is for connecting, for example, to another electronic device that provides at least one of data or information transfer capabilities or a power source for the glasses.

In one embodiment, the camera 2208 is a digital camera with an on/off switch 2212. For example, the camera 2208 is a CCD camera including a CCD controller coupled to a CCD chip to capture images, a CCD memory device and a lens.

In one embodiment, with the connector 2210 connected to another electronic device (e.g., a portable electronic device), when the switch 2212 is pushed on, the CCD chip takes a picture. The charges in the CCD chip are digitized and transmitted through the connector 2210 to the other electronic device, under the management of the controller. At least some of the charges can be temporarily stored in the CCD memory device, for example, to accommodate the differences in speed in taking pictures and sending the pictures to the portable device through the connector. In this embodiment, images can be stored at the other electronic device. In another embodiment, the glasses can include sufficient data storage capabilities to store the pictures, at least until transferred to another electronic device.

In one embodiment, the glasses do not offer focusing capability. The CCD chip can be located, for example, at the focal point of the lens. In another embodiment, there is an image distance control knob. For example, a mechanical lever can be pre-programmed or pre-set to move the lens to one or more different positions. In one implementation, there can be just two positions. One position can be for close-up shots and another for distance shots, such as close-up being about 2 ft from the lens and the distant being about 6 ft away; or close-up being about 8 inches away and distant being about 2 ft away.

FIG. 22 shows one embodiment regarding the location of the camera 2208 at the end of the temple or arm 2205 of the glasses 2200 next to the hinge. The lens of the camera faces forward. In this situation, what the user sees is substantially what the captured image would be. In other words, in a general sense, what the user sees through the glasses is what the user gets, without the need for an additional view finder. With such an embodiment, it is relatively easy for a user to take pictures, hands-free, without the need for an additional strap for holding the camera.

The connector 2210 at the end of the glasses 2200 can be, for example, a 4-terminal connector, one for ground, one for power and the other two for transmit and receive signals. In another embodiment, the connector 2210 can be a 3-terminal connector, with the power line and one of the signal lines sharing one terminal.

Regarding the embodiment shown in FIG. 22, the speaker 2206 can be in the glasses, with a tube 2216 and an ear bud 2218, to help bring audio signals to the user. In one embodiment, the tube 2216 can be rotated at its end where it connects to the glasses. In another embodiment, the speaker 2206 can be provided at the ear bud 2218.

In one embodiment, the CCD chip with the CCD memory device and the CCD controller are on the same integrated circuit.

The embodiment shown in FIG. 22 also includes a microphone 2204. In one embodiment, the CCD memory device also stores audio signals from the microphone 2204. For example, the memory device stores a duration of time, such as the last 15 seconds, of audio signals. When the user takes a picture, a duration of time before taking the picture, such as the previous 15 seconds, audio signals can be coupled to the picture. Another duration of time after taking the picture, such as the next 10 seconds, of audio signals can also be coupled to the picture. In one embodiment, the audio picked up can include environmental sounds present at that time. The audio signals or the digitized version of the audio signals can also be transmitted to the other electronic device with the corresponding picture. In the future, if the user wants to view the picture, the audio signals can be played with the picture at the same time. As another example, the user can provide an auditory annotation to the pictures being taken. Here, the user can leave a specific audio message to be associated with the picture. For example, the user might take a picture of his childhood home and record an audio annotation, "This is where I grew up".

In one embodiment, a pair of glasses functions as a headset with a speaker, a microphone and a camera. The pair of glasses can be coupled to another electronic device through a connector of the glasses. Additional electrical components, such as those in the other electronic device, like a portable device, for the glasses can be incorporated in the glasses. For example, the power source can also be in the glasses and the glasses do not have to include a connector. In one embodiment, the glasses include non-volatile memory to store at least a number of pictures. In another embodiment, the glasses further include a connector to receive a memory card, such as a flash memory device. The card can be a standard memory card with a USB connector. Pictures taken can be stored in the removable memory card.

In yet another embodiment for the glasses with a camera, the glasses do not include a speaker or a microphone. The glasses include a temple that has a CCD controller coupled to a CCD chip, a CCD memory device and a lens. The temple also includes an on/off switch with a connector. The connector is for connecting, for example, to a portable device that includes at least a power source for the camera.

In still another embodiment, an auditory feedback by a speaker is provided or coupled to a pair of glasses. For example, a clicking or "snapshot" sound can be output when a picture is taken (such as when a user initiates the picture taking).

Additional disclosure on camera in glasses can be found in U.S. Provisional Application No. 60/583,169, filed on Jun. 22, 2004, which is hereby incorporated by reference.

A number of electrical components have been described. They can be on circuit boards, which can be made of flexible materials. They can be on a substrate. They can also be integrated into one or more integrated circuits.

Figure 23A:
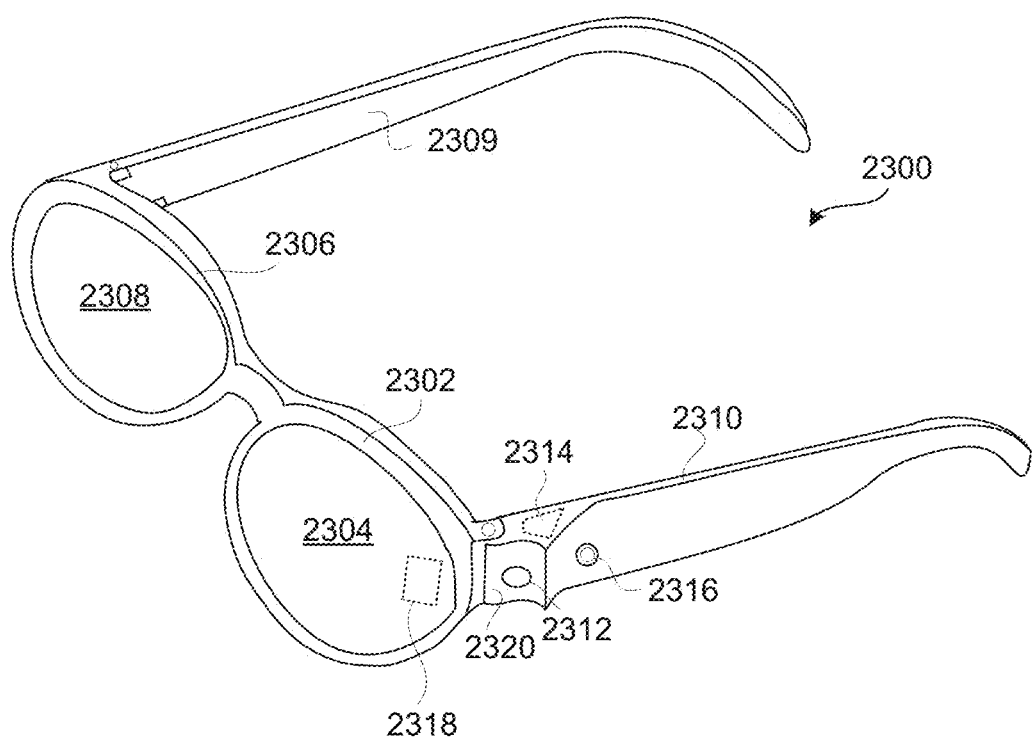
FIG. 23A is a diagram of a pair of glasses having a camera according to one embodiment of the invention.

FIG. 23A is a diagram of a pair of glasses (i.e., eyeglass frame) 2300 having a camera according to one embodiment of the invention. The eyeglass frame 2300 illustrated in FIG. 23A includes a lens holder 2302 holding a lens 2304 and a lens holder 2306 holding a lens 2308. The eyeglass frame 2300 also includes temples 2309 and 2310. In the embodiment shown in FIG. 23A, the temple 2310 includes a camera 2312, supporting electronics 2314 and a switch (e.g., button) 2316. In one embodiment, the camera 2312 includes a CCD chip. The camera 2312 can also include a lens and buffer memory. In one embodiment, the electronics 2314 illustrated in FIG. 23A can be embedded within the temple 2310. The electronics 2314 can include at least a microcontroller (e.g., an image processor), a memory, and a battery. These electronics 2314 can support the camera 2312. The eyeglass frame 2300 can further include various other electrical components. For example, the eyeglass frame 2300 can further include one or more of: a microphone, an earphone, a removable memory, a display, a clock, and a Global Positioning System (GPS). These electrical components can be used in conjunction with the camera 2312 or separately from the camera 2312. The button 2316 enables a wearer of the eyeglass frame 2300 to turn the camera 2312 on/off and/or to cause a picture to be taken (recorded). For example, by pushing the button 2316 for more than a few seconds, the camera will be turned off. However, by pushing and releasing the button 2316, the camera takes a picture.

Still further, in the embodiment of the eyeglass frame 2300 shown in FIG. 23A, the eyeglass frame 2300 further includes a view finder 2318 and an angled surface 2320. Other embodiments of eyeglass frames need not include such features. Nevertheless, the view finder 2318 can assist a wearer (i.e., user) of the eyeglass frame 2300 in understanding the frame of the image (picture) being captured by the camera 2312. In this example, the view finder 2318 is provided on the lens 2304 in a visible, yet non-distracting manner. As shown in FIG. 23A, the view finder 2318 can be positioned such the wearer can direct the image (picture) to be captured. For example, the wearer would orient their head (using the view finder 2318) to direct the camera 2312 towards the desired subject. Also, the angled surface 2320 allows mounting the camera 2312 in an angled manner. As a result, the direction of the camera 2312 is not straight forward but out towards the side. This facilitates the wearer in directing the camera 2312 using a single eye via the lens 2304, and more particularly via the view finder 2318 if provided. The outward angle from straight forward being utilized by the camera 2312 can vary with implementation. For example, the outward angle can be in the range of 10-70 degrees or more particularly in the range of 15-60 degrees, or more particularly in the range of 20-40 degrees from the perpendicular direction of the plane of a front surface of the eyeglass frame 2300. In one embodiment, with the camera positioned at an angle, the lens holder 2302 would not block the field of view of the camera even with the camera being positioned at a distance behind the lens holder 2302.

Although the camera 2312 is provided on the left side of the pair of glasses 2300 as shown in FIG. 23A, it should be understood that the camera could alternatively or additionally be provided on the right side of the glasses.

Figure 23B:
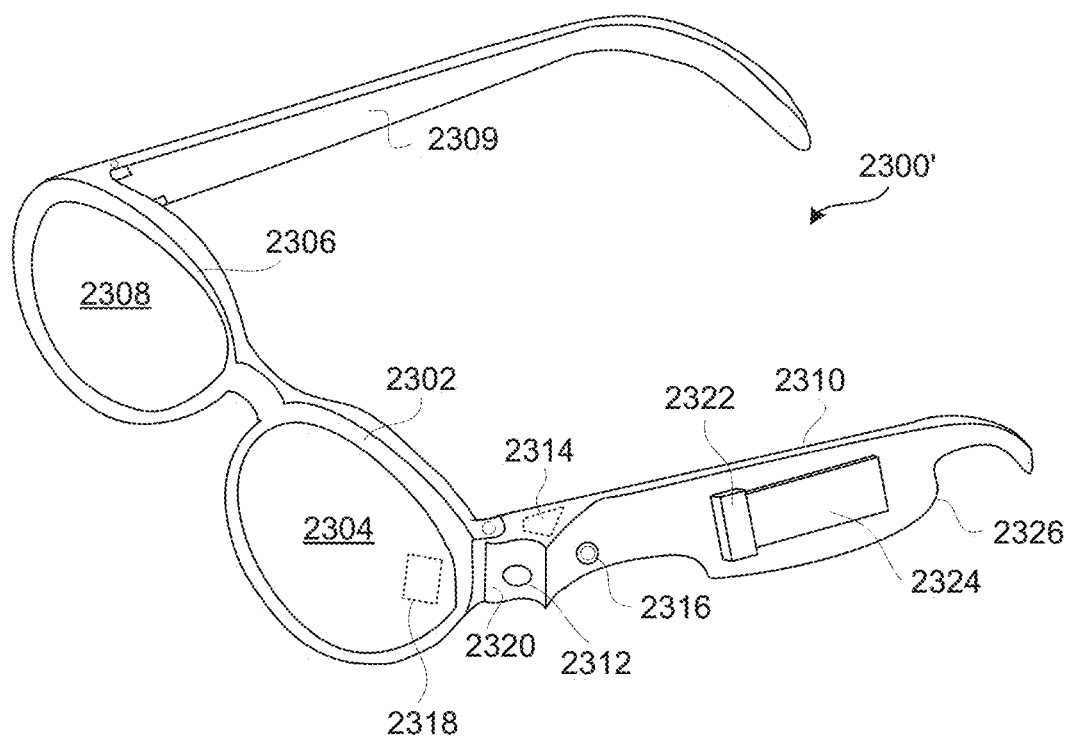
FIG. 23B is a diagram of the pair of glasses according to another embodiment.

FIG. 23B is a diagram of a pair of glasses (i.e., eyeglass frame) 2300' according to another embodiment. In this embodiment, the eyeglass frame 2300' is similar to the eyeglass frame 2300 illustrated in FIG. 23A. However, the eyeglass frame 2300' further includes a connector 2322 and a memory card 2324. More particularly, the temple 2310 includes a region 2326 larger than the temple region shown in FIG. 23A. The larger or enlarged region can provide additional space for the connector 2322 and the memory card 2324. The memory card 2324 can be operatively connected electrically to the electronics 2314 within the temple 2310 via the connector 2322. The connector 2322 also can serve to provide a physical connection of the memory card 2324 to the eyeglass frame 2300. In one embodiment, such physical connection is removable so that the memory card 2324 can be connected to or removed from the temple 2310. Accordingly, the memory card 2324 can facilitate porting of data or information (e.g., pictures) from the eyeglass frame 2300' to another electronic device (e.g., computer). As an example, the connector 2322 can be a USB connector or other peripheral type connector.

The eyeglass frame having a camera according to one embodiment of the invention can further include one or more sensors. For example, the one or more sensors can include one or more of a "being worn" sensor, a motion sensor, and a light sensor. These sensors can be used to influence operation of the camera provided with the eyeglass frame. For example, a "being worn" sensor can be used to determine whether the eyeglass frame is being worn by a user. If the eyeglass frame is not being worn, then the camera can be deactivated to prevent unnecessary battery consumption and/or to prevent pictures from being taken. As an example, if the camera is operated to automatically, periodically take a picture, then if the eyeglasses are not being worn, the automatic picture taking process could be stopped. In one embodiment, a motion sensor can be used in a variety of ways. A motion indication can indicate a rate of activity of the user. For example, the rate of activity could be used to avoid taking pictures during periods of high activity, such as rapid movements of the eyeglass frame (or the corresponding user), or to influence image processing, such as exposure rate. As another example, the rate of activity can be used to control the rate pictures are taken such as in the automatic picture taking example. In one embodiment, a light sensor can indicate the degree of light in the vicinity of the camera. The light indication can influence the image processing, such as exposure rate of the camera.

In one embodiment, in an automatic picture taking example, the location, time or device resources (e.g., available memory) can also be used to control the rate pictures are taken. Also, the ability of the eyeglass frame to know or acquire time and/or location information (such as the location of the eyeglass frame or the corresponding user) can enable pictures taken by the camera to be stored along with time and/or location indications.

The eyeglass frame having a camera according to one embodiment of the invention can further include a global positioning system (GPS). The information from the GPS can be used to alter configuration settings and/or influence operation of the camera. For example, the configuration settings can be different at night versus during daytime or can be different depending on time or location. As another example, the camera can take pictures depending on location. In one implementation, the camera can automatically take pictures dependent on a change in location. For example, after taking a picture, the camera can take a subsequent picture when the change in location exceeds a predetermined threshold.

In one embodiment, the camera utilized in the various embodiments is a digital camera, namely, a digital image capture device. The camera can be a still camera or a motion camera (i.e., video camera). The camera can be designed for manual focusing, auto-focusing, or predetermined fixed focusing. The camera can also support a wide angle or panoramic view.

Figure 24:
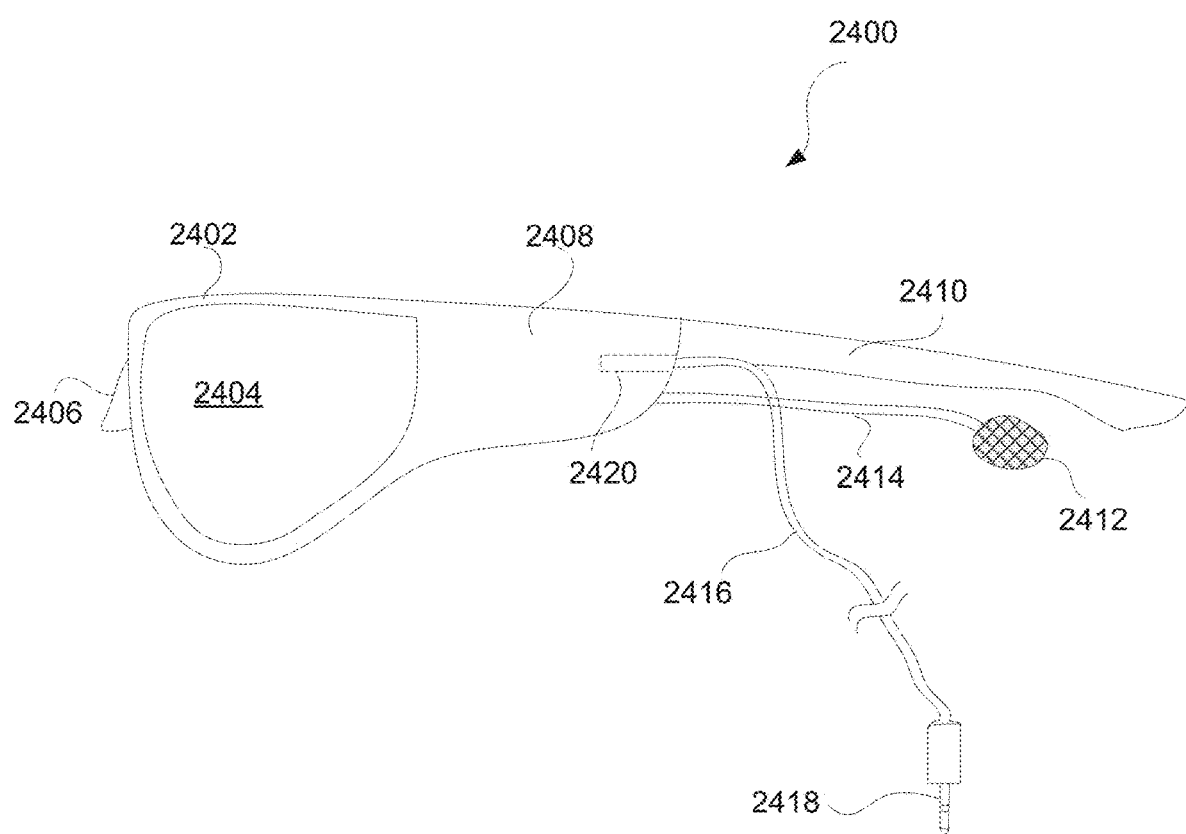
FIG. 24 is a side view of a pair of eyeglasses according to another embodiment of the invention.

FIG. 24 is a side view of a pair of eyeglasses (i.e., eyeglass frame) 2400 according to another embodiment of the invention. The eyeglasses 2400 include a lens holder 2402 for a lens 2404. The lens holder 2402 is for the left side of the eyeglasses 2400. A bridge 2406 couples the lens holder 2402 to another lens holder for the right side of the eyeglasses. In this embodiment, the lens 2404 and the lens holder 2402 extend substantially around the side and are sometimes referred to as "wrap-around" type frames. The eyeglasses 2400 include a temple having a forward temple portion 2408 and a rearward temple portion 2410. Typically, the lens holder 2402, the temple 2406, the forward temple portion 2408 and the rearward temple portion 2410 are integrally formed as a single structure. The eyeglasses 2400 also support audio output to a wearer of the eyeglasses 2400. To support audio, the eyeglasses 2400 include an ear bud 2412, which serves as a speaker, and an extension arm 2414. In this embodiment, the extension arm 2414 couples the ear bud 2412 to the forward temple portion 2408. The extension arm 2414 can be pliable so that the wearer can adjust the position of the ear bud 2412. In further support of audio, the eyeglasses 2400 couple to a cable 2416. The cable 2416 provides audio signals to the ear bud 2412 via at least one electrical conductor extending through the cable 2416 and the extension arm 2414 to the ear bud 2412. In one implementation, one end of the cable 2416 has a connector 2418 and the other end is integral with or connected to the forward temple portion 2408. The connector 2418 can connect to a media output device, such as a portable media player (e.g., radio, MP3 player, CD player, etc.). In another implementation, the cable 2416 can have a connector, such as a plug, that connects to a jack 2420 embedded in the forward temple portion 2408, thereby allowing the cable 2416 to detach from the eyeglasses 2400. Alternatively, the cable 2416 can directly connect to the media output device without the use of the connector 2418. Optionally, the eyeglasses 2400 can also support audio input by providing a microphone with the eyeglasses 2400. In one embodiment, with a microphone, the eyeglasses 2400 serve as a headset for a phone.

Regardless of the electrical components being utilized with the eyeglass frames, it may be desirable for the eyeglass frames to be substantially balanced in weight. In the event that electrical components are attached and/or at least partially embedded in one of the temples of the eyeglass frame, the other of the temples can include other electrical components or even a counter weight so that the eyeglass frame can be substantially balanced.

Figure 25:
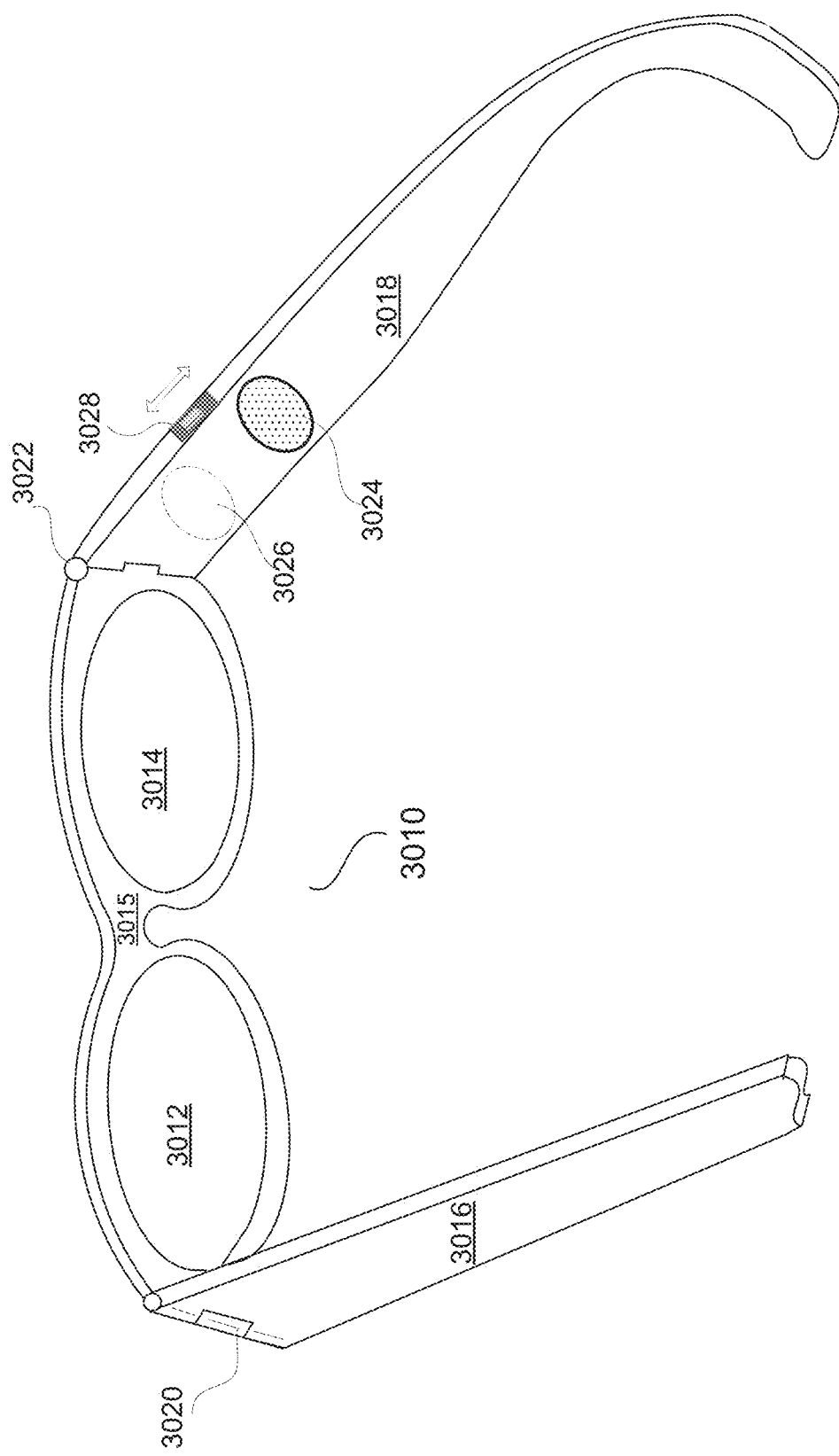
FIG. 25 shows one embodiment of the invention with a speaker in one of the temples of a pair of glasses.

FIG. 25 shows one embodiment of the present invention. The embodiment includes a pair of glasses 3010 with a first lens holder 3012 and a second lens holder 3014. Both lens holders are for receiving lenses. The first lens holder 3012 has a first side and a second side. The second lens holder 3014 also has a first side and a second side. The pair of glasses has a bridge element 3016. The bridge element is coupled to the first side of the first lens holder 3012 and the second side of the second lens holder 3014. In one embodiment, the lens holders and the bridge element are not separate pieces, but are an integral piece.

The pair of glasses 3010 also includes a first temple 3016 and a second temple 3018. The first temple 3016 is pivotally secured to the second side of the first lens holder 3012 through a joint 3020. And, the second temple 3018 is pivotally secured to the first side of the second lens holder 3014 through another joint 3022. The glasses 3010 further include a speaker 3024, a power source 3026 and a switch 3028. The speaker 3024 is powered by the power source 3026, and the switch 3028 is used to turn the speaker 3024 on and off. The pair of glasses 3010 can deliver information through the speaker 3024 to the wearer or user of the glasses 3010. In one embodiment, the information is available for a duration of time. With the speaker 3024 close to at least one of ears of the wearer of the glasses 3010, the information provided to the user can be provided in a relatively private manner.

In different embodiments, the glasses 3010 can be a pair of sunglasses, fit-over glasses, prescription glasses or other types of glasses. In a number of embodiments, the frames of the glasses have more surface area than frames with minimal structure, such as those frames with lenses connected together by wires. For example, the temples of the glasses can have a tapered profile. Each of the temples is wider or broader when it is close to its corresponding joint. In one embodiment, the temple is wider or broader by spanning across a wider or broader area longitudinally downward, creating a bigger surface in an orientation generally parallel to the side of the user's head. FIG. 25 shows an example of such an embodiment.

In another embodiment, there can be a shield at least at one edge of each of the lens holders of the glasses. These shields can wrap around, or better conform to the profile of, the face of the wearer. The shields can be opaque. There can be transparent or translucent windows on these shields. To illustrate, in fit-over sunglasses, when worn over a pair of prescription glasses, such shields can go over or cover at least a portion of the pair of prescription glasses. Note that in one embodiment, a pair of glasses does not have to include lenses.

In one embodiment, a pair of glasses is for an event. An event can be viewed from the perspective of one or more organizations sponsoring or organizing the event. These events can be, for example, a basketball game, a concert, or a trade show. These events are provided or sponsored by one or more organizations or companies. In a number of embodiments where information is available from a speaker at a pair of glasses and the glasses are for an event, the information made available from the speaker is related to the event. In such embodiments, the information can be available for only a limited duration of time and the duration is associated with the event, which can include some time (such as buffer time) before the event and some time after the event. When the event is over, which can include any post-event buffer time, the information will generally not be available.

In another embodiment, an event can be viewed from the perspective of the person at the event. From the perspective of the person, an event can be buying a product from a store. This can be considered an event from the point of view of the person at the event. Typically, it has a beginning, it has an end, and there is a purpose or a theme. The information is available to the person when the person is at or proximate to a location associated with the event, such as a building. When the person is away from the location, the information will not be available.

In one embodiment, the duration of an event is not more than a week. In another embodiment, the duration is not more than a day. In yet another embodiment, the duration of an event is not more than a few hours, such as nine hours.

In one embodiment, there is advertising or promotional material on a pair of glasses, and the material is related to an event. The material can be on the surface area provided by temples, shields or other areas on a pair of glasses. For example, if the event is about dinosaurs in the Jurassic period provided by an organization, there can be a Brachiosaurus printed on the glasses. The organization can use the surface area on the glasses as places for advertisement of not only the event, but also the organization itself. The organization can also sell such surface area to other companies, which can provide additional promotional material on the glasses.

Referring back to FIG. 25, it shows one embodiment of the invention where there is a speaker 3024 in one of the temples 3018 of the glasses 3010.

In one embodiment, the information is available for a duration of time, which can be short. For example, the power source 3026, which can be a battery, may not have enough power to run the speaker 3024 in its full capacity for a long duration. To illustrate, the battery 3026 only has enough power to run the speaker continuously for a short duration of time, which can be less than a few hours with the speaker 3024 at its highest volume possible, when it is turned on by the switch 3028 in the glasses 3010. The battery 3026 can be encapsulated in the glasses 3010, such as in one of the temples 3018 of the glasses 3010. The battery 3026 can be a coin battery or a AAA battery, or other types of batteries. In one implementation, the glasses are designed such that the battery 3026 is not easily replaceable by the user. The battery 3026 can be inside a temple and the temple can be sealed so that the battery 3026 is typically not replaceable without breaking the temple.

Figure 26:
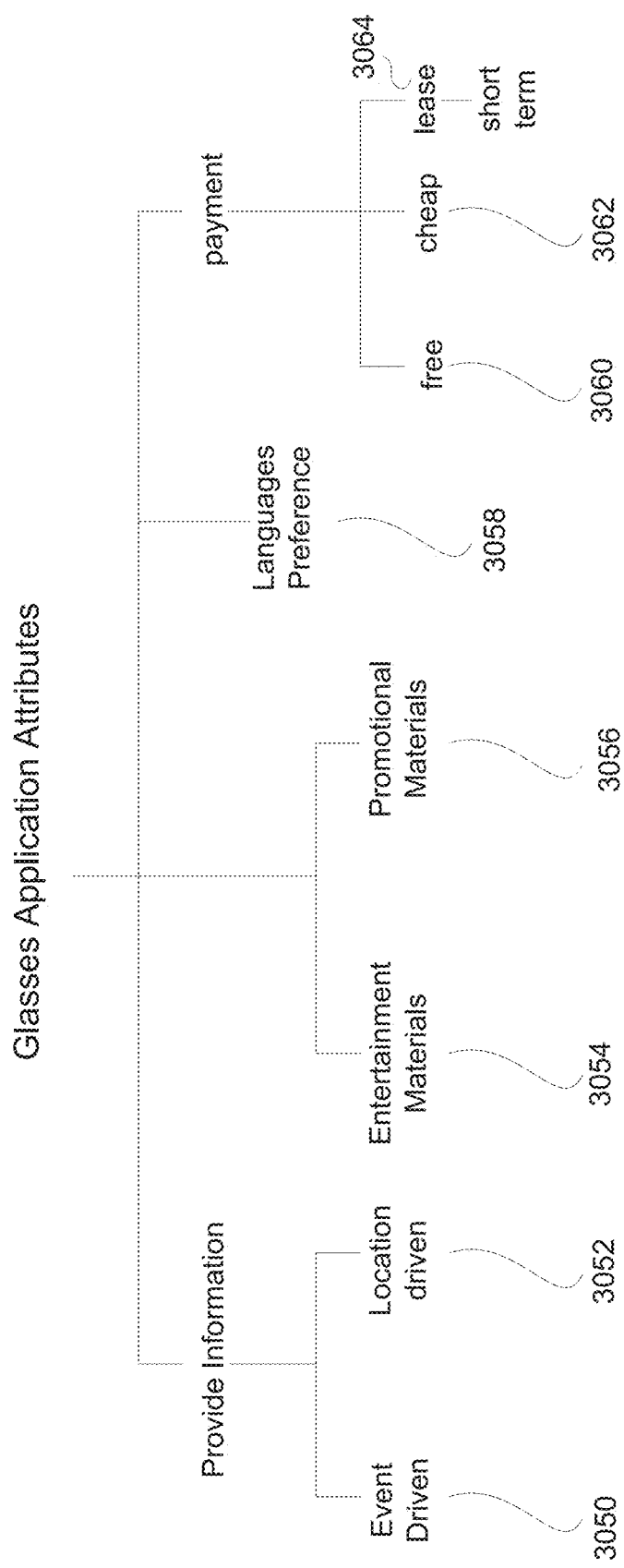
FIG. 26 shows a number of attributes regarding a number of applications of glasses according to different embodiments of the invention.

FIG. 26 shows a number of attributes regarding the applications of the glasses, such as the glasses shown in FIG. 25, according to different embodiments of the invention.

In one embodiment, the information provided by the glasses can be driven by an event organized by an organization 3050. For example, the user is at a football game in a stadium. The information can be related to a star player, such as his statistics, or other interesting information regarding the team. The information can be for an event related to the event at the stadium. For example, the user is at the Stanford Stadium watching the game between the Stanford and the Berkeley football teams. However, periodic update information or other types of information, such as play-by-play information, from a game at the UCLA Stadium between UCLA and USC can be provided to the user. All four teams are vying for the PAC 10 title. The user at the Stanford Stadium, who might be an UCLA fan, can hear about how the UCLA team is performing, while watching the Stanford/Berkeley game.

In the embodiments where information is available from the glasses, the information is available hands-free. This allows the user to use both of his hands totally freely, for whatever other purposes the user prefers, including providing different gestures.

In the embodiments where information is available, such as through a radio, the information can be available almost instantaneously when the electrical components in the embodiments are activated or turned on. This can be important during high intensity games. If it takes 30 seconds to start the system before information is available, such down time may not be available or tolerable during the games.

The user in an event may not be the audience or the observer of the event. In one embodiment, the user using a pair of glasses in the present invention not only attends the event, the person also helps to produce the event. For example, the event is a game, and the person is a coach of one of the teams playing in the game. Additional embodiments will be described where a pair of glasses is coupled to a handheld device. The glasses provide information to the coach, who can use the handheld device for a number of purposes, such as to track plays or calls.

In one embodiment, the information available at a pair of glasses can be advertising materials available during the break time of a game. The advertising materials can, for example, be from a company organizing or sponsoring the event, or from one of the teams in the event.

As another example, the event is an indoor event, such as an indoor concert.

The information can be location driven 3052, which in one embodiment can be considered as an event attended by a user when the user is at the location. For example, the user is in a store, with many products. The products can be services. As the user moves around the store, he looks at different products. In one approach, each product is designated by a number. By entering the specific number into the glasses or into a portable device coupled to the glasses, such as through a switch, information pertinent to the corresponding product will be available to the user. As another example, the user can be in an exhibit hall, a trade show or in a museum. As the user strolls in the hall, information of different exhibits is available to him. Or, the user can be walking around a botanical garden, and is given a virtual, unguided tour by the glasses of the different type of plants in the garden. When the user moves away from such locations, the information will not be available.

The user can be at places where he is alone, or he does not know anybody. He might be bored. For example, he can be in a dental office having his teeth cleaned. Or, he can be in a bank waiting for his turn. Different types of information can be available to him. For example, if the bank has a new home loan program, such information is available to him. Again, when the user moves away from such location, the information will not be available.

The information can be for entertaining 3054 the user. Or, the information is primarily promotional 3056 in nature. The promotion can be related to the event the user is participating, or the promotion can be related to the location, such as the company associated with the user's location.

The information can be in different languages 3058. For example, glasses with a red dot provide information in English, while glasses with a white dot provide information in Spanish. Or, there can be a switch on the glasses that allows setting the language to that preferred by the user.

The glasses can be given away 3060. They can be sold at a relatively low price 3062. Or, the glasses can be for temporarily use, such as the user can borrow, rent or lease 3064 the glasses for a short duration of time. To track such glasses after they have been rented, each pair of glasses can have an identifier, such as a bar code. The bar code can be located on the inside of the glasses, such as on the inside of a temple of the glasses. In another embodiment, each pair of glasses can also or alternatively have a RFID tag, which can be wirelessly tracked. The tag can be in a temple, such as in the vicinity of the tip of the temple, or its temple tip. A temple tip is, in general, in a region of the temple substantially furthest away from the hinge of that temple. The organization responsible for renting out the glasses can ask for the user's identity card, which can be the user's driver's license. The card is then linked to the bar code, the RFID tag or other identifier of the glasses. When the user returns the glasses, the user can reclaim the corresponding identity card.

Referring back to FIG. 25, the embodiment 3010 includes a speaker 3024 that is at least partially embedded into the glasses. There are different approaches to embed an electrical component, such as a speaker, into different types of glasses. A number of approaches are described, for example, in the various related patent application noted above.

In one embodiment, the pair of glasses 3010 shown in FIG. 25 includes a radio, and the speaker is a part of the radio. All the electronics for the radio are at least partially embedded in the glasses. For example, the electronics can be on a printed circuit board, and the board is in one of the temples of the glasses. Information is provided to the user through the radio. The radio can be an AM or a FM receiver. In one embodiment, the receiver is pretuned to the frequencies of the transmitter of the information. Or, before the glasses are distributed, the radio is set to receive signals from a specific frequency band. Also the radio may not include an external tuner or switch on the glasses for the user to tune the radio to listen to another frequency band. In another embodiment, the receiver is tunable by a switch on the glasses to one or more frequencies.

The information can be information captured by a microphone or other pickup device, and transmitted over radio frequency waves to the radio.

As to the transmitted frequencies, typically government agencies, such as the FCC in the United States, regulate the availability of frequency ranges, particularly when the power of transmission is not low. In one embodiment, the transmitted frequencies can be on either side of the standard FM radio bands. They can be within the television VHF frequency range of 50 megahertz to 150 megahertz, or 49 to 88 MHz, or 108 to 220 MHz. Selecting such frequencies can have the advantage of having receiver components more readily available and less expensive. But, the frequencies selected may vary depending on costs, performance and/or FCC or other government agency requirements.

In another embodiment, the transmitted frequencies are in the CB (Citizen Band) radio band.

In yet another embodiment, the transmitted frequencies are FM-sidebands. This would allow the use of FM sideband receivers. Using such sidebands typically would require a lease from radio stations.

In one embodiment, information is transmitted to the glasses through a Wi-Fi network, or a WiMax network.

Also, the frequencies transmitted could be based on spread spectrum techniques. In other words, though the frequencies would constantly change, the transmitter and the receiver would be synchronized following the changing frequencies. In a number of countries, such embodiments do not require government license.

Information can typically reside within a few MHz. In one embodiment, the radio in the glasses is a narrow-band receiver, with a bandwidth of 3-6 MHz.

In yet another embodiment, the radio can receive signals from one of multiple and proximate AM modulated frequencies. For example, in a museum, information from adjacent artwork can be transmitted based on frequencies centered at the different frequencies. The radio receiver is a broader band AM receiver, which can be a receiver non-tunable by the user. Depending on proximity, the radio will adjust automatically to capture the frequency of the carrier for information regarding the particular artwork and excludes cross-talks from information regarding its immediate adjacent artworks.

Another embodiment considers the power level of the transmitted signals. If the power level of the transmitted signals is low, signals do not travel an excessive distance beyond the transmitter of the signals. For example, the low power level can be between ¼ to ½ watts. Or, the low power level is not more than 50 milliwatts. If the transmitted power level is low, it is relatively easier to meet government agencies, such as the FCC's, guidelines. Cost and complexity of the circuitry are usually also reduced. High power transmission typically requires special government approval.

In one embodiment, the transmission path between the transmitter and the receiver is primarily line of sight, and the information can be transmitted via, for example, infrared.

In yet another embodiment, there can be multiple transmitters. This can then keep transmission power low even if a large or unusually shaped area is to be covered. The corresponding radio will capture its signals from the transmitters based on proximity.

In one embodiment, the frequency of the radio cannot be tuned at the glasses by the user. The frequencies are fixed upon distribution of the glasses. In another embodiment, the frequencies of interest can be changed. For example, there can be an EPROM in the glasses that can be programmed. Or, one can replace a chip in the glasses to adjust the frequencies. In yet another embodiment, there can be one or more switches at the glasses to change the frequencies.

A number of embodiments have been described where the glasses include a radio to receive broadcast information. In another embodiment, the information to be received is previously programmed or recorded within a memory device. The glasses include a player to play the information stored in the memory device, and the player includes a speaker. The player is at least partially embedded in the glasses. In one embodiment, the glasses can include the memory device with the recorded information.

The memory can be on a printed-circuit board and, for example, can store up to 256 MB. The memory can be a built-in or removable flash memory. In one embodiment, the glasses include one or more connectors. The memory embedded in the glasses can be coupled to a device external to the glasses through the one or more connectors. As an example, a 256 MB flash memory is in one of the temples of a pair of glasses, and there is a USB connector at, for example, the end of that temple (close to the ear) to couple to an external device or instrument.

With the storage medium embedded, the glasses can upload information in the memory to or download information into the memory from an external device, such as a computer. A user can couple the glasses into the computer through a connector, either directly or indirectly. For example, indirect coupling might use an intermediate wire between the computer and the glasses.

In yet another embodiment, the memory device is external to the glasses. The memory device is coupled to the glasses through a connector at the glasses. If such removable memories are deployed for an event, the memories can be rented out during the event. Again, such memories can be tracked based on, for example, identifiers stored in the memories, or attached to the memories.

Figure 27:
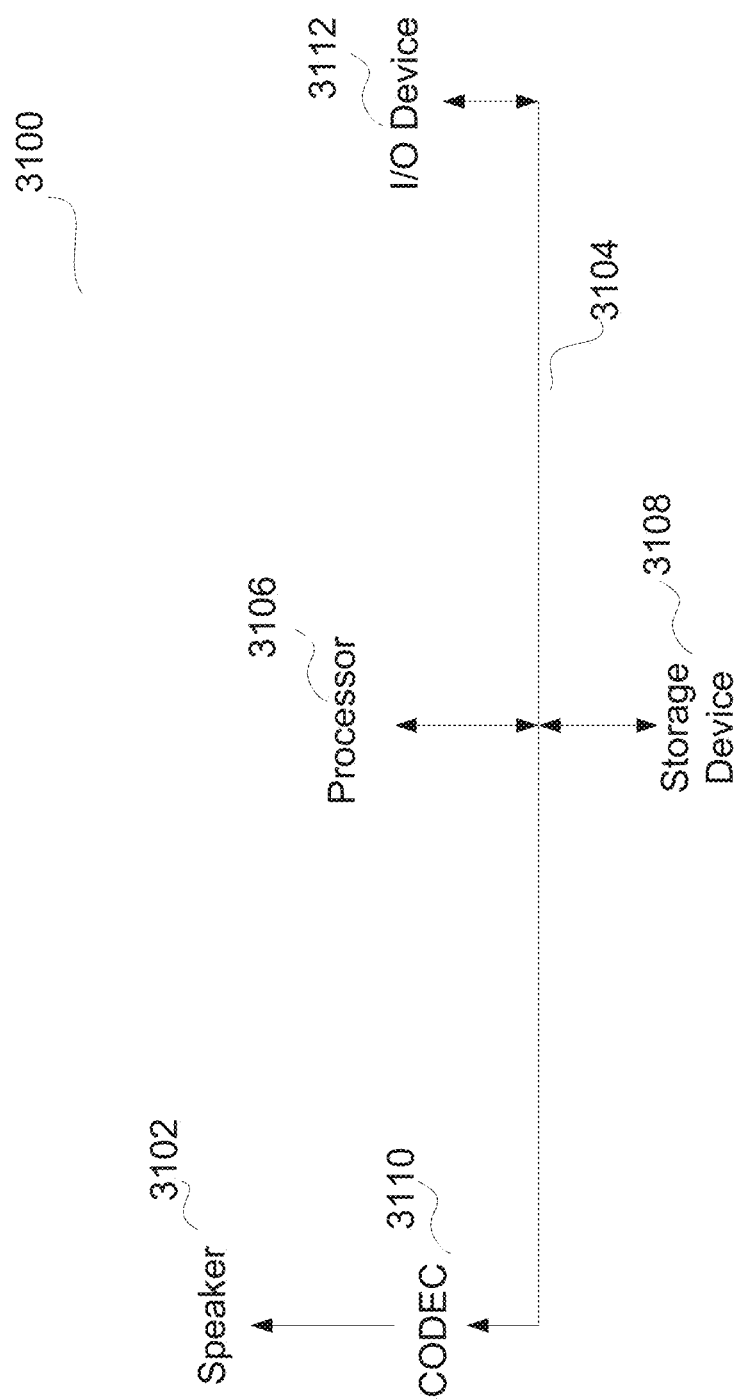
FIG. 27 shows some electrical components of a player according to an embodiment of the invention.

FIG. 27 shows some of the electrical components for a player 3100 in a glasses according to an embodiment of the invention. The player includes a speaker 3102, a data bus 3104 to facilitate data transfer among, for example, a processor 3106, a storage device 3108, and a coder/decoder (CODEC) 3110. The processor 3106, which can be a microprocessor or controller, controls the operation of the player 3100. The storage device 3108 stores the information, which can be different types of appropriately-formatted media data. In one example, the information is digitally encoded audio signals. The storage device 3108 can include a number of separate storage elements. For example, the device can be a flash memory device, or a minidisk device, and a cache, which can improve the access time and reduce power consumption of the storage device 3108. The storage device 3108 typically also includes a Read-Only Memory (ROM), which stores programs, utilities or processes to be executed in a non-volatile manner. The player 3100 can also include a RAM, such as for the cache.

Once a piece of information is selected to be played, the processor 3106 would supply the piece of information to the CODEC 3110, which decompresses the media data and produces analog output signals for the speaker 3102. In one embodiment, the bus 3104 is also coupled to an input/output device 3112, which would allow information to be downloaded from an instrument to the glasses.

There are different approaches to identify a piece of information to be played. In one embodiment, different pieces of information in the storage device 3108 can be categorized, and the categorization can be hierarchical, with multiple levels in the hierarchy. To illustrate, assume that there are three levels. The top level can be the name of the football team; the second level can be the names of the players on the team, and the third level can be scoring statistics or other attributes of the players. The entries, such as the name of the players, can be abbreviated. There can be a control knob or switch to allow the user to scroll down entries in a level. By pushing the knob, the user selects an entry, which can lead the user to the next level. There can be an entry for moving up a level also. In one embodiment, once an entry is selected, the identity of that entry will be announced. For example, a selected entry is about the statistics of Joe Smith. Once that entry is selected, the speaker will state, "Joe Smith statistics." If that is the one the user wants, the user can signal his preference by, for example, pushing a switch.

In another embodiment, the information can be searched. The search can be based on one or more key words. As an example, the information is related to songs. A user can search by the name of the song, the name of the artists or music genre. Entry for the search term can be through voice recognition applications in the glasses. Based on the term verbalized by the user, a song will be selected. The glasses can ask the user if that is the song the user has selected. If the response is positive, the song will be played. If not, the glasses will ask the user to verbalize the term again. In another embodiment, entering the search terms is through the key pad of a portable device, wired or wirelessly, coupled to the glasses. Additional descriptions regarding having a portable device linked to a pair of glasses will be further discussed below.

With the speaker relatively close to at least one ear of the user, the volume of the speaker does not have to be very high. In one embodiment, the volume of the speaker is limited, such as the maximum sound level is not more than 60 dB. If the glasses are powered by a battery, limiting the volume of the speaker would extend the lifetime of the battery. Such a limit can also reduce the chance of the speaker generating audio signals that might disturb people in the vicinity of the user. This, in turn, helps to provide information to the user in a relatively private manner.

In one embodiment, the glasses are powered by a battery. To extend its lifetime, the glasses include a timer. For example, if the glasses have a radio, after the radio is turned on for a preset amount of time, the timer will turn the radio off automatically. In another embodiment, the glasses include a speaker and the timer would turn the speaker off after the speaker has been turned on for a preset amount of time. The preset time can be determined by the timer.

In another embodiment, the glasses are powered by other types of sources, such as a solar cell or a fuel cell. Such other type of sources can be at one of temples of the glasses.

As explained, in a number of embodiments, the glasses include a switch, which typically is at least partially embedded in the glasses. For example, the switch can be used to turn the speaker on, or to tune the frequency of a radio. If the glasses have two speakers, such as one on each of the temples, there can be two switches, one on each temple to control the corresponding speaker. The two speakers can be for generating stereo audio signals for the user. There can also be one control switch for both speakers.

The switch in the glasses can have different attributes. It can be activated by different type of forces, including mechanical, radiation, magnetic, electrical, and temperature. The switch can also be activated remotely by a remote device. The switch can be based on one or more detectors. The switch can have different degrees or ranges of control, such as binary, multiple discrete steps or incremental control. The switch can be placed at different position on the glasses, such as on the side or top surface of a temple or at a joint. The control can take perception into consideration, such as based on texture, height and lateral position of multiple switches.

Figure 28:
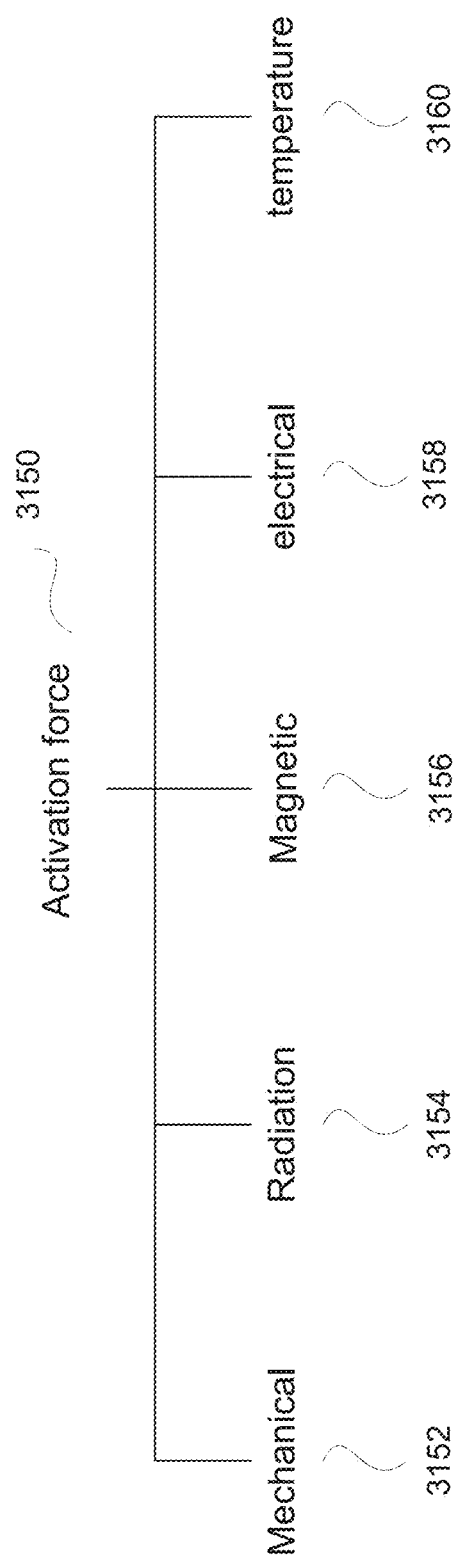
FIG. 28 illustrates a number of forces activating a switch according to a number of embodiments of the invention.

FIG. 28 illustrates a number of forces 3150 activating the switch according to different embodiments of the invention. They can be based on, for example, mechanical 3152, radiation 3154, magnetic 3156, electrical 3158, and temperature 3160.

Figure 29:
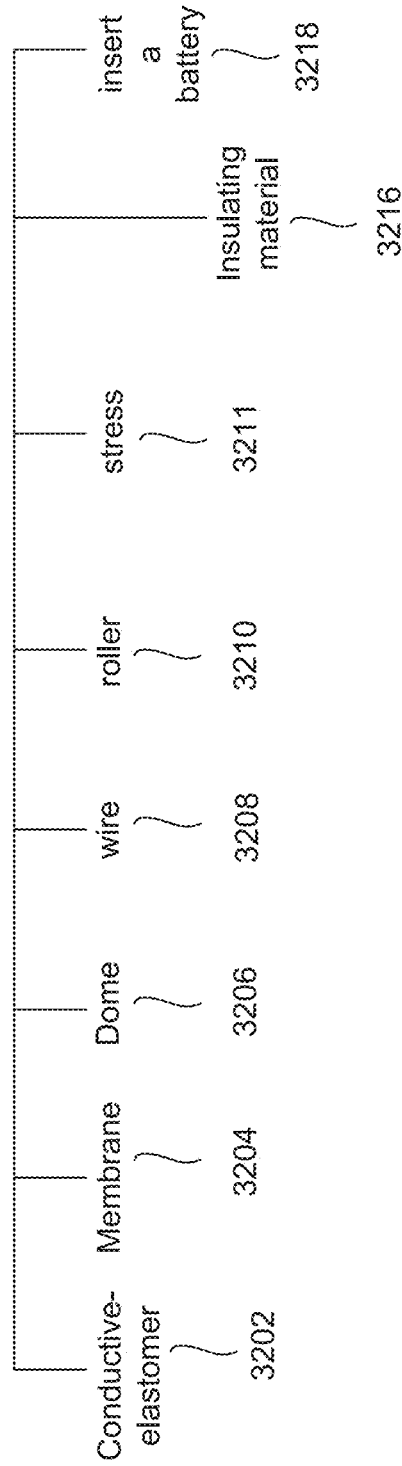
FIG. 29 illustrates a number of mechanical forces activating a switch according to a number of embodiments of the invention.

FIG. 29 illustrates a number of mechanical forces 3152 activating the switch according to different embodiments of the invention. The mechanical switch or sensor can be a conductive-elastomer switch 3202, a membrane switch 3204, a dome switch 3206, a relatively simple wire switch 3208, and a roller switch 3210, such as a switch including a wheel. Another type of mechanical force can be based on stress 3211, such as a switch based on piezoelectric force or a piezoelectric device.

In yet another embodiment, the mechanical switch is made so that the electrical circuitry in the glasses can be activated but not deactivated by the user. In other words, once activated, the switch is designed not to be deactivated by the user, and the circuit will remain on till the power source inside the glasses is depleted. One approach to implement such a switch is based on a piece of insulating material 3216 between a terminal of, for example, a battery and its contact with the circuit embedded in the glasses. When the battery is installed, at least one of its terminals is separated from its circuit contact. There can be a thin, flexible, insulating material, 3216, such as a ribbon, positioned between the terminal and the contact. Though the circuit is embedded in the glasses, the insulating material 3216 extends outwardly from inside the glasses through a hole, such as a small hole, in the side wall of, for example, a temple of the glasses. In one embodiment, the hole or slot is located above or below the terminal and the contact, or the hole is not directly inline with the terminal and the contact. By pulling the insulating material out from the glasses, the terminal will establish electrical connection with the contact, activating the circuit and turning the speaker on.

In another embodiment of a switch based on mechanical force 3152, the mechanical force is the force that is used to insert 3218 a battery into the glasses. Once the battery is inserted, the speaker in the glasses will be activated. The speaker will remain on until the battery is removed, or until the power in the battery is drained.

The switch can also be activated by radiation 3154, or energies in a type of radiation, according to a number of embodiments of the invention. The radiation 3154 can be in the optical, or infrared or ultraviolet range. For example, the switch includes a photodiode or photo sensor in the glasses, and there is an opening above the photodiode. In one embodiment, the diode is activated by light getting to the diode through the opening. In another embodiment, the circuit is activated if the opening is covered to prevent light from getting to the diode.

Figure 30:
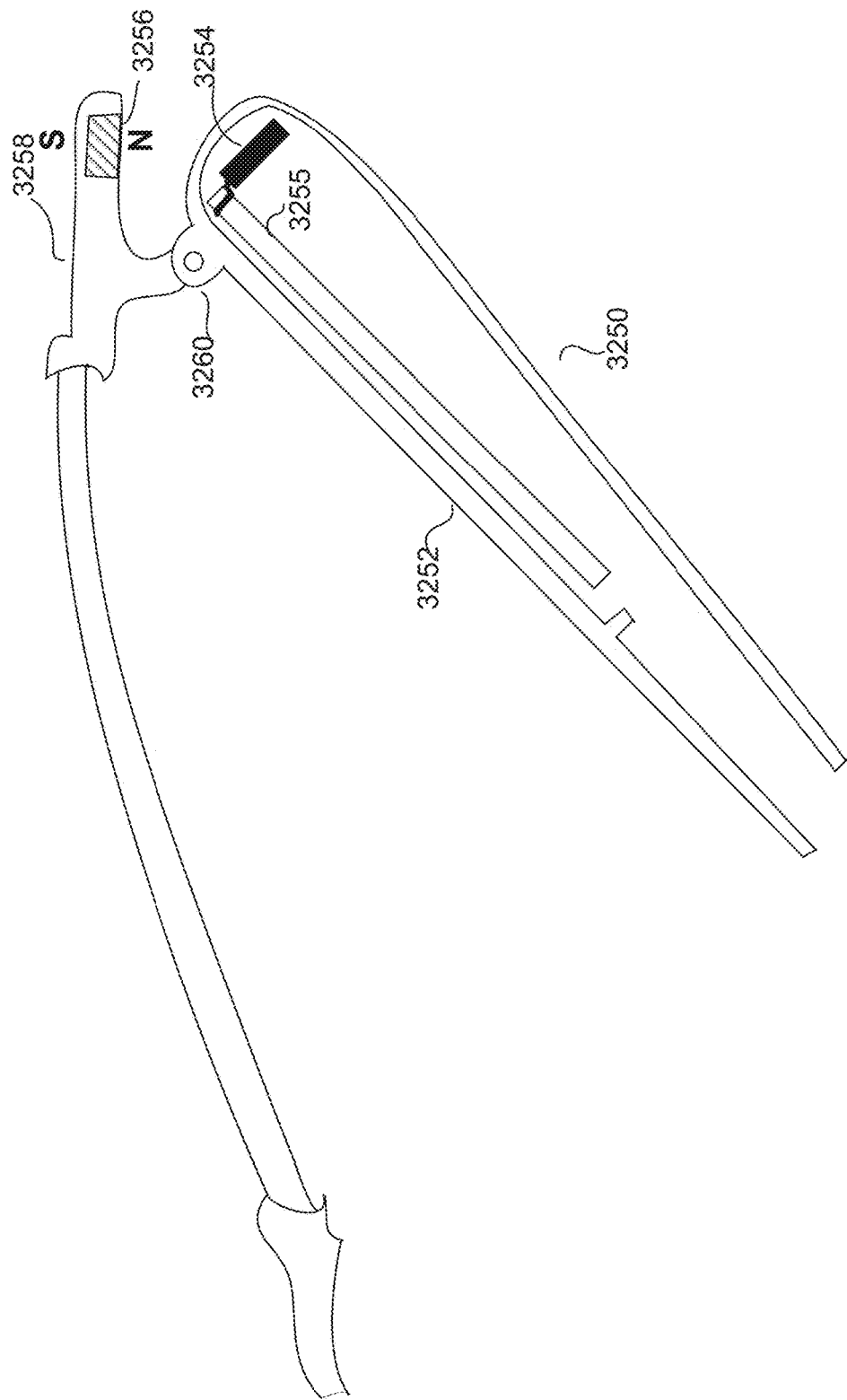
FIG. 30 shows a Hall-effect detector at a joint of a pair of glasses according to an embodiment of the invention.

The switch can be activated by magnetic forces 3156. For example, there can be a magnetic sensor or a Hall effect detector inside a temple proximate to a joint of a pair of glasses. FIG. 30 shows a section of a pair of glasses 3250 with such a detector 3254. The detector 3254 is electrically connected to a printed circuit board 3255. When the temple 3252 is in its extended position, as when the glasses 3250 are ready to be worn, the detector 3254 will be directly adjacent to a magnet 3256 inside a lens holder 3258 at the corresponding joint 3260. The magnet 3256 would activate the Hall effect detector 3254. In another embodiment, a magnetic switch is activated based on changing the inductance of a coil. For example, the switch includes a steel rod that can be positioned in or out of a coil. The switch's range of control is based on the position of the rod with respect to the coil.

The switch can be activated depending on electrical forces 3158. In one embodiment, the electrical force depends on capacitive effect. By changing the capacitance, the switch is turned on and off. For example, the capacitance is changed by placing one's finger over a metallic pad. In another example, by changing the amount of overlap between two metallic sheets that are not in contact, the capacitance between the two metallic sheets will change. This then changes the range of control of the switch.

In another embodiment, the electrical force 3158 is based on resistive effect. For example, the switch is made up of a slide or a rotary potentiometer. By changing the amount of coupling, the amount of resistance is changed to reflect the range of control of the switch.

In one embodiment, the switch's activation can depend on temperature 3160. For example, the switch includes a temperature sensor. When the temperature reaches a certain point, the switch is activated.

In yet another embodiment, the switch is controlled by a remote controller. For example, the glasses include an infrared detector. The remote controller can generate infrared radiation. By aiming the controller at the detector, the infrared radiation can activate the infrared detector and the switch is activated. Or, if the user moves into the vicinity of a corresponding infrared transmitter, circuits in the glasses would be activated.

The switch can include one or more previously-described sensor or detector of different types of forces. For example, the switch can use two photo sensors. One sensor is exposed to light on the outside surface of the temple and the other is exposed to light on the inside surface of the temple, such as close to the ear. Based on their differential output, the switch is activated. As another example, there are two temperature sensors in the glasses. One is located close to a joint and the other is at the temple close to the ear. Again, the switching action depends on their differential outputs. In yet another embodiment, the glasses include more than one type of switch. There can be one type of switch, such as a mechanical switch, acting as an on/off switch, and another, such as a switch using electrical forces, as an incremental switch to change frequency.

As described, in a number of embodiments, the switch can provide different degrees or ranges of control. In one embodiment, there are two degrees of control, such as in an on/off switch. In another embodiment, there can be multiple discrete degrees, steps or positions. For example, the switch is a roller with discrete notches to indicate different discrete positions. Or, there can be two mechanical switches, placed side-by-side. Pushing one switch will increment one step, and pushing the other will decrement one step.

Figure 31A:
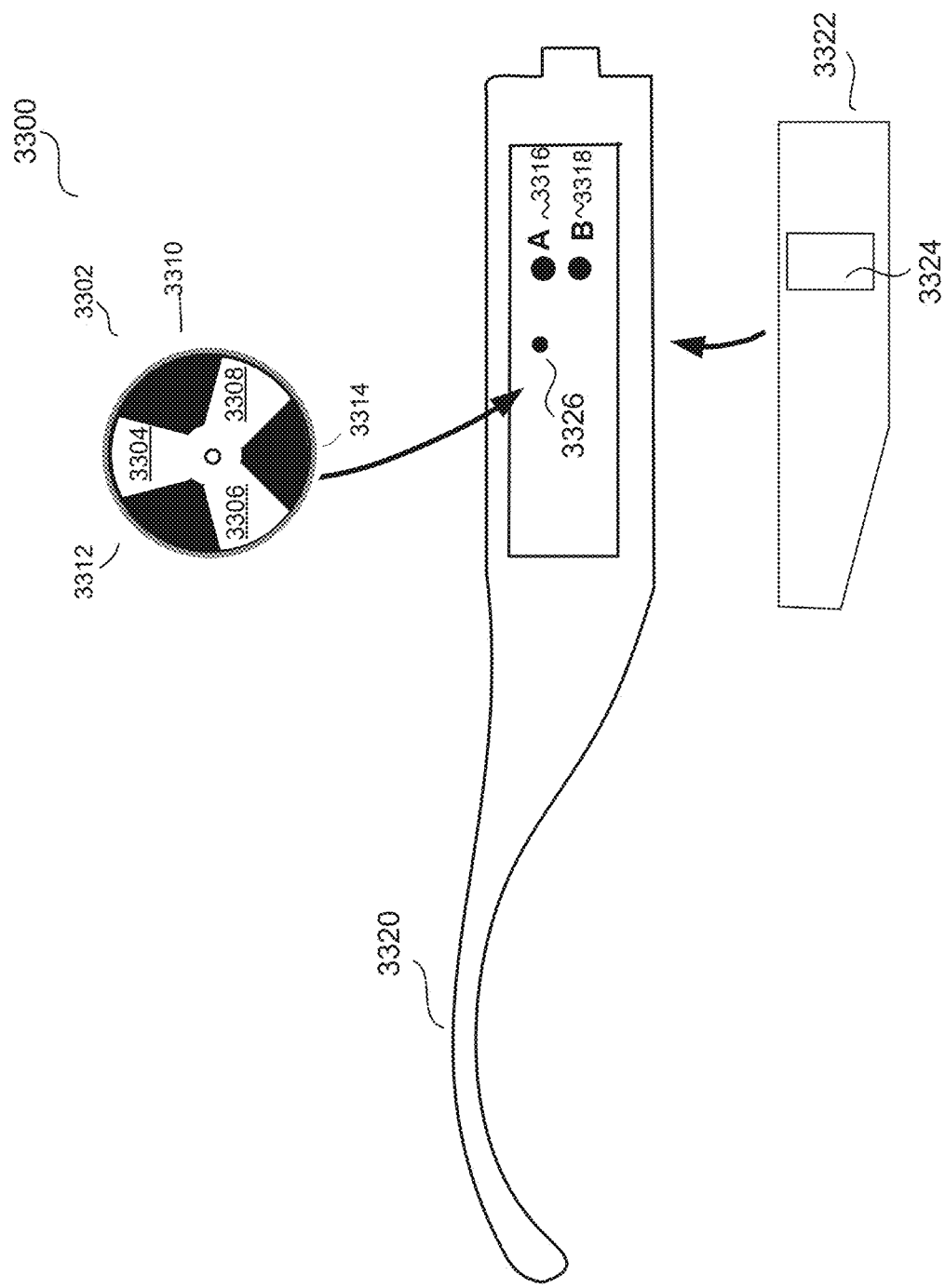
FIGS. 31A-31C illustrate different embodiments of a quadrature sensor according to the invention.
Figure 31B:
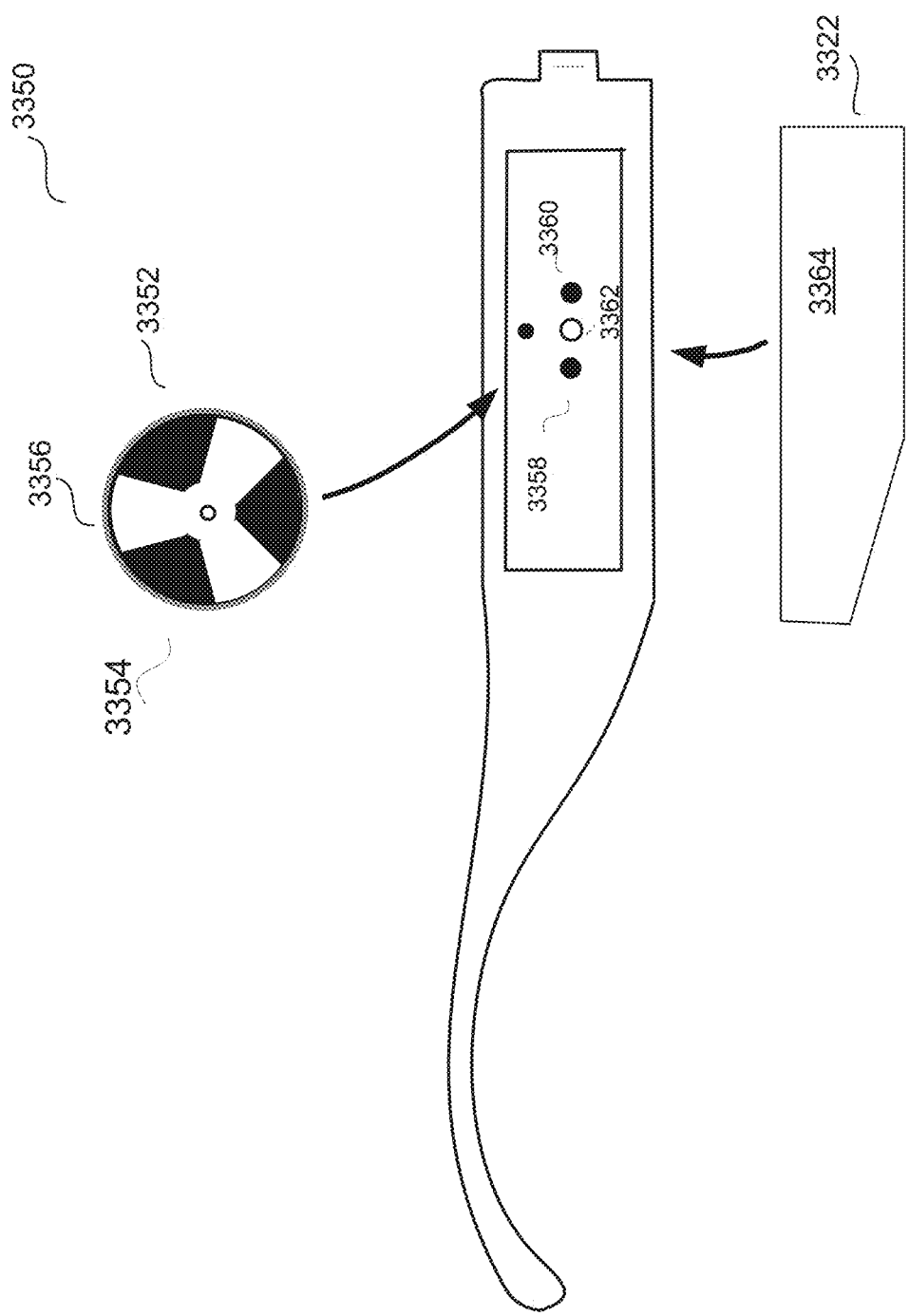
Figure 31C:
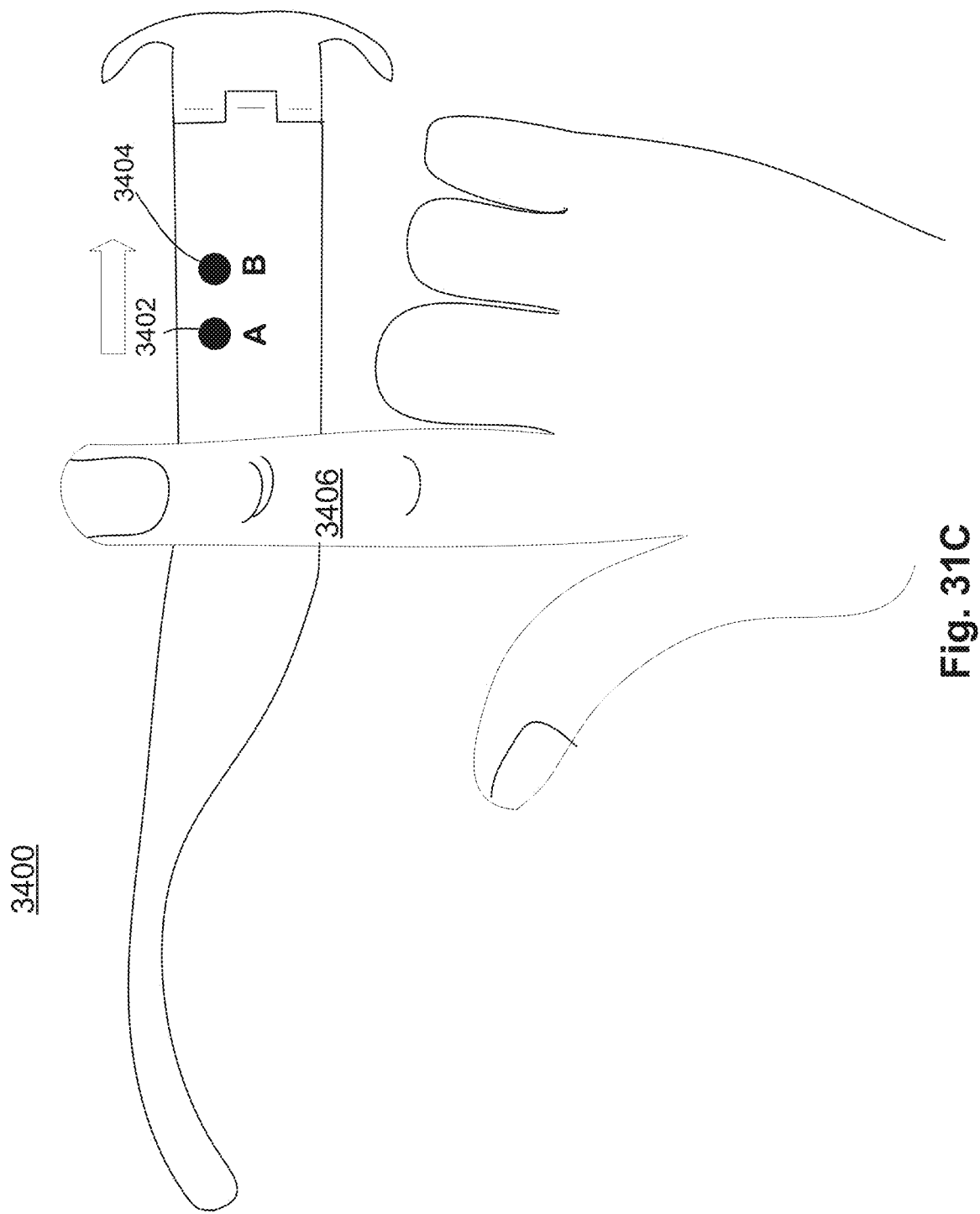

In yet another embodiment, the change from one degree to the next is gradual and not noticeably discrete. This can be achieved with 2 sensors arranged in quadrature. FIGS. 31A-31C show examples of different embodiments of such a switch based on two photodiodes or photo detectors.

FIG. 31A shows an embodiment 3300 with a wheel 3302 (roller) having clear strips, 3304, 3306 and 3308, alternating with black strips, 3310, 3312 and 3314, and two photodiodes, 3316 and 3318. Most of the wheel 3302 and the two diodes, after incorporated into the temple 3320, are covered by a piece of material 3322. The two diodes, 3316 and 3318, are exposed to ambient light through a clear window 3324. A part of the wheel 3302 is extended out of the temple 3320, allowing the wheel 3302 to be turned about its axis 3326. The wheel 3302 can have teeth for friction turning. As the wheel 3302 rotates about the axis 3326, based on the differential outputs from the diodes, the direction of movement of the wheel 3302—clockwise or counterclockwise— is determined. For example, if the wheel 3302 is rotated clockwise, the top diode 3316 senses light before the bottom 3318 senses light. On the other hand, if the wheel 3302 is rotated counterclockwise, the bottom diode 3318 senses light before the top 3316. Based on the signals from the two diodes, one would be able to tell if the wheel is being turned clockwise or counterclockwise. Clockwise can denote increase and counterclockwise can denote decrease. This embodiment can be used, for example, to change frequency. By turning the wheel 3302 clockwise, the frequency of the radio goes up. And, by turning the wheel 3302 counterclockwise, the frequency goes down. Such a wheel 3302 is also applicable for other purposes, such as controlling the volume of a speaker.

FIG. 31B shows an embodiment 3350 with a wheel 3352 having black 3354 and reflecting 3356 strips, two photodiodes, 3358 and 3360, and a LED 3362. Again, most of the wheel, the two diodes and the LED are covered by a sheet of material 3364. If a reflecting strip 3356, instead of a black strip 3354, goes over a diode, more light from the LED will be reflected back and received by the diode. If a black strip 3354 goes over a diode, output from the diode will be significantly reduced. Again based on the signals from the diodes, the direction of rotation can be determined, which, in turn, can be used to indicate incrementing or decrementing outputs.

FIG. 31C shows an embodiment 3400 again using two photodiodes, 3402 and 3404, but without a wheel. The two diodes, 3402 and 3404, are exposed to ambient light unless they are covered. In this embodiment, whether the finger 3406 or another object is moving from the first diode 3402 to the second diode 3404, or from the second diode 3404 to the first diode 3402 can be determined based on the signals from the diodes. For example, the finger 3406 sliding in a forward direction would trigger a signal from the first diode 3402 before the second diode 3404. On the other hand, sliding the finger in a backward direction would trigger a signal from the second diode before the first diode. Thus, the outputs from the two diodes can show the direction of movement of the finger. One can then, for example, assign forward movement (from the first 3402 to the second 3404) as increment, and backward movement (from the second 3402 to the first 3402) as decrement.

A switch can be placed at different location on a pair of glasses. In one embodiment, the switch is positioned on one of the side surfaces of one of the temples, such as the side that is not facing the face of the user when the glasses are worn. In another embodiment, the switch is positioned on a top surface of one of the temples. The switch 3028 shown in FIG. 25 falls under this category. In yet another embodiment, the switch is positioned at one of the joints or hinges of the glasses. For example, there is a mechanical switch at a joint. If the corresponding temple is extended, as in the position when the glasses are worn, the switch will be pressed, which can indicate that the switch has been activated.

In one embodiment, the user can be using a switch when the glasses are worn. Depending on the position and the type of switch, the user may not be able to see the switch when he is manipulating it. In one embodiment, the design of the switch takes into consideration perception. To illustrate, there are two mechanical switches on the glasses. The top surfaces of the two switches have different texture. One switch has a smooth surface and the other has a rough surface. Pushing the rough surface implies incrementing one step and pushing the smooth surface implies decrementing one step. This type of perception design is based on tactile effect. In another example, the heights of the two switches are different. The taller switch is for one effect and the shorter is for another. In yet another embodiment, the lateral position of the two switches has significance. For example, the two mechanical switches are on the top surface or edge of a temple. By pushing the switch closer to the lens holder, the volume of the speaker in the glasses goes up; and by pushing the switch further away from the lens holder, the volume of the speaker goes down. In another example, the two switches are under the two ends of a piece of materials, such as a rocker-lever, which can be plastic. Rocking the plastic piece forward is an increment motion, and rocking the plastic piece backwards is a decrement motion.

A number of embodiments have been described where information is available only for a relatively short duration of time. In one embodiment, the information is available for a longer duration of time. For example, after the short duration of time, the battery in the glasses is drained. In order to continue on running the electronics inside the glasses to get the information, the user can replace the battery in the glasses with a new battery. In this embodiment, the glasses are designed so that the battery is replaceable by the user. Or, in another embodiment, the battery is rechargeable through a connector at the glasses.

A number of embodiments have been described regarding the glasses with a speaker for providing information to the user. In one embodiment, the glasses also include one or more light emitting diodes. The LEDs can be for entertaining purposes. For example, the information provided to the user is music. If the audio signals received are beyond a certain threshold, one or more of the LEDs will be activated. The activation of the one or more LEDs can then be synchronized to the sound of the speaker. In another example, a number of LEDs could be arranged as an array on the outside surface of one of the temples. The array could display graphics, pictures, or scrolling text. The array could also be located at other locations on the glasses, such as across the front surface or the top surface of the bridge or the lens-holders of the glasses.

One embodiment of the glasses includes a specially-designed surface texture, such as on the outside surface of a temple of the glasses. By scratching the surface texture, depending on its design, one can generate specific audio tones.

A number of embodiments have been described regarding electrical components in a temple of a pair of glasses. All of the electronic components can be self-contained inside the temple of the glasses. The components can be coupled to a printed circuit board. In other embodiments, some of the components are embedded fully or partially in other areas of the glasses, such as the lens holders or the bridge of the glasses. Or, one or more electrical components can be in a shield of the glasses.

A number of embodiments have been described regarding information available for a pair of glasses. In one embodiment, a pair of glasses also includes an information input mechanism that allows its user to input information into the glasses. Such information allows the user to provide inputs or feedbacks.

The information input mechanism can be implemented by a switch at the glasses, such as one of the switches previously described. The user input can be stored in the glasses if the glasses include memory storage electrical components. The input can be wirelessly transmitted from the glasses to a remote device if the glasses include wireless transceiver electrical components. For example, the user is at a football game, and the referee has made a controversial call. A broadcaster at the event can instantaneously use such glasses to perform a simple polling. This can be done by the broadcaster as part of the wireless transmission of information (e.g., event information) to the wearer of the glasses. Alternatively, the broadcaster can transmit a message to the user. In one embodiment, there can be an indicator on the glasses to indicate that there is a message for the wearer of the glasses. The indicator can be a LED light flashing for a few seconds, a ringing tone that rings for a few seconds, or other types of indication at the glasses. In any case, if desired, the wearer can receive the message. The message asks the wearer to push a button (an information input mechanism) at the glasses one time, if the wearer believes the call was correct, and two times otherwise. Such input information from the glasses is then wirelessly transmitted from the glasses and received by the broadcaster. Statistics on the responses can then be automatically performed. Such statistics can be provided almost instantaneously to, for example, the referee.

In one embodiment, each pair of such glasses also includes an identifier that identifies the glasses, such as an identification number. When input information is transmitted from such a pair of glasses, such as back to the broadcaster, its identifier can also be transmitted together with the corresponding input information.

Organizers of an event or a company affiliated with or related to the event also can use the glasses to gather other information from the wearers of the glasses, such as the audience of the event. For example, the audience can be electronically polled regarding ways to improve on the services they received.

The information input mechanism can include a microphone at the glasses. The organizers again can send a message to a user of a pair of such glasses. The message can be as follows: "If you like the ways we take food orders, say yes. If not, say no." The voice response from the user is transmitted to the organizers. Such simple yes/no responses can be automatically deciphered based on voice recognition mechanisms and then automatically tabulated for the organizers.

In one embodiment, not all of the electrical components in a number of the glasses previously described are in the glasses. Instead, at least one of the electrical components, such as its power source, is in a portable device, which can also be carried by the user of the glasses. In another embodiment, a pair of glasses can function as a headset and are wired or wirelessly coupled to a portable device. The portable device can provide additional areas for user input, or outputs to the user.

As an example of wireless coupling for a pair of glasses functioning as a headset, the glasses include a wireless transceiver that is based on, for example, Bluetooth, UWB, Zigbee, or other types of short-distance wireless transmission standards. Based on the transceiver, the glasses are wirelessly coupled to a corresponding portable device. Information from long distances can be received by the portable device, which can then re-transmit such information to the glasses.

As an example of wired coupling for a pair of glasses functioning as a headset, the glasses include a connector. The connector can be used to electrically connect to a portable device through, for example, a wire. In one embodiment, the connector at the glasses is a male connector and is located at the tip of one temple of the glasses, such as at the tip position 3019 of the second temple 3018, shown in FIG. 25. When the male connector is not inserted into a female connector, the male connector can be covered, such as with a cap or a cover, to protect, encapsulate or shroud the connector. In one embodiment, at least a portion of the connector is covered.

Different embodiments of glasses functioning as a headset have been described in patent application, entitled, "EYEGLASSES WITH HEARING ENHANCED AND OTHER AUDIO SIGNAL-GENERATING CAPABILITIES", which was incorporated by reference above, and can be used with the various embodiments described herein.

A number of embodiments have been described regarding glasses with a number of structural elements. In one embodiment, the glasses can be rimless frames. The glasses can include two lenses held together by a bridge. A temple can be attached to each lens through a joint that is connected to the corresponding lens by one or more screws. For example, there can be two screws at each lens to hold onto a temple piece, which includes a joint for a corresponding temple. One or more electrical components can be fully or partially embedded in the glasses, such as in a temple of the glasses.

A number of embodiments have been described with glasses. In one embodiment, a device, which is not a pair of glasses, can provide information to a user, where the information can be directly relevant to an event attended by the user. There can also be a user input mechanism at the device to allow the user to provide user input, including user feedback. Different embodiments of electrical components previously described can be in the device. Advantageously, in one embodiment, the different embodiments of components have minimal impact on the design of the end product and no tedious wiring is required. For example, in the case in which the end product is an eyeglass frame, a temple of the eyeglass frame can have an opening, cavity or container to hold or encompass the different embodiments of components, whereby no other changes or complications to the eyeglass frames need be imposed. Other such end-products can include: hats, shoes, watches, tee-shirt, swimming-suit, key-ring, purse, beer can holder, and other consumer products.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

A number of embodiments in the invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Also, in this specification, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A wireless wearable device, with at least a portion of the wireless wearable device configured to be worn in at least one ear of a user, to at least help the user hear audio outputs produced by the device, the wireless wearable device comprising:
   a speaker at least partially in the wireless wearable device; and
   an electrical connector at least partially in the wireless wearable device,
      wherein the electrical connector includes at least two conductive areas, each area on a surface of the wireless wearable device, and
      wherein the at least two conductive areas are configured to removably couple to corresponding conductive contacts of a counterpart connector external to and separate from the wireless wearable device, at least via spring-force, to at least enable each of the at least two conductive areas to be electrically connected to its corresponding conductive contact;
   a rechargeable battery at least partially in the wireless wearable device, with the battery configured to be charged via at least the electrical connector; and
   a microphone at least partially in the wireless wearable device.

2. A wireless wearable device as recited in claim 1 comprising another microphone at least partially in the wireless wearable device configured to capture at least sound in vicinity of the wireless wearable device.

3. A wireless wearable device as recited in claim 2 comprising electronic circuitry at least partially in the wireless wearable device configured to cancel at least a portion of the sound captured by the another microphone to produce the audio outputs.

4. A wireless wearable device as recited in claim 2, wherein at least the microphone and the another microphone are configured to receive audio inputs, with at least some sound in the audio inputs configured to be cancelled based on using at least the microphone and the another microphone.

5. A wireless wearable device as recited in claim 2, wherein the microphone is configured to be positioned closer to mouth of the user than the another microphone, when the wireless wearable device is worn by the user.

6. A wireless wearable device as recited in claim 2 comprising a storage medium at least partially in the wireless wearable device configured to store at least computer program codes for facilitating voice recognition to recognize at least a word received at least by the microphone for an operation of the wireless wearable device.

7. A wireless wearable device as recited in claim 2 comprising wireless communication circuitry at least partially in the wireless wearable device configured for coupling to at least a Bluetooth network.

8. A wireless wearable device as recited in claim 2 comprising:
   a touch-sensitive input surface on a portion of the wireless wearable device; and
   a storage medium at least partially in the wireless wearable device configured to store at least computer program codes for facilitating an operation of the wireless wearable device based on identifying a sliding user-input action across at least a portion of the touch-sensitive input surface.

9. A wireless wearable device as recited in claim 2 comprising a controller at least partially in the wireless wearable device configured to determine whether the wireless wearable device is being worn based on outputs from a sensor at least partially in the wireless wearable device.

10. A wireless wearable device as recited in claim 2 comprising a motion sensor at least partially in the wireless wearable device.

11. A wireless wearable device as recited in claim 2 comprising a touch-sensitive input surface on the wireless wearable device, wherein the touch-sensitive input surface is configured to facilitate generating at least an electrical signal for an operation of the wireless wearable device based on receiving at least a touch input.

12. A wireless wearable device as recited in claim 2 comprising an area configured for attachment via magnetic force.

13. A wireless wearable device as recited in claim 12 comprising a magnet in the area.

14. A wireless wearable device as recited in claim 12 comprising a storage medium at least partially in the wireless wearable device configured to store at least computer program codes for facilitating voice recognition to recognize at least a word received at least by the microphone for an operation of the wireless wearable device.

15. A wireless wearable device as recited in claim 14 comprising wireless communication circuitry at least partially in the wireless wearable device configured for coupling to at least a wireless network.

16. A wireless wearable device as recited in claim 15 comprising a pressure sensor at least partially in the wireless wearable device.

17. A wireless wearable device as recited in claim 15 comprising a controller at least partially in the wireless wearable device configured to determine whether the wireless wearable device is being worn based on outputs from a sensor at least partially in the wireless wearable device.

18. A wireless wearable device as recited in claim 17 comprising a motion sensor at least partially in the wireless wearable device.

19. A wireless wearable device as recited in claim 18 comprising a touch-sensitive input surface on the wireless wearable device, wherein the touch-sensitive input surface is configured to facilitate generating at least an electrical signal for an operation of the wireless wearable device based on receiving at least a touch input.

20. A wireless wearable device, to at least help a user hear audio outputs produced by the device, with at least a portion of the wireless wearable device configured to be worn in an ear of the user, and the wireless wearable device comprising:
   a speaker at least partially in the wireless wearable device;
   an electrical connector at least partially in the wireless wearable device,
      wherein the electrical connector includes at least two conductive areas, each area on a surface of the wireless wearable device, and
      wherein the at least two conductive areas are configured to removably couple to corresponding conductive contacts of a counterpart connector external to and separate from the wireless wearable device, at least via spring-force, to at least enable each of the at least two conductive areas to be electrically connected to its corresponding conductive contact;
   a rechargeable battery at least partially in the wireless wearable device, with the battery configured to be charged via at least the electrical connector;
   a microphone at least partially in the wireless wearable device;
   another microphone at least partially in the wireless wearable device configured to capture at least sound in vicinity of the wireless wearable device, wherein the microphone is configured to be positioned closer to mouth of the user than the another microphone, when the wireless wearable device is worn by the user;
   a storage medium at least partially in the wireless wearable device configured to store at least computer program codes for facilitating voice recognition to recognize at least a word received at least by the microphone for an operation of the wireless wearable device;
   wireless communication circuitry at least partially in the wireless wearable device; and
   an area configured for attachment via magnetic force.

21. A wireless wearable device as recited in claim 20 comprising:
   a touch-sensitive input surface on a portion of the wireless wearable device; and
   electronic circuitry configured to identify a sliding user-input action across at least a portion of the touch-sensitive input surface.

22. A wireless wearable device to at least help a user hear audio outputs produced by the device, with at least a portion of the wireless wearable device to be worn in an ear of the user, and the wireless wearable device comprising:
   a speaker at least partially in the wireless wearable device;
   an electrical connector at least partially in the wireless wearable device,
      wherein the electrical connector includes at least two conductive areas, each area on a surface of the wireless wearable device, and
      wherein the at least two conductive areas are configured to removably couple to corresponding conductive contacts of a counterpart connector external to and separate from the wireless wearable device, at least via spring-force, to at least enable each of the at least two conductive areas to be electrically connected to its corresponding conductive contact;
   a rechargeable battery at least partially in the wireless wearable device, with the battery configured to be charged via at least the electrical connector;
   a microphone at least partially in the wireless wearable device;
   another microphone at least partially in the wireless wearable device configured to capture at least sound in vicinity of the wireless wearable device, wherein the microphone is configured to be positioned closer to mouth of the user than the another microphone, when the wireless wearable device is worn by the user;
   wireless communication circuitry at least partially in the wireless wearable device;
   a touch-sensitive input surface on the wireless wearable device, wherein the touch-sensitive input surface is configured to facilitate generating at least an electrical signal for an operation of the wireless wearable device based on receiving at least a touch input; and
   an area configured for attachment via magnetic force.

23. A wireless wearable device as recited in claim 22 comprising:
   a pressure sensor at least partially in the wireless wearable device; and
   a controller at least partially in the wireless wearable device configured to determine whether the wireless wearable device is being worn based on outputs from a sensor at least partially in the wireless wearable device.

24. A wireless wearable device to at least help a user hear audio outputs produced by the device, with at least a portion of the wireless wearable device to be worn in an ear of the user, the wireless wearable device comprising:
   an electrical connector at least partially in the wireless wearable device,
      wherein the electrical connector includes at least two conductive areas, each area on a surface of the wireless wearable device, and
      wherein the at least two conductive areas are configured to removably couple to corresponding conductive contacts of a counterpart connector of an apparatus external to and separate from the wireless wearable device, at least via spring-force, to at least enable each of the at least two conductive areas to be electrically connected to its corresponding conductive contact;
   a rechargeable battery in the wireless wearable device, with the battery configured to be charged via at least the electrical connector;
   a speaker at least partially in the wireless wearable device, with the battery configured to provide power to the speaker;
   a first microphone, at least partially in the wireless wearable device, configured to capture at least sound in vicinity of the wireless wearable device, with the battery configured to provide power to the first microphone; and a second microphone, at least partially in the wireless wearable device,
  wherein the battery is configured to provide power to the second microphone, and
  wherein the second microphone is configured to be positioned closer to mouth of the user than the first microphone, when the wireless wearable device is worn by the user.

25. A wireless wearable device as recited in claim 24 comprising an area configured for attachment via magnetic force.

\* \* \* \* \*